United States Patent [19]

Kubo et al.

[11] Patent Number: 5,773,168
[45] Date of Patent: Jun. 30, 1998

[54] NONAQUEOUS ELECTROLYTE SECONDARY BATTERY AND METHOD FOR MANUFACTURING THE SAME

[75] Inventors: Koichi Kubo; Shuji Yamada, both of Yokohama; Masashi Fujiwara; Shinji Arai, both of Chigasaki; Motoya Kanda, Yokohama, all of Japan

[73] Assignee: Kabushiki Kaisha Toshiba, Kawasaki, Japan

[21] Appl. No.: 701,717

[22] Filed: Aug. 22, 1996

[30] Foreign Application Priority Data

Aug. 23, 1995 [JP] Japan .................................. 7-214742

[51] Int. Cl.⁶ .................................................. H01M 4/58
[52] U.S. Cl. ......................... 429/223; 429/232; 29/623.5
[58] Field of Search ................................... 429/223, 232; 29/623.1, 623.5

[56] References Cited

U.S. PATENT DOCUMENTS 5,169,736 12/1992 Bittihn et al. ..................... 429/223 X
5,478,674 12/1995 Miyasaka .......................... 429/223 X
5,556,723 9/1996 Ohsaki et al. ..................... 429/232 X

FOREIGN PATENT DOCUMENTS 6-243871 9/1994 Japan .

*Primary Examiner*—Stephen Kalafut
*Attorney, Agent, or Firm*—Oblon, Spivak, McClelland, Maier & Neustadt, P.C.

[57] ABSTRACT

This invention provides a nonaqueous electrolyte secondary battery comprising a positive electrode, a negative electrode and a nonaqueous electrolyte, wherein the positive electrode comprises a lithium-containing nickel oxide having a composition represented by $Li_{1+x}Ni_{1-x}O_{u-y}F_y$ where the ranges of x, y and u meet the following equations (1) to (3):

$$(y+0.05)/2 \leq x \leq (y+1)/3 \quad (1)$$

$$y > 0 \quad (2)$$

$$1.9 \leq u \leq 2.1 \quad (3).$$

30 Claims, 6 Drawing Sheets

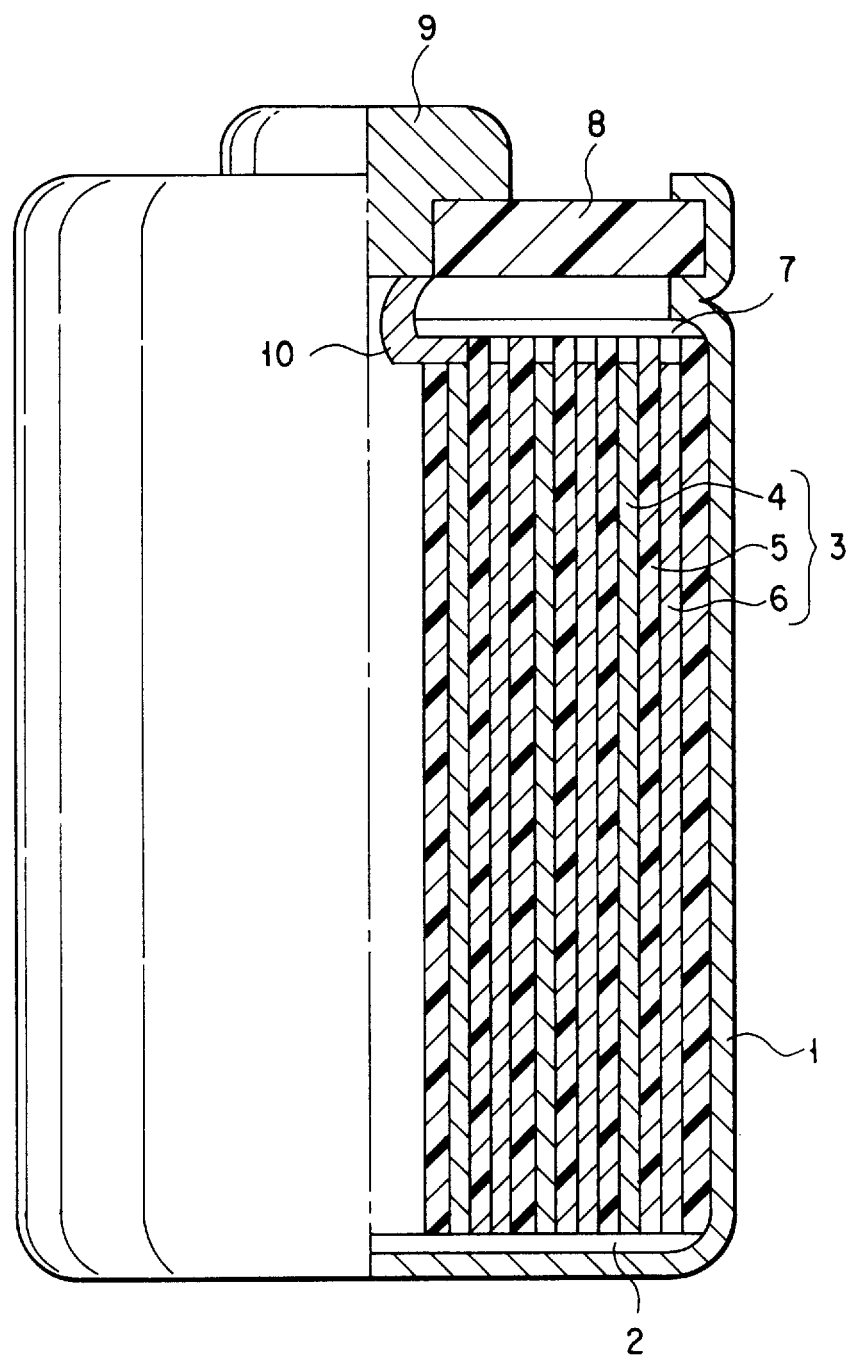
F I G. 1

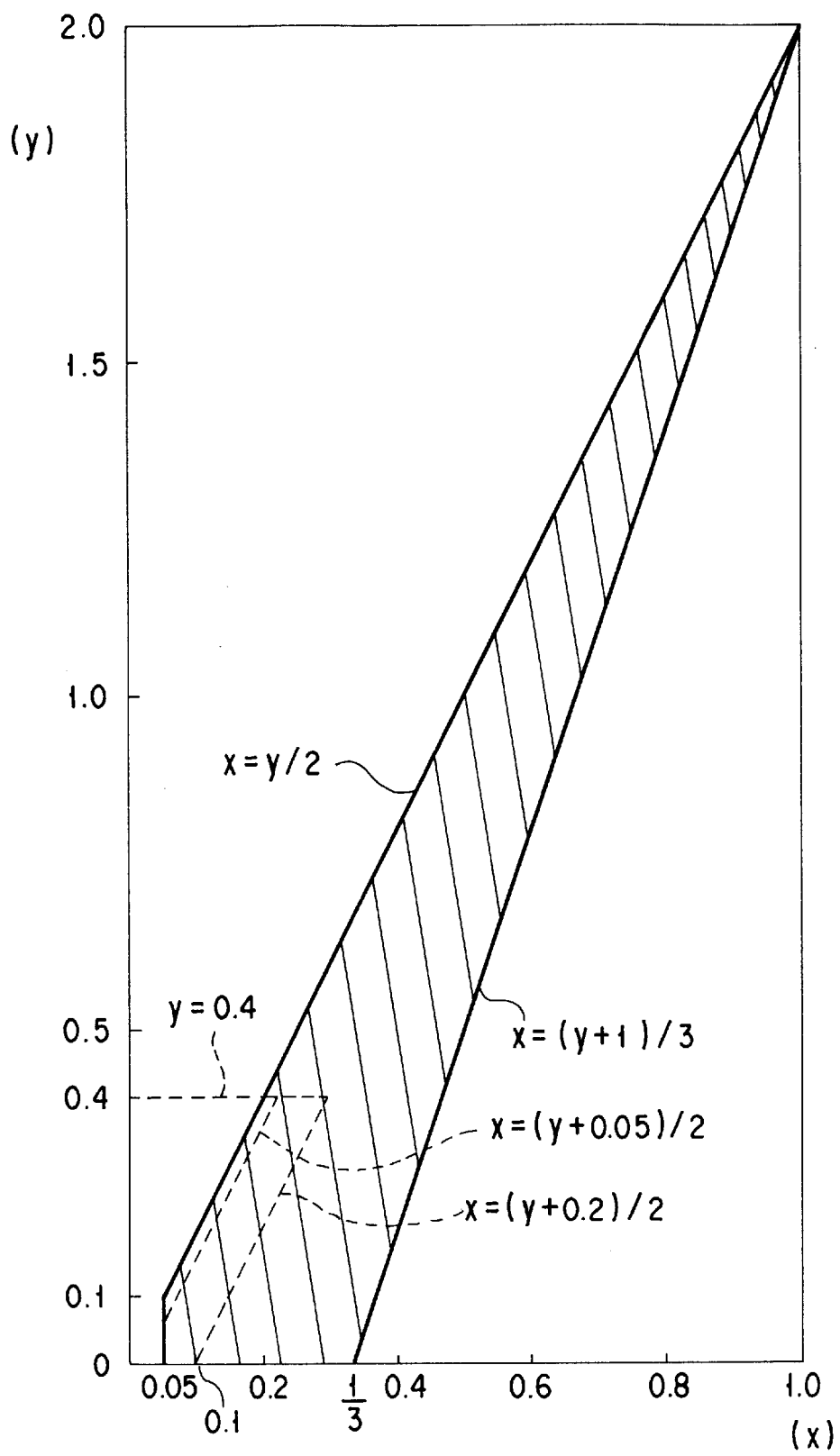
F I G. 3

$(Li_{1+x}Ni_{1-x}O_{2-y}F_y)$

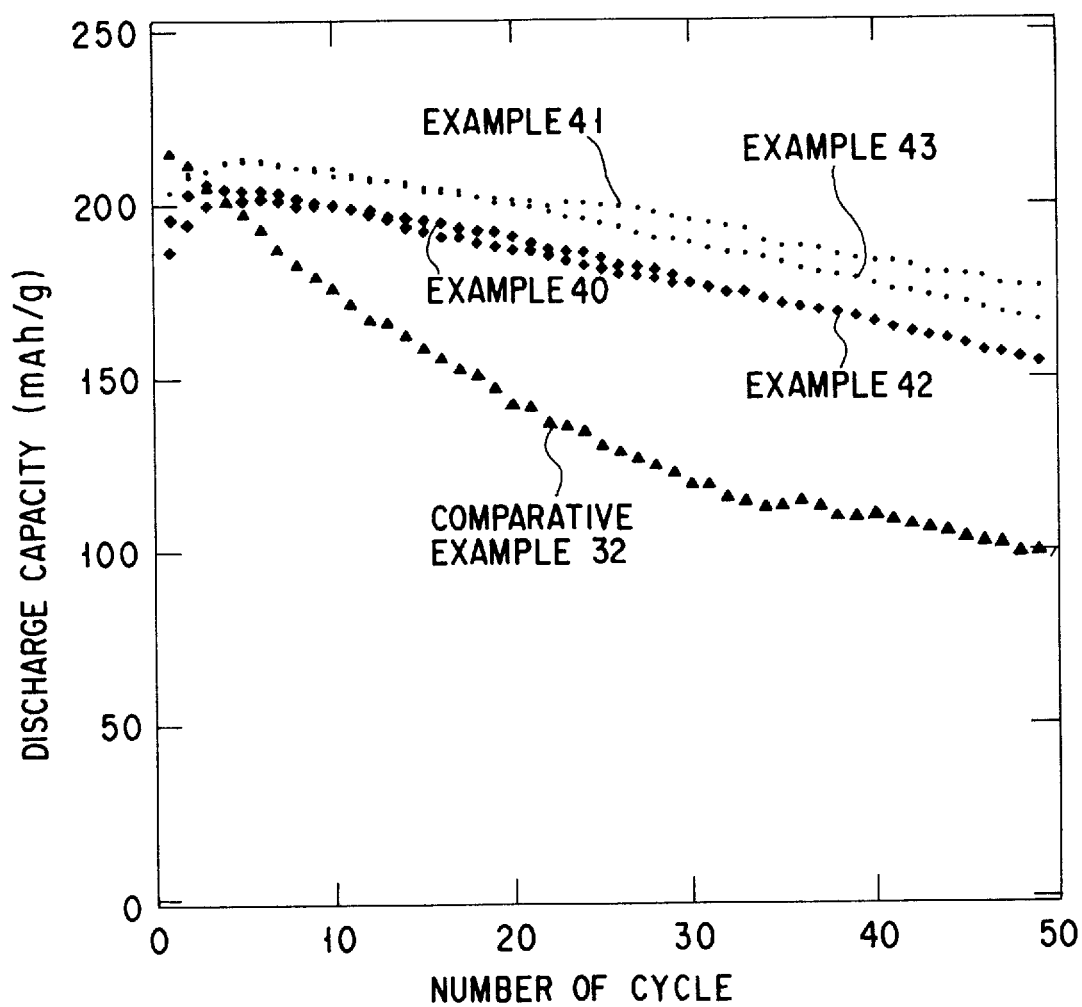
F I G. 8

NONAQUEOUS ELECTROLYTE SECONDARY BATTERY AND METHOD FOR MANUFACTURING THE SAME

BACKGROUND OF THE INVENTION

1. Field of the Invention

This invention relates to a nonaqueous electrolyte secondary battery provided with a positive electrode comprising, as an active material, lithium-containing nickel oxide, and also to a method for manufacturing the nonaqueous electrolyte secondary battery.

2. Description of the Related Art

In recent years, a nonaqueous electrolyte secondary battery has been attracting attention. The reason for this may be attributed to the success in the development of a material for a negative electrode which is relatively unharmful, and to a realization of a high voltage battery that has been achieved by enhancing the decomposition voltage of the nonaqueous electrolyte. Among the nonaqueous electrolyte secondary batteries, a secondary battery making use of lithium ions is capable of providing an especially high discharge potential, so that a battery of high energy density is expected to be realized.

As for the active material for a positive electrode of the nonaqueous electrolyte secondary batteries making use of lithium ions, manganese spinel ($LiMn_2O_4$), lithium-containing cobalt oxide ($LiCoO_2$) and lithium-containing nickel oxide ($LiNiO_2$) are well known to be useful. The manganese spinel is inexpensive as compared with other two oxides mentioned above, but has a drawback that a positive electrode containing the manganese spinel is relatively small in theoretical capacity. On the other hand, the aforementioned $LiCoO_2$ is advantageous in that the synthesis thereof is relatively easy as compared with other two oxides mentioned above and in that a positive electrode containing the $LiCoO_2$ is relatively large in theoretical capacity. However, the positive electrode containing $LiCoO_2$ have the drawbacks that the discharge potential thereof is higher as compared with the other two oxides mentioned above, that the capacity thereof in a potential range where the nonaqueous electrolyte does not decompose is as low as half of the theoretical capacity, and that cobalt is relatively expensive.

On the other hand, a positive electrode comprising the aforementioned $LiNiO_2$ is relatively large in theoretical capacity and exhibits an optimum discharge potential, but is accompanied with a problem that the crystal structure of $LiNiO_2$ collapses in the course of repeating charge/discharge cycles, thereby lowering the discharge capacity thereof. Namely, a secondary battery provided with a positive electrode comprising the aforementioned $LiNiO_2$ is poor in charge/discharge cycle life so that it can not be put to commercial use as it is.

Meanwhile, Japanese Patent Unexamined Publication Hei/6-243,871 sets forth in the claims thereof a nonaqueous secondary battery which is characterized in that a fluorine-containing double oxide represented by the general formula of $Li_xNi_{1-y}Co_yO_wF_a$ (herein, $0<x\leq1.3$; $0\leq y\leq1$; $1.8\leq w+0.5a\leq2.2$; and $0.25\leq a\leq2$) is employed as a positive electrode. Further, this Japanese Patent Unexamined Publication sets forth in its Examples 1 to 5 a nonaqueous secondary battery of flat type, which comprises a disk-like positive electrode containing an active material for positive electrode, a disk-like negative electrode comprising metal lithium and a nonaqueous electrolyte, wherein a fluorine-containing double oxide represented by $LiNiO_{1.75}F_{0.5}$; $LiNiO_{1.875}F_{0.25}$; $LiNiO_{1.5}F$; $LiNiO_{1.25}F_{1.5}$; or $LiNiOF_2$ is employed as the active material for the positive electrode.

SUMMARY OF THE INVENTION

Accordingly, the object of the present invention is to provide a nonaqueous electrolyte secondary battery provided with an improved positive electrode, thereby making it possible to improve the discharge capacity as well as charge/discharge cycle life thereof.

Another object of this invention is to provide a method of manufacturing a nonaqueous electrolyte secondary battery provided with an improved positive electrode, thereby making it possible to improve the discharge capacity as well as charge/discharge cycle life thereof.

Namely, according to the present invention, there is provided a nonaqueous electrolyte secondary battery comprising a positive electrode, a negative electrode and a nonaqueous electrolyte; wherein the positive electrode comprises a lithium-containing nickel oxide having a composition represented by $Li_{1+x}Ni_{1-x}O_{u-y}F_y$ where the ranges of x, y and u meet the following equations (1) to (3):

$$(y+0.05)/2 \leq x < (y+1)/3 \quad (1)$$

$$y > 0 \quad (2)$$

$$1.9 \leq u \leq 2.1 \quad (3)$$

According to the present invention, there is further provided a method of manufacturing a nonaqueous electrolyte secondary battery comprising a positive electrode, a negative electrode and a nonaqueous electrolyte, the method comprising the steps of;
  mixing at least one compound selected from lithium hydroxide, lithium oxide, lithium carbonate and lithium nitrate, at least one compound selected from nickel hydroxide, nickel oxide, nickel carbonate and nickel nitrate, and lithium fluoride at a molar ratio of 0.85–1.0:0.8–0.95:0.05–0.35 to obtain a mixture;
  keeping the mixture thus obtained in an oxygen atmosphere at a temperature of 550° C. to 600° C.; and
  baking the mixture in another oxygen atmosphere at a temperature of 600° C. to 680° C.

Further, according to the present invention, there is provided a nonaqueous electrolyte secondary battery comprising a positive electrode, a negative electrode and a nonaqueous electrolyte, the positive electrode containing particles each made mainly of lithium-containing nickel oxide, at least some of the particles having a film made mainly of lithium-containing oxide, wherein the lithium-containing nickel oxide is formed of a composition represented by $Li_{1+x}Ni_{1-x}O_{u-y}F_y$ where the ranges of x, y and u meet the following equations (4) to (7):

$$y/2 \leq x < (y+1)/3 \quad (4)$$

$$y > 0 \quad (5)$$

$$x \geq 0.05 \quad (6)$$

$$1.9 \leq u \leq 2.1 \quad (7)$$

and the lithium-containing oxide is formed of a composition represented by $LiMO_2$ (where M is at least one kind of element selected from the group consisting of Al, Co, Ni, Li, Mn, Ga and Ru).

According to the present invention, there is further provided a method of manufacturing a nonaqueous electrolyte secondary battery comprising a positive electrode, a negative electrode and a nonaqueous electrolyte, the method comprising the steps of;

mixing at least one compound selected from lithium hydroxide, lithium oxide, lithium carbonate and lithium nitrate, at least one compound selected from nickel hydroxide, nickel oxide, nickel carbonate and nickel nitrate, and lithium fluoride at a molar ratio of 0.85–1.0:0.8–0.95:0.05–0.35 to obtain a mixture;

keeping the mixture thus obtained in an oxygen atmosphere at a temperature of 550° C. to 600° C.;

baking the mixture in another oxygen atmosphere at a temperature of 600° C. to 680° C. to produce particles;

impregnating the particles with an aqueous solution containing one compound selected from lithium nitrate and an organic acid salt of lithium, and one compound selected from a nitrate of element M and an organic acid salt of element M (where M is at least one kind of element selected from the group consisting of Al, Co, Ni, Li, Mn, Ga and Ru); and baking the particles in an oxygen atmosphere at a temperature of 500° C. to 600° C.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 1 is a partially sectioned view of a nonaqueous electrolyte secondary battery according to one embodiment of the present invention;

FIG. 3 is a graph showing the relationship between x and y in the composition formula of a lithium-containing nickel oxide to be included in a nonaqueous electrolyte secondary battery according to another embodiment of the present invention;

FIG. 8 is a graph showing a relationship between the number of cycles and the discharge capacity in a battery according to Examples 40 to 43 of the present invention.

DETAILED DESCRIPTION OF THE PREFERRED EMBODIMENTS

Figure 2:
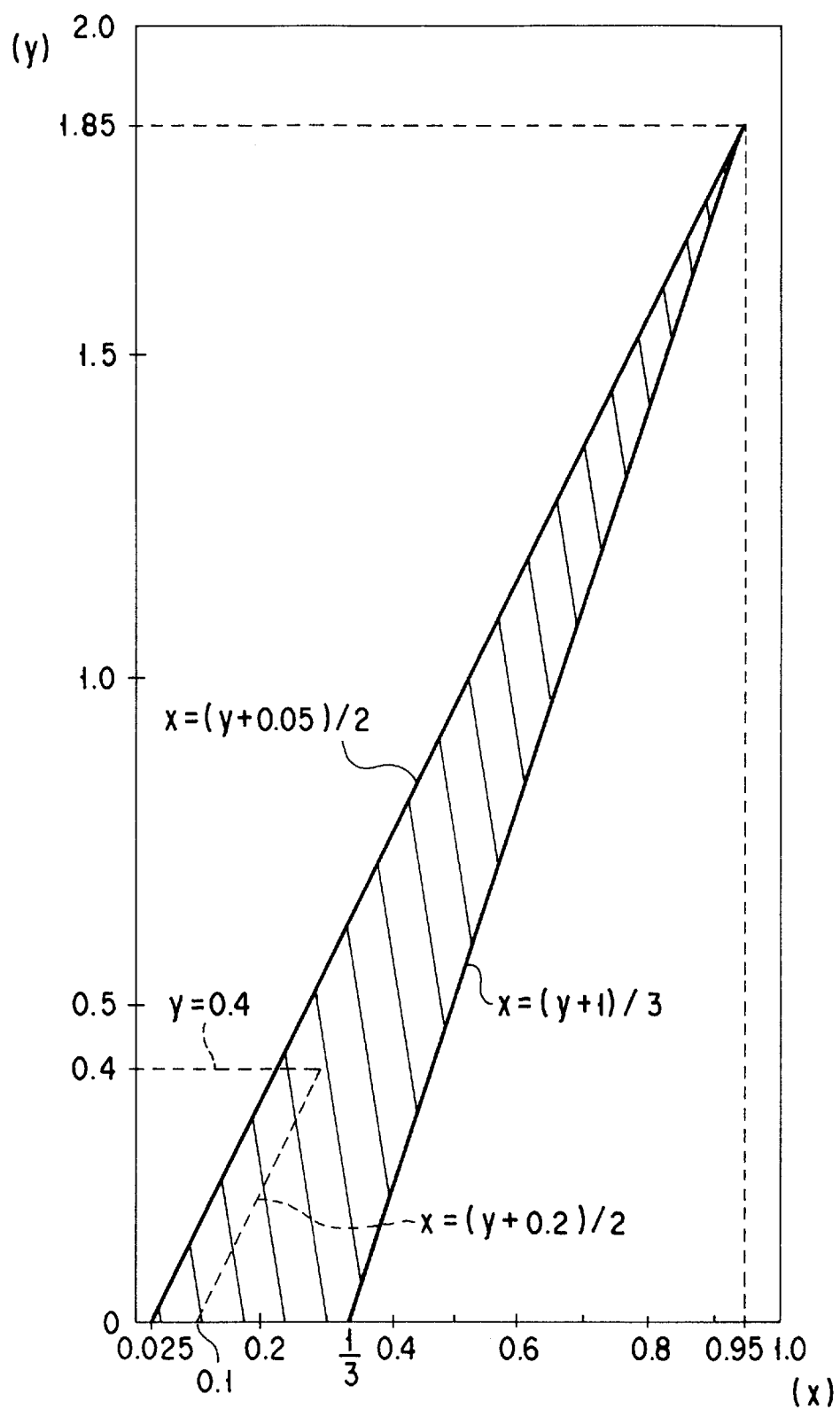
FIG. 2 is a graph showing the relationship between x and y in the composition formula of a lithium-containing nickel oxide to be included in a nonaqueous electrolyte secondary battery according to one embodiment of the present invention.

This invention will be further explained with reference to a nonaqueous electrolyte secondary battery (for example, a cylindrical nonaqueous electrolyte secondary battery) as shown in FIG. 1.

Referring to FIG. 1, a bottomed cylindrical case 1 made of stainless steel for example is provided at the bottom thereof with an insulating body 2. An electrode assembly (a group of electrodes) 3 is housed in the cylindrical case 1. The electrode assembly 3 is constructed such that a strip-like laminate body comprising a positive electrode 4, a separator 5 and a negative electrode 6 stacked in this order is spirally wound with the separator 5 being disposed at the outermost side of the electrode assembly 3. The separator 5 may be formed for example of a nonwoven synthetic resin fabric, a porous polyethylene film or a porous polypropylene film.

The cylindrical case 1 is filled with an electrolyte. An insulating paper 7 having an opening at the center is disposed over the electrode assembly 3 placed in the cylindrical case 1. An insulating gasket 8 is arranged at the upper opening of the cylindrical case 1 and liquid-tightly fixed to the cylindrical case 1 by caulking the upper opening portion inwardly. A positive electrode terminal 9 is fitted in the central opening of the insulating gasket 8. One end of a positive electrode lead 10 is connected to the positive electrode 4 and the other end thereof is connected to the positive electrode terminal 9. The negative electrode 6 is connected via a negative lead (not shown) to the cylindrical case 1 functioning as a negative terminal.

Next, the details of the positive electrode 4, the negative electrode 6 and the nonaqueous electrolyte will be explained.

(1) The construction of positive electrode 4:

This positive electrode 4 comprises a lithium-containing nickel oxide having a composition represented by $Li_{1+x}Ni_{1-x}O_{u-y}F_y$ where the ranges of x, y and u meet the following equations (1) to (3):

$$(y+0.05)/2 \leq x < (y+1)/3 \quad (1)$$

$$y > 0 \quad (2)$$

$$1.9 \leq u \leq 2.1 \quad (3)$$

This lithium-containing nickel oxide can be represented by an a-NaFeO$_2$ structure. The atomic ratio of lithium (1+x) in this composition represents a value to be obtained at the moment of synthesis of the oxide. The quantity of lithium in the lithium-containing nickel oxide can be fluctuated by the absorption or desorption of lithium ion in the charge-discharge cycle of battery.

The positive electrode 4 can be manufactured by the steps of; mixing particles each made mainly of the aforementioned lithium-containing nickel oxide with a conductor agent, a binder and a suitable solvent to obtain a slurry, coating the resultant slurry on a collector, drying the slurry and pressing the resultant body.

The values of x and y in the aforementioned lithium-containing nickel oxide may be suitably selected from the region meeting the conditions of $(y+0.05)/2 \leq x < (y+1)/3$ and $y > 0$ out of the region encircled by three lines: $x=(y+0.05)/2$; $x=(y+1)/3$; and $y=0$ as shown in FIG. 2. If the values of x and y are selected from the region meeting $x<(y+0.05)/2$; and $y>0$, the charge/discharge cycle life may be shortened. On the other hand, if the values of x and y are selected from the region meeting $x \leq (y+1)/3$; and $y>0$, the resultant lithium-containing nickel oxide to be constituted by these x and y would contain nickel moiety taking an average valence number of 4 of more, so that the synthesis of such a lithium-containing nickel oxide would be theoretically impossible.

The reasons for limiting the range of u in the aforementioned lithium-containing nickel oxide are as follows. Namely, if the value of u is less than 1.9, part of nickel moiety in the aforementioned oxide may take divalent ion even if the values of x and y fall within the region as defined above, thus deteriorating the charge/discharge efficiency. On the other hand, if the value of u exceeds over 2.1, the charge/discharge efficiency of the battery would be deteriorated. This is because an excessive quantity of oxygen atom may distort the crystal lattice, thereby hindering the movement of lithium ions.

Therefore, the lithium-containing nickel oxide should preferably be of a composition represented by $Li_{1+x}Ni_{1-x}O_{u-y}F_y$ where the range of u meets the aforementioned equation (3) and the ranges of x and y meet the following equations (4) and (5):

$$(y+0.05)/2 \leq x \leq (y+0.2)/2 \quad (4)$$

$$0<y \text{ or } 0<y \leq 0.4 \quad (5)$$

If the values of x and y meet the above equations (4) and (5), the values of x and y may be selected from a region meeting the conditions of $(y+0.05)/2 \leq x \leq (y+0.2)/2$ and $0<y<0.4$ out of the region encircled by four straight lines: $x=(y+0.05)/2$; $x=(y+0.2)/2$; $y=0$; and $y=0.4$ as shown in FIG. 2. A nonaqueous electrolyte secondary battery provided with a positive electrode comprising such a lithium-containing nickel oxide is capable of prominently improving the initial capacity as well as the charge/discharge cycle life of the battery.

The nickel moiety in the aforementioned lithium-containing nickel oxide may be of a solid solution consisting of nickel and cobalt, or a solid solution consisting of nickel and manganese.

Particles made mainly of the lithium-containing nickel oxide may contain lithium hydroxide, lithium oxide, lithium carbonate, lithium nitrate, nickel hydroxide, nickel oxide, nickel carbonate, nickel nitrate and lithium fluoride.

Particles made mainly of the lithium-containing nickel oxide may be manufactured by the following method as an example. Namely, a compound selected from lithium hydroxide, lithium oxide, lithium carbonate and lithium nitrate, a compound selected from nickel hydroxide, nickel oxide, nickel carbonate and nickel nitrate, and lithium fluoride are mixed together at a molar ratio of 0.85–1.0:0.8–0.95:0.05–0.35 to obtain a mixture, which is then maintained in an oxygen atmosphere at a temperature of 550° C. to 600° C., more preferably at a temperature of 550° C. for not less than 5 hours, and thereafter baked in another oxygen atmosphere at a temperature of 600° C. to 680° C. for not less than 5 hours to synthesize the particles.

If the aforementioned molar ratio falls outside the ranges as defined above in the above-mentioned method of synthesizing the lithium-containing nickel oxide, particles made mainly of the lithium-containing nickel oxide which meet the aforementioned equations (1) to (3) may not be obtained. A preferable molar ratio is 0.95–1.0:0.9–0.95:0.05–0.15.

The reason for limiting the temperature for the baking step as described above is as follows. Namely, if the baking temperature is lower than 600° C., a longer period of time has to be consumed for achieving a sufficient reaction, which is not desirable in practical view point. On the other hand, if the baking temperature exceeds over 680° C., the value of u may be lowered down to 1.9 or less. Therefore, a preferable baking temperature is in the range of 650° C. to 680° C.

As for the conductor agent, acetylene black, carbon black or graphite for example may be used. These conductor agents should preferably be heat-treated in an oxygen atmosphere at a temperature of 150° C. to 250° C. for not less than 5 hours.

As for the binder, polytetrafluoroethylene (PTFE), polyvinylidene fluoride (PVDF), polyether sulfon (PES), ethylene-propylene-diene copolymer (EPDM) or styrenebutadiene rubber (SBR) for example may be employed.

As for the collector, aluminum foil, stainless foil and nickel foil for example are preferably for use.

(2) The construction of negative electrode 6:

As for the negative electrode 6, one containing a material which is capable of absorbing and desorbing lithium ion (such as a carbonaceous material, a chalcogen compound, or a light metal) may be employed. In particular, a negative material containing a carbonaceous material which is capable of absorbing and desorbing lithium ion, or a chalcogen compound which is capable of absorbing and desorbing lithium ion is preferable, since such a negative electrode is effective in improving the performance of the battery such as a cycle life of the secondary battery.

As for carbonaceous material capable of absorbing and desorbing lithium ion, a material such as coke, carbon fiber, thermally decomposed vapor phase carbon material, graphite, a sintered resin or mesophase pitch film type carbon may be employed. As for the mesophase pitch type carbon, a mesophase pitch carbon fiber which is graphitized at a temperature of 2,500° C. or more, or a mesophase spherical carbon which is graphitized at a temperature of 2,500° C. or more is preferable in particular. A negative electrode containing the aforementioned carbon fiber or spherical carbon is preferable because of its capability to improve the capacity thereof.

As for the carbonaceous material, one which exhibits 700° C. or more, more preferably 800° C. or more in an exothermic peak as measured by means of differential thermal analysis, and 0.7 to 2.2 in intensity ratio of a (101) diffraction peak $P_{101}$ to a (100) diffraction peak $P_{100}$ ($P_{100}/P_{100}$) as measured by means of x-ray diffraction is preferable. Since a negative electrode containing such a carbonaceous material is capable of performing the absorption and desorption of lithium ion in high speed, the charging/discharging property of the secondary battery can be further improved.

As for chalcogen compound capable of absorbing and desorbing lithium ion, a material such as titanium disulfide ($TiS_2$), molybdenum disulfide ($MoS_2$) or niobium selenide ($NbSe_2$) may be employed. A negative electrode containing the aforementioned chalcogen is effective in improving the capacity of the secondary battery, since the capacity of the negative electrode can be increased though the voltage of the secondary battery may be somewhat lowered. Moreover, since the diffusion rate of lithium ion is high in this negative electrode, the charging/discharging property of the secondary battery can be further improved.

As for the light metal capable of absorbing and desorbing lithium ion, a material such as aluminum, an aluminum alloy, magnesium alloy, metallic lithium or a lithium alloy is useful.

The negative electrode containing a carbonaceous material or a chalcogen compound can be manufactured by the steps of; mixing the above-mentioned material, a binder and a suitable solvent to obtain a slurry, coating the resultant slurry on a collector, drying the slurry and subjecting the resultant body to a press treatment.

As for the binder, polytetrafluoroethylene (PTFE), polyvinylidene fluoride (PVDF), ethylene-propylenediene copolymer (EPDM), styrene-butadiene rubber (SBR) or carboxymethyl cellulose (CMC) for example may be employed.

As for the collector, copper foil, stainless foil and nickel foil for example are preferably for use.

(3) The construction of nonaqueous electrolyte:

The nonaqueous electrolyte to be employed herein may be the one which can be produced by dissolving an electrolytic salt (an electrolytic material) in an nonaqueous solvent.

As for the nonaqueous solvent, any known nonaqueous solvent which has been employed as a solvent for a lithium secondary battery can be employed. Although it is not intended to be limited, a nonaqueous solvent mainly consisting of a mixed solvent comprising ethylene carbonate (EC) and at least one kind of nonaqueous solvent whose melting point is lower than that of aforementioned ethylene carbonate and whose donor number is 18 or less (hereinafter referred to as a second solvent) may be preferably employed. This nonaqueous solvent is advantageous in that it is stable against a negative electrode containing a carbonaceous material well developed in graphite structure, in that it is effective in suppressing the reductive or oxidative decomposition of electrolyte, and in that it is high in conductivity.

A nonaqueous electrolyte solely composed of ethylene carbonate is advantageous in that it can be hardly decomposed through a reduction by a graphitized carbonaceous material, but is accompanied with a drawback that the melting point thereof is relatively high (39° C. to 40° C.) and the viscosity thereof is relatively high, so that the conductivity thereof is small, thus making it unsuited for use as a secondary battery to be operated at the normal temperature. The second solvent to be used as a mixture with ethylene carbonate functions to make the viscosity of the mixed solvent lower than that of the aforementioned ethylene carbonate thereby promoting the conductivity of the mixed solvent. Furthermore, when the second solvent having a donor number of 18 or less (the donor number of ethylene carbonate is 16.4) is employed, the aforementioned ethylene carbonate can be easily and selectively solvated with lithium ion, so that the reduction reaction of the second solvent with the carbonaceous material prominently graphitized is assumed to be suppressed. Further, when the donor number of the second solvent is controlled to not more than 18, the oxidative decomposition potential to the lithium electrode can be easily increased to 4 V or more, so that it is possible to manufacture a lithium secondary battery of high voltage.

Preferable examples of the second solvent are linear carbons. Typical examples of them are dimethyl carbonate (DMC), methylethyl carbonate (MEC), diethyl carbonate (DEC), propylene carbonate (PC), γ-butyrolactone (γ-BL), acetonitrile (AN), ethyl acetate (EA), toluene, xylene and methyl acetate (MA). These second solvents may be employed singly or in combination of two or more. More desirably, this second solvent should be selected from those having a donor number of 16.5 or less.

The viscosity of this second solvent should preferably be 28 cp or less at a temperature of 25° C.

The mixing ratio of the aforementioned ethylene carbonate in the mixed solvent should preferably be 10 to 80% by volume. If the mixing ratio of the ethylene carbonate falls outside this range, the conductivity of the solvent may be lowered or the decomposition of the solvent would be resulted, thereby deteriorating the charge/discharge efficiency. More preferable mixing ratio of the ethylene carbonate is 20 to 75% by volume. When the mixing ratio of ethylene carbonate in a nonaqueous solvent is increased to 20% by volume or more, the conductivity of the electrolyte can be improved.

Preferable examples of the composition of the aforementioned mixed solvent are EC and MEC; EC, PC and MEC; EC, MEC and DEC; EC, MEC and DMC; and EC, MEC, PC and DEC; with the volume ratio of MEC being controlled within the range of 30 to 70%. By controlling the volume ratio of MEC to the range of 30 to 70%, more preferably 40 to 60%, the conductivity of the solvent can be improved. On the other hand, in view of suppressing the reductive decomposition reaction of the solvent, an electrolyte having carbon dioxide dissolved therein may be employed, thereby effectively improving both capacity and cycle life of the battery.

The aforementioned mixed solvent may contain as main impurities water and organic peroxides (for example, glycols, alcohols and carboxylic acids). These impurities may have a detrimental influence on the battery, thereby not only deteriorating the cycle life or capacity thereof, but also increasing the selfdischarge during a high temperature (60° C. or more) storage of the battery. Because of these possibilities, the aforementioned impurities in an electrolyte containing a nonaqueous solvent should be eliminated as much as possible. Specifically, the content of water should be controlled to not more than 50 ppm, and the content of organic peroxides should be controlled to not more than 1,000 ppm.

As the electrolytic salts to be incorporated into the nonaqueous electrolyte, a lithium salt such as lithium perchlorate ($LiClO_4$), lithium hexafluorophosphate ($LiPF_6$), lithium borofluoride ($LiBF_4$), lithium hexafluoroarsenide ($LiAsF_6$), lithium trifluorometasulfonate ($LiCF_3SO_3$) and bistrifluoromethyl sulfonylimide lithium [$LiN(CF_3SO_2)_2$]. Among them, $LiPF_6$, $LiBF_4$ and $LiN(CF_3SO_2)_2$ are preferable for use.

The content of aforementioned electrolytic salts in the nonaqueous solvent should preferably be 0.5 to 2.0 mol/l.

In the embodiment shown in FIG. 1, the separator 5 is interposed between the positive and negative electrodes 4, 6, and resultant structure is spirally wound and accommodated in the bottomed cylindrical case 1. However, the nonaqueous electrolyte secondary battery of this invention is not limited to such a construction. It is also possible to construct a nonaqueous electrolyte secondary battery in a rectangular shape which is adapted to accommodate an assembly comprising a plurality of laminates, each laminate being composed of a positive electrode, a negative electrode and a separator disposed between the positive and negative electrodes.

The nonaqueous electrolyte secondary battery according to this invention comprises a positive electrode, a negative electrode and a nonaqueous electrolyte, the positive electrode containing particles each made mainly of lithium-containing nickel oxide, at least some of the particles having a film made mainly of lithium-containing oxide, wherein the lithium-containing nickel oxide is formed of a composition represented by $Li_{1+x}Ni_{1-x}O_{u-y}F_y$ where the ranges of x, y, and u meet the following equation (6) to (9):

$$y/2 \leq x \leq (y+1)/3 \qquad (6)$$

$$y>0 \qquad (7)$$

$$x \geq 0.05 \qquad (8)$$

$$1.9 \leq u \leq 2.1 \qquad (9)$$

and the lithium-containing oxide is formed of a composition represented by $LiMO_2$ (where M is at least one kind of element selected from the group consisting of Al, Co, Ni, Li, Mn, Ga and Ru).

This secondary battery can be manufactured by the steps of: preparing an electrode group by interposing a separator between a positive electrode and a negative electrode; introducing the electrode group together with a nonaqueous electrolyte in a case; and sealing the case.

As for the negative electrode, the separator and the electrolyte, the same as those employed in the above-mentioned example may be employed in this case.

(Positive electrode)

This positive electrode comprises particles each made mainly of lithium-containing nickel oxide, at least some of the particles each having a film made mainly of lithium-containing oxide as an active material. The active material may be formed only of the particles each having the film, or may be formed of the particles each having the film and the particles each having no film.

The composition of the lithium-containing nickel oxide can be represented by $Li_{1+x}Ni_{1-x}O_{u-y}F_y$ where the ranges of x, y and u meet the following equations (6) to (9):

$$y/2 \leq x < (y+1)/3 \quad (6)$$

$$0 < y \quad (7)$$

$$0.05 < x \quad (8)$$

$$1.9 \leq u \leq 2.1 \quad (9)$$

This lithium-containing nickel oxide can be represented by an a-$NaFeO_2$ structure. The atomic ratio of lithium (1+x) in this composition represents a value to be obtained at the moment of synthesis thereof. The quantity of lithium in the lithium-containing nickel oxide can be fluctuated by the absorption or desorption of lithium ion in the charge-discharge cycle of battery.

The nickel moiety in the aforementioned lithium-containing nickel oxide may be of a solid solution consisting of nickel and cobalt, or a solid solution consisting of nickel and manganese.

The lithium-containing oxide can be represented by a composition formula: $LiMO_2$, where M may be one, two or three kinds of elements selected from the group consisting of Al, Co, Ni, Li, Mn, Ga and Ru. Among them, Al, Co and Mn are more preferable for use.

The positive electrode can be manufactured by the steps of; mixing the particles with a conductor agent, a binder and a suitable solvent to obtain a slurry, coating the resultant slurry on a collector, drying the slurry and subjecting the resultant body to a press treatment.

The values of x and y in the aforementioned lithium-containing nickel oxide may be suitably selected from the region encircled by four lines: x=y/2; x=(y+1)/3; y=0; and x=0.05 as shown in FIG. 3 excluding values on the lines of x=(y+1)/3 and y=0. If the values of x and y are selected from the region meeting x<y/2 and y>0, or from the region meeting 0.05>x, and y>0, part of the nickel moiety in the lithium-containing nickel oxide having the aforementioned construction may become divalent ion, and the average valence number of the nickel moiety becomes less than three, and therefore, the charge/discharge cycle life of the battery may be shortened. On the other hand, if the values of x and y are selected from the region meeting $x \geq (y+1)/3$; and y>0, the resultant lithium-containing nickel oxide to be constituted by these x and y would contain nickel moiety taking an average valence number of 4 of more, so that the synthesis of such a lithium-containing nickel oxide would be theoretically impossible.

The reasons for limiting the range of u in the aforementioned lithium-containing nickel oxide are as follows. Namely, if the value of u is less than 1.9, part of nickel moiety in the aforementioned oxide may take divalent ion even if the values of x and y fall within the region as defined above, thus deteriorating the charge/discharge efficiency. On the other hand, if the value of u exceeds over 2.1, the charge/discharge efficiency of the battery would be deteriorated. This is because an excessive quantity of oxygen atom may distort the crystal lattice, thereby hindering the movement of lithium ions.

Therefore, the lithium-containing nickel oxide should preferably be of a composition represented by $Li_{1+x}Ni_{1-x}O_{u-y}F_y$ where the range of u meets the aforementioned equation (9) and the ranges of x and y meet the following equations (8), (10) and (11):

$$0.05 \leq x \quad (8)$$

$$(y+0.05)/2 \leq x \leq (y+0.2)/2 \quad (10)$$

$$0 < y \text{ or } 0 < y \leq 0.4 \quad (11)$$

If the values of x and y meet the above equations (8), (10) and (11), the values of x and y may be selected from a region encircled by five lines: x=(y+0.05)/2; x=(y+0.2)/2; y=0; y=0.4; and x=0.05, excluding the values on the line: y=0 as shown in FIG. 3. A nonaqueous electrolyte secondary battery provided with a positive electrode containing particles made mainly of the lithium-containing nickel oxide, at least some of the particles having a film made mainly of lithium-containing oxide is capable of prominently improving the initial capacity as well as the charge/discharge cycle life of the battery.

The film may be formed such that it covers only part of particle made mainly of lithium-containing nickel oxide. More preferably however, the particle should be entirely covered by the film.

The film may be formed through an epitaxial growth on at least part of surface of particle made mainly of lithium-containing nickel oxide. The epitaxial growth herein means that the crystal of lithium-containing oxide is allowed to grow on at least part of surface of the particle (an underlying crystal) with the c-axis of lithium-containing oxide is directed in the same direction as that of the c-axis of lithium-containing nickel oxide. The lithium ions are absorbed in or desorbed from the crystals of lithium-containing nickel oxide and lithium-containing oxide in a direction perpendicular to the c-axis of these crystals. Therefore, since the direction of the absorption and desorption of lithium ion in the film formed through an epitaxial growth is the same as that in the particles made mainly of the lithium-containing nickel oxide, the absorption and desorption of lithium ion can be smoothly achieved by the particles bearing this film. As a result, it is possible to avoid an increase of inner impedance at the moment of the absorption and desorption of lithium ion, which otherwise might be brought about due to the presence of the film.

The thickness of the film should preferably be in the range of 1 nm to 50 nm in view of the following reasons. Namely, if the thickness of the film is less than 1 nm, it may be difficult to inhibit or avoid a reaction between the fluorine component of the lithium-containing nickel oxide and the conductor agent of the positive electrode or between the fluorine component of the lithium-containing nickel oxide and aforementioned electrolyte, so that the improvement of the charge/ discharge cycle life of the battery may not be expected. On the other hand, if the thickness of the film exceeds over 50 nm, it may be impossible for the lithium-containing oxide crystal to sufficiently follow the change in lattice constant of the lithium-containing nickel oxide crystal that may be brought about by the absorption or desorption of lithium ion so that a distortion may be developed at an interface between the film and the lithium-containing nickel oxide particle, possibly resulting in a peel-off of the film from the lithium-containing nickel oxide particle. Moreover, if the thickness of the film exceeds over 50 nm, the ratio of the lithium-containing nickel oxide in the positive electrode may become insufficient, thereby decreasing the capacity of the positive electrode. Therefore, a more preferable range of the film thickness is from 10 nm to 30 nm.

Particles made mainly of the lithium-containing nickel oxide may contain lithium hydroxide, lithium oxide, lithium carbonate, lithium nitrate, nickel hydroxide, nickel oxide, nickel carbonate, nickel nitrate and lithium fluoride.

The film made mainly of the lithium-containing oxide may contain lithium organic acid salt, lithium nitrate, a nitrate of M, an organic acid salt of M.

The active material may be manufactured by the following method for example.

Namely, a compound selected from lithium hydroxide, lithium oxide, lithium carbonate and lithium nitrate, a compound selected from nickel hydroxide, nickel oxide, nickel carbonate and nickel nitrate, and lithium fluoride are mixed together at a molar ratio of 0.85–1.0:0.8–0.95:0.05–0.35 to obtain a mixture, which is then maintained in an oxygen atmosphere at a temperature of 550° C. to 600° C., more preferably at a temperature of 550° C. for about 5 hours, and thereafter baked in another oxygen atmosphere at a temperature of 600° C. to 680° C. for not less than 5 hours to synthesize the particle made mainly of lithium-containing nickel oxide meeting the aforementioned equations (6) to (9).

On the other hand, a film-forming solution is prepared by dissolving a lithium source such as lithium nitrate or lithium organic acid salt (for example, lithium acetate) and a source for the element M (M is at least one kind of element selected from the group consisting of Al, Co, Ni, Li, Mn, Ga and Ru) such as a nitrate of M or an organic acid salt of M (for example, acetate) into distilled water at a molar ratio of 1:1. Subsequently, the resultant film-forming solution is allowed to penetrate into aforementioned particle, and then the particle is baked in an oxygen atmosphere at a temperature of 500° C. to 600° C. for 5 hours or more, thereby allowing the film made mainly of lithium-containing oxide represented by the composition formula of $LiMO_2$ (M is at least one kind of element selected from the group consisting of Al, Co, Ni, Li, Mn, Ga and Ru) to be epitaxially grown on at least of the surface of the particle. The quantity of the film-forming solution to be penetrated into the particle may be controlled such that the film to be formed on the particle becomes 2% or less in molar ratio. By the process as explained above, it is possible to manufacture the particle made mainly of the lithium-containing nickel oxide and covered at least partially by the film made mainly of the lithium-containing oxide.

The reason for limiting the baking temperature for the film forming step as described above is as follows. Namely, if the baking temperature is lower than 500° C., a longer period of time may be consumed for performing the film-forming reaction, which is not desirable as it may invite a decrease in mass-productivity. On the other hand, if the baking temperature exceeds 600° C., the counter diffusion between the film-forming solution and the particles may occur, forming no film at all on each particle. Therefore, a preferable baking temperature is in the range of 530° C. to 580° C.

As for the conductor agent, the binder and the collector, the same kinds as explained hereinabove may be employed.

As explained above, the nonaqueous electrolyte secondary battery according to this invention is provided with a positive electrode comprising a lithium-containing nickel oxide having a composition represented by $Li_{1+x}Ni_{1-x}O_{u-y}F_y$ where the ranges of x, y and u meet the following equations (1) to (3):

$$(y+0.05)/2 \leq x < (y+1)/3 \quad (1)$$

$$y > 0 \quad (2)$$

$$1.9 \leq u \leq 2.1 \quad (3)$$

A nonaqueous electrolyte secondary battery constructed in this manner is capable of prominently improving the discharge capacity (initial capacity) as well as the charge/discharge cycle life of the battery.

The reason responsible for the achievements of higher capacity and longer charge/discharge cycle life in the nonaqueous electrolyte secondary battery according to this invention is not made clear as yet, but the following mechanism is assumed to be related to such achievements.

First of all, the cause of collapse of crystal structure of $LiNiO_2$ in the repetition of charge/discharge cycle in a nonaqueous electrolyte secondary battery provided with a positive electrode comprising $LiNiO_2$ as an active material may be explained as follows.

Namely, the nickel moiety in $LiNiO_2$ tends to take divalence. Since the diameter of divalent nickel is substantially the same as that of lithium ion, the divalent nickel if present may enter into the lithium site of $LiNiO_2$. The divalent nickel thus entered into the lithium site would become an obstacle for lithium ion moving through $LiNiO_2$ at the moment of charging or discharging, so that the inner impedance would be increased as the lithium ion moves through $LiNiO_2$. As a result, an increased degree of over-voltage and inner stress would be applied to $LiNiO_2$, thus inviting the collapse of the crystal structure of $LiNiO_2$ in the course of repeating charge/discharge cycle.

Furthermore, a structural phase transition takes place in $LiNiO_2$ as lithium ion is absorbed therein or desorbed therefrom. As for the reasoning for this structural phase transition, a mechanism according to Jahn-Teller effect has been proposed. Namely, if all of lithium sites are occupied by lithium ion in $LiNiO_2$, the valence number of nickel disposed at nickel site is kept to trivalence. On the other hand, if lithium ion is desorbed from all of the lithium sites, the valence number of nickel disposed at nickel site becomes tetravalent. The trivalent nickel indicates a tendency to become distorted from its original spherical shape due to Jahn-Teller effect. In a condition where all of lithium sites are occupied by lithium ion in $LiNiO_2$, the trivalent nickel is forced to take a spherical shape by the effect from this lithium ion. However, once this lithium ion is desorbed, a vacancy is generated in $LiNiO_2$. Namely, if the influence of lithium on trivalent nickel is removed, the distortion of trivalent nickel is enlarged. As a result, the $LiNiO_2$ is gradually distorted in shape, as lithium ions are desorbed therefrom. This distortion however will be vanished if nickel is turned into tetravalent ion due to the desorption of lithium ion from all of the lithium sites, and Jahn-Teller effect is minimized. Therefore, when the absorption and desorption of lithium ion in the LiNiO$_2$ is repeated, the structural phase transition is also repeated, thus resulting in fragility and collapse of the LiNiO$_2$.

If fluorine atom is substituted for some of oxygen atom in such a LiNiO$_2$, the LiNiO$_2$ will be turned into a fluorine-containing composite oxide represented for example by Li$_x$NiO$_w$F$_a$ (wherein, $0<x\leq1.3$; $1.8\leq w+0.5a\leq2.2$; and $0.25\leq a\leq2$). In this fluorine-containing composite oxide, the total number of valence number of anion therein is smaller than that of LiNiO$_2$ by the number corresponding to oxygen atoms substituted by fluorine atoms. Since the atomic ratio between lithium and nickel in the fluorine-containing composite oxide is the same as the atomic ratio in LiNiO$_2$, a decrease in positive charge resulting from the aforementioned decrease in negative charge is effected by the decrease in valence number of nickel moiety, i.e. from trivalence to divalence.

Therefore, the ratio of divalent nickel in the nickel moiety in the fluorine-containing composite oxide is caused to increase, thus increasing the inner impedance at the moment when the absorption and desorption of lithium ion are effected. Moreover, since the average valence number of nickel moiety in the fluorine-containing composite oxide is less than three, the magnitude of distortion, due to Jahn-Teller effect, of nickel existing in nickel site will be increased at the moment of desorption of lithium ion. As a result, a nonaqueous secondary battery provided with a positive electrode comprising the aforementioned fluorine-containing composite oxide as an active material is accompanied with a problem that the crystal structure of the oxide can be easily collapsed in the course of repeating charging and discharging, thereby shortening the charge/discharge cycle life.

In the lithium-containing nickel oxide represented by a composition formula; Li$_{1+x}$Ni$_{1-x}$O$_{u-y}$F$_y$ according to this invention, fluorine atom is substituted for some of oxygen atom in LiNiO$_2$ and at the same time the valence number of cation is decreased in conformity with the decrease in total of valence number of anion due to the aforementioned substitution, this decrease in valence number of cation being effected by substituting lithium atom for some of nickel atom. As a result, the ratio of divalent nickel in the nickel moiety can be extremely minimized, and at the same time the average valence number of the nickel moiety can be kept to 3 or more. Accordingly, it is possible with this lithium-containing nickel oxide to suppress any rise in inner impedance at the moment of the absorption and desorption of lithium ion that might be caused by the entrance of divalent nickel into the lithium site. At the same time, it is possible with this lithium-containing nickel oxide to suppress any distortion, due to Jahn-Teller effect, of nickel existing in nickel site at the moment of desorption of lithium ion. Furthermore, since the electronegativity of fluorine is higher than that of oxygen, the Coulomb's force between fluorine and lithium is lower than that between oxygen and lithium. Therefore, it is possible with this lithium-containing nickel oxide to alleviate the interaction (Coulomb's force) thereof with lithium ion by the existence of fluorine moiety in this oxide, and at the same time to minimize the inner impedance at the moment of the movement (absorption and desorption) of lithium ion.

Accordingly, it is possible, according to a nonaqueous electrolyte secondary battery provided with a positive electrode comprising the aforementioned lithium-containing nickel oxide as an active material, to suppress or avoid the collapse in crystal structure of the oxide in the course of repeating the charging and discharging cycle, thus making it possible to improve the discharge capacity (initial capacity) and charge/discharge cycle life of the battery.

This invention provides a method of manufacturing a nonaqueous electrolyte secondary battery comprising a positive electrode, a negative electrode and a nonaqueous electrolyte; the method comprising the steps of; mixing at least one compound selected from lithium hydroxide, lithium oxide, lithium carbonate and lithium nitrate, at least one compound selected from nickel hydroxide, nickel oxide, nickel carbonate and nickel nitrate, and lithium fluoride at a molar ratio of 0.85–1.0:0.8–0.95:0.05–0.35 to obtain a mixture; keeping the mixture thus obtained in an oxygen atmosphere at a temperature of 550° C. to 600° C.; and baking the mixture in another oxygen atmosphere at a temperature of 600° C. to 680° C.

It is possible with this method to provide a nonaqueous electrolyte secondary battery having a positive electrode comprising the aforementioned lithium-containing nickel oxide as an active material, thus making it possible to improve the discharge capacity (initial capacity) and charge/discharge cycle life.

This invention further provides as another embodiment a nonaqueous electrolyte secondary battery comprising a positive electrode, a negative electrode and a nonaqueous electrolyte, the positive electrode containing particles each made mainly of lithium-containing nickel oxide, at least some of the particles having a film made mainly of lithium-containing oxide, wherein the lithium-containing nickel oxide is formed of a composition represented by Li$_{1+x}$Ni$_{1-x}$O$_{u-y}$F$_y$ where the ranges of x, y and u meet the following equations (4) to (7):

$$y/2 \leq x < (y+1)/3 \quad (4)$$

$$y > 0 \quad (5)$$

$$x \geq 0.05 \quad (6)$$

$$1.9 \leq u \leq 2.1 \quad (7)$$

and the lithium-containing oxide is formed of a composition represented by LiMO$_2$ (where M is at least one kind of element selected from the group consisting of Al, Co, Ni, Li, Mn, Ga and Ru).

It is possible with this secondary battery to remarkably improve the discharge capacity (initial capacity) and charge/discharge cycle life.

The reason responsible for the achievements of higher capacity and longer charge/discharge cycle life in the nonaqueous electrolyte secondary battery according to this invention is not made clear as yet, but the following mechanism is assumed to be related to such achievements.

In the lithium-containing nickel oxide represented by a composition formula; Li$_{1+x}$Ni$_{1-x}$O$_{u-y}$F$_y$ according to this invention, fluorine atom is substituted for some of oxygen atom and at the same time the valence number of cation is decreased in conformity with the decrease in total of valence number of anion due to the aforementioned substitution, this decrease in valence number of cation being effected by substituting lithium atom for some of nickel atom. As a result, the ratio of divalent nickel in the nickel moiety can be extremely minimized, and at the same time the average valence number of the nickel moiety can be kept to 3 or more. Accordingly, it is possible with the aforementioned particles made mainly of this lithium-containing nickel oxide to suppress any rise in inner impedance at the moment of the absorption and desorption of lithium ion that might be caused by the entrance of divalent nickel into the lithium site. At the same time, it is possible with this lithium-containing nickel oxide to suppress any distortion, due to Jahn-Teller effect, of nickel existing in nickel site at the moment of desorption of lithium ion. Furthermore, it is possible with the aforementioned particles made mainly of this lithium-containing nickel oxide to alleviate the interaction thereof with lithium by the existence of fluorine moiety in this oxide, and at the same time to minimize the inner impedance to be induced by the interaction at the moment of the movement (absorption and desorption) of lithium ion.

The film functions to suppress or avoid the fluorine moiety in the particles from reacting with other constitutional components (such as a conductor agent in the positive electrode or the nonaqueous electrolyte). Namely, a decrease in positive charge resulting from a decrease of negative charge as a result of such a reaction can be suppressed or avoided. In other words, the change in valence number of nickel moiety from trivalency to divalency can be suppressed or avoided. Accordingly, any increase in ratio of divalent nickel in the nickel moiety of the lithium-containing nickel oxide in the course of repeating the charge/discharge cycle can be effectively suppressed or avoided.

Accordingly, it is possible, according to a nonaqueous electrolyte secondary battery provided with a positive electrode containing particles made mainly of the lithium-containing composite oxide, at least some of the particles having the film made mainly of the lithium-containing oxide, to keep the ratio of divalent nickel in the nickel moiety of the lithium-containing nickel oxide to a low level for a long period of time, so that the collapse in crystal structure of the oxide in the course of repeating the charging and discharging cycle can be effectively suppressed or avoided, thus making it possible to improve the discharge capacity (initial capacity) and charge/discharge cycle life of the battery.

If the film is formed through an epitaxial growth on at least some of particles made mainly of lithium-containing nickel oxide, it is possible to conform the absorbing and desorbing direction of lithium ion through the lithium-containing nickel oxide with the absorbing and desorbing direction of lithium ion through the lithium-containing oxide, so that the absorption and desorption of lithium ion can be smoothly and quickly effected as in the case of the particles not bearing this film. As a result, it is possible according to this nonaqueous electrolyte secondary battery provided with a positive electrode containing such particles as an active material to further improve the discharge capacity (initial capacity) and charge/discharge cycle life of the battery.

When the thickness of the film is controlled in the range of 1 nm to 50 nm, it is possible to inhibit or avoid the peeling of the film which might be caused in the course of repeating the charge/discharge cycle and at the same time to suppress or avoid the fluorine moiety in lithium-containing nickel oxide from reacting with other constitutional components (such as a conductor agent in the positive electrode or the nonaqueous electrolyte). Furthermore, it is possible to maintain the capacity of the positive electrode to a high level. As a result, it is possible according to this nonaqueous electrolyte secondary battery provided with a positive electrode containing such particles as an active material to further improve the discharge capacity (initial capacity) and charge/discharge cycle life of the battery.

This invention further provides a method of manufacturing a nonaqueous electrolyte secondary battery comprising a positive electrode, a negative electrode and a nonaqueous electrolyte, the method comprising the steps of; mixing at least one compound selected from lithium hydroxide, lithium oxide, lithium carbonate and lithium nitrate, at least one compound selected from nickel hydroxide, nickel oxide, nickel carbonate and nickel nitrate, and lithium fluoride at a molar ratio of 0.85–1.0:0.8–0.95:0.05–0.35 to obtain a mixture; keeping the mixture thus obtained in an oxygen atmosphere at a temperature of 550° C. to 600° C.; baking the mixture in another oxygen atmosphere at a temperature of 600° C. to 680° C. to produce particles; impregnating the particles with an aqueous solution containing one compound selected from lithium nitrate and an organic acid salt of lithium, and one compound selected from a nitrate of element M and an organic acid salt of element M (where M is at least one kind of element selected from the group consisting of Al, Co, Ni, Li, Mn, Ga and Ru); and baking the particles in an oxygen atmosphere at a temperature of 500° C. to 600° C.

It is possible with this method to provide a nonaqueous electrolyte secondary battery having a positive electrode containing particles made mainly of the lithium-containing composite oxide, at least some of the particles having the film made mainly of the lithium-containing oxide, thus making it possible to improve the discharge capacity (initial capacity) and charge/discharge cycle life.

This invention will be further explained with reference to the following examples and drawings. It should be understood however that this invention is not confined to the following examples but may be modified within spirit of this invention.

Figure 4:
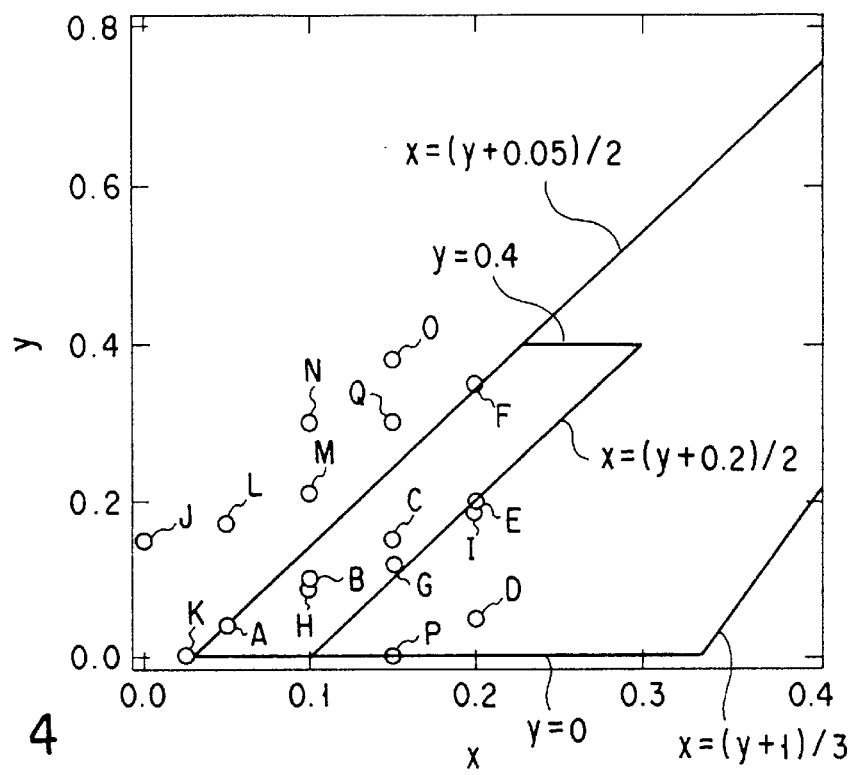
FIG. 4 is a graph showing the composition of a lithium-containing nickel oxide to be included in a battery according to Examples 1 to 9, 37, 39 and 48 of the present invention.

Following Table 1 shows composition formulas of lithium-containing nickel oxide to be employed as an active material for the positive electrode in the following Examples 1 to 9, 37, 39 and 48. FIG. 4 illustrates the distribution of the compositions of these oxides.

TABLE 1

| | x | y | u | $Li_{1+x}Ni_{1-x}O_{u-y}F_y$ |
|---|---|---|---|---|
| A | 0.05 | 0.04 | 2 | $Li_{1.05}Ni_{0.95}O_{1.96}F_{0.04}$ |
| B | 0.1 | 0.1 | 2 | $Li_{1.1}Ni_{0.9}O_{1.9}F_{0.1}$ |
| C | 0.15 | 0.15 | 2 | $Li_{1.15}Ni_{0.85}O_{1.85}F_{0.15}$ |
| D | 0.2 | 0.05 | 2 | $Li_{1.2}Ni_{0.8}O_{1.95}F_{0.05}$ |
| E | 0.2 | 0.2 | 2 | $Li_{1.2}Ni_{0.8}O_{1.8}F_{0.2}$ |
| F | 0.2 | 0.35 | 2 | $Li_{1.2}Ni_{0.8}O_{1.65}F_{0.35}$ |
| G | 0.15 | 0.12 | 1.97 | $Li_{1.15}Ni_{0.85}O_{1.85}F_{0.12}$ |
| H | 0.1 | 0.09 | 2.01 | $Li_{1.1}Ni_{0.9}O_{1.92}F_{0.09}$ |
| I | 0.2 | 0.19 | 1.96 | $Li_{1.2}Ni_{0.8}O_{1.77}F_{0.19}$ |
| J | 0 | 0.15 | 2 | $LiNiO_{1.85}F_{0.15}$ |
| K | 0.025 | 0 | 2 | $Li_{1.025}Ni_{0.975}O_2$ |
| L | 0.05 | 0.17 | 2 | $Li_{1.05}Ni_{0.95}O_{1.83}F_{0.17}$ |
| M | 0.1 | 0.21 | 2 | $Li_{1.1}Ni_{0.9}O_{1.79}F_{0.21}$ |
| N | 0.1 | 0.3 | 2 | $Li_{1.1}Ni_{0.9}O_{1.7}F_{0.3}$ |
| O | 0.15 | 0.38 | 2 | $Li_{1.15}Ni_{0.85}O_{1.62}F_{0.38}$ |
| P | 0.15 | 0 | 2 | $Li_{1.15}Ni_{0.85}O_2$ |
| Q | 0.15 | 0.3 | 2 | $Li_{1.15}Ni_{0.85}O_{1.7}F_{0.3}$ |
| R | 0.075 | 0.1 | 2 | $Li_{1.075}Ni_{0.925}O_{1.9}F_{0.1}$ |
| S | 0.1 | 0.14 | 1.99 | $Li_{1.1}Ni_{0.9}O_{1.85}F_{0.14}$ |
| T | 0.08 | 0.1 | 2 | $Li_{1.08}Ni_{0.92}O_{1.9}F_{0.1}$ |

EXAMPLE 1

(Preparation of a positive electrode)

Particles comprising as a main component lithium-containing nickel oxide represented by a composition of $Li_{1.05}Ni_{0.95}O_{1.96}F_{0.04}$ were prepared by the steps of mixing (LiOH·H$_2$O), Ni(OH)$_2$ and LiF at a molar ratio of 1.0:0.95:0.05, keeping the mixture thus obtained in 1 atm. of pure oxygen at a temperature of 550° C. for 5 hours, sintering the resultant mixture at 650° C. in 1 atm. of pure oxygen for 20 hours, and pulverizing the sintered mixture in an agate mortar. The average particle diameter of the sintered particles thus obtained was 8.5 μm. Then, the sintered particles as an active material, acetylene black as a conductor agent and polytetrafluoroehylene powder as a binder were mixed together at a weight ratio of 80:17:3 to obtain a positive electrode composition, which was then adhered onto a stainless steel net to be used as a collector, thereby obtaining a positive electrode measuring 10 mm×10 mm×0.5 mm in dimension.

(Preparation of a negative electrode)

A lithium metal foil was adhered onto a stainless steel net to be used as a collector, thereby obtaining a square negative electrode measuring 20 mm×20 mm.

(Preparation of a reference electrode)

A lithium metal foil was adhered onto a stainless steel net to be used as a collector, thereby obtaining a square reference electrode measuring 10 mm×10 mm.

(Preparation of nonaqueous electrolyte) $LiClO_4$ was dissolved as an electrolytic salt into a mixed solvent comprising propylene carbonate and dimethoxy ethane to obtain a nonaqueous electrolyte, the concentration of $LiClO_4$ therein being 1 mol/l.

(Preparation of a battery for evaluating the positive electrode)

Figure 5:
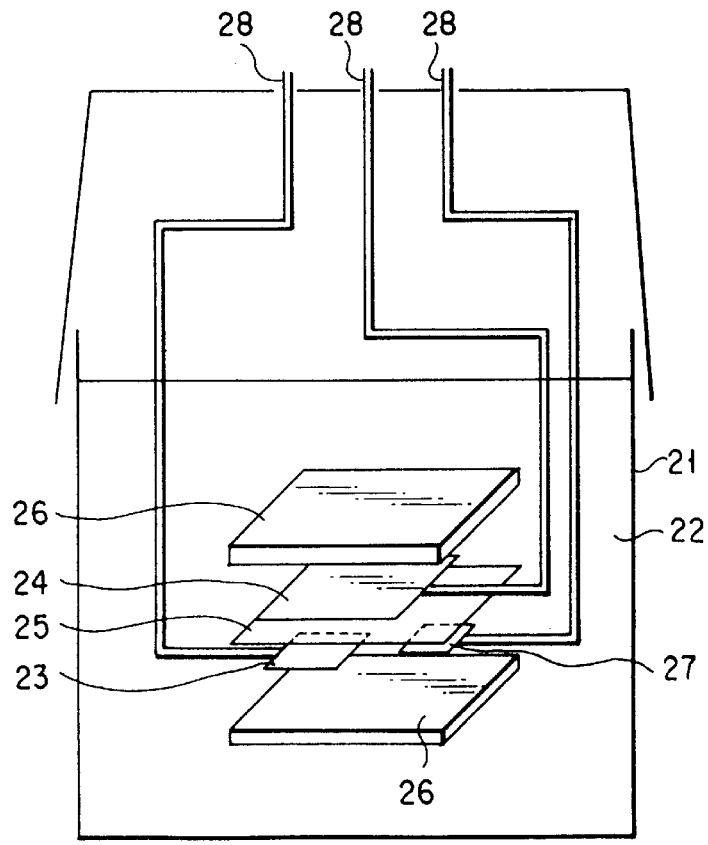
FIG. 5 is a perspective view of a battery for evaluating a positive electrode that has been employed in Examples 1 to 47 of the present invention.

All of the positive electrode, the negative electrode, the reference electrode and the nonaqueous electrolyte thus obtained were fully dried, and then assembled in an argon atmosphere into a battery for evaluating the positive electrode, which was provided with a beaker-type glass cell as shown in FIG. 5.

Referring to FIG. 5, the glass cell 21 is filled with the nonaqueous electrolyte 22. The positive electrode 23 as well as the negative electrode 24 housed in a bag-like separator are superimposed alternately with a separator 25 being interposed therebetween, thus forming a laminate body, which is immersed in the nonaqueous electrolyte 22 in the glass cell 21. The laminate body is held between a couple of holding plates 26. The reference electrode 27 housed in a bag-like separator is immersed in the nonaqueous electrolyte 22 in the glass cell 21. Three pieces of glass filters 28 are disposed in the glass cell 21 in such a manner that each one end portion of the glass filters 28 is partially protruded out from the upper surface of the glass cell 21 and the other end portions thereof are connected to the positive electrode 23, the negative electrode 24 and the reference electrode 27, respectively. The glass cell 21 is hermetically sealed so as to prevent the outer air atmosphere from entering into the glass cell 21 at the occasion of charge/discharge test.

EXAMPLE 2

The same procedure as that of Example 1 was repeated to prepare a positive electrode except that the active material were prepared as follows. Namely, in this Example, particles comprising as a main component lithium-containing nickel oxide represented by a composition of $Li_{1.1}Ni_{0.9}O_{1.9}F_{0.1}$ and having an average particle diameter of 8.5 $\mu$m was prepared by the steps of mixing $(LiOH \cdot H_2O)$, $Ni(OH)_2$ and LiF at a molar ratio of 0.98:0.9:0.12, keeping the mixture thus obtained in 1 atm. of pure oxygen at a temperature of 550° C. for 5 hours, sintering the resultant mixture at 650° C. in 1 atm. of pure oxygen for 20 hours, and pulverizing the sintered mixture in an agate mortar. Then, by employing the negative electrode, the reference electrode and the nonaqueous electrolyte each obtained in the same manner as explained in Example 1, a battery for evaluating the positive electrode as shown in FIG. 4 was assembled.

EXAMPLE 3

The same procedure as that of Example 1 was repeated to prepare a positive electrode except that the active material were prepared as follows. Namely, in this Example, particles comprising as a main component lithium-containing nickel oxide represented by a composition of $Li_{1.15}Ni_{0.85}O_{1.85}F_{0.15}$ and having an average particle diameter of 8.5 $\mu$m was prepared by the steps of mixing $(LiOH \cdot H_2O)$, $Ni(OH)_2$ and LiF at a molar ratio of 0.98:0.85:0.17, keeping the mixture thus obtained in 1 atm, of pure oxygen at a temperature of 550° C. for 5 hours, sintering the resultant mixture at 650° C. in 1 atm. of pure oxygen for 20 hours, and pulverizing the sintered mixture in an agate mortar. Then, by employing the negative electrode, the reference electrode and the nonaqueous electrolyte each obtained in the same manner as explained in Example 1, a battery for evaluating the positive electrode as shown in FIG. 5 was assembled.

EXAMPLE 4

The same procedure as that of Example 1 was repeated to prepare a positive electrode except that the active material were prepared as follows. Namely, in this Example, particles comprising as a main component lithium-containing nickel oxide represented by a composition of $Li_{1.2}Ni_{0.8}O_{1.95}F_{0.05}$ and having an average particle diameter of 8.5 $\mu$m was prepared by the steps of mixing $(LiOH \cdot H_2O)$, $Ni(OH)_2$ and LiF at a molar ratio of 1.14:0.8:0.06, keeping the mixture thus obtained in 1 atm. of pure oxygen at a temperature of 550° C. for 5 hours, sintering the resultant mixture at 650° C. in 1 atm. of pure oxygen for 20 hours, and pulverizing the sintered mixture in an agate mortar. Then, by employing the negative electrode, the reference electrode and the nonaqueous electrolyte each obtained in the same manner as explained in Example 1, a battery for evaluating the positive electrode as shown in FIG. 5 was assembled.

EXAMPLE 5

The same procedure as that of Example 1 was repeated to prepare a positive electrode except that the active material were prepared as follows. Namely, in this Example, particles comprising as a main component lithium-containing nickel oxide represented by a composition of $Li_{1.2}Ni_{0.8}O_{1.8}F_{0.2}$ and having an average particle diameter of 8.5 $\mu$m was prepared by the steps of mixing $(LiOH \cdot H_2O)$, $Ni(OH)_2$ and LiF at a molar ratio of 0.95:0.8:0.25, keeping the mixture thus obtained in 1 atm. of pure oxygen at a temperature of 550° C. for 5 hours, sintering the resultant mixture at 650° C. in 1 atm. of pure oxygen for 20 hours, and pulverizing the sintered mixture in an agate mortar. Then, by employing the negative electrode, the reference electrode and the nonaqueous electrolyte each obtained in the same manner as explained in Example 1, a battery for evaluating the positive electrode as shown in FIG. 5 was assembled.

EXAMPLE 6

The same procedure as that of Example 1 was repeated to prepare a positive electrode except that the active material were prepared as follows. Namely, in this Example, particles comprising as a main component lithium-containing nickel oxide represented by a composition of $Li_{1.2}Ni_{0.8}O_{1.65}F_{0.35}$ and having an average particle diameter of 8.5 $\mu$m was prepared by the steps of mixing $(LiOH \cdot H_2O)$, $Ni(OH)_2$ and LiF at a molar ratio of 0.8:0.8:0.4, keeping the mixture thus obtained in 1 atm. of pure oxygen at a temperature of 550° C. for 5 hours, sintering the resultant mixture at 650° C. in 1 atm. of pure oxygen for 20 hours, and pulverizing the sintered mixture in an agate mortar. Then, by employing the negative electrode, the reference electrode and the nonaqueous electrolyte each obtained in the same manner as explained in Example 1, a battery for evaluating the positive electrode as shown in FIG. 5 was assembled.

EXAMPLE 7

The same procedure as that of Example 1 was repeated to prepare a positive electrode except that the active material were prepared as follows. Namely, in this Example, particles comprising as a main component lithium-containing nickel oxide represented by a composition of $Li_{1.15}Ni_{0.85}O_{1.85}F_{0.12}$ and having an average particle diameter of 8.5 μm was prepared by the steps of mixing ($LiOH \cdot H_2O$), $Ni(OH)_2$ and LiF at a molar ratio of 1.0:0.85:0.15, keeping the mixture thus obtained in 1 atm. of pure oxygen at a temperature of 550° C. for 5 hours, sintering the resultant mixture at 650° C. in 1 atm. of pure oxygen for 20 hours, and pulverizing the sintered mixture in an agate mortar. Then, by employing the negative electrode, the reference electrode and the nonaqueous electrolyte each obtained in the same manner as explained in Example 1, a battery for evaluating the positive electrode as shown in FIG. 5 was assembled.

EXAMPLE 8

The same procedure as that of Example 1 was repeated to prepare a positive electrode except that the active material were prepared as follows. Namely, in this Example, particles comprising as a main component lithium-containing nickel oxide represented by a composition of $Li_{1.1}Ni_{0.9}O_{1.92}F_{0.09}$ was prepared by the steps of mixing ($LiOH \cdot H_2O$), $Ni(OH)_2$ and LiF at a molar ratio of 1.0:0.9:0.1, keeping the mixture thus obtained in 1 atm. of pure oxygen at a temperature of 550° C. for 5 hours, sintering the resultant mixture at 650° C. in 1 atm. of pure oxygen for 20 hours, and pulverizing the sintered mixture in an agate mortar. Then, by employing the negative electrode, the reference electrode and the nonaqueous electrolyte each obtained in the same manner as explained in Example 1, a battery for evaluating the positive electrode as shown in FIG. 5 was assembled.

EXAMPLE 9

The same procedure as that of Example 1 was repeated to prepare a positive electrode except that the active material were prepared as follows. Namely, in this Example, particles comprising as a main component lithium-containing nickel oxide represented by a composition of $Li_{1.2}Ni_{0.8}O_{1.77}F_{0.19}$ and having an average particle diameter of 8.5 μm was prepared by the steps of mixing ($LiOH \cdot H_2O$), $Ni(OH)_2$ and LiF at a molar ratio of 1.0:0.8:0.2, keeping the mixture thus obtained in 1 atm. of pure oxygen at a temperature of 550° C. for 5 hours, sintering the resultant mixture at 650° C. in 1 atm. of pure oxygen for 20 hours, and pulverizing the sintered mixture in an agate mortar. Then, by employing the negative electrode, the reference electrode and the nonaqueous electrolyte each obtained in the same manner as explained in Example 1, a battery for evaluating the positive electrode as shown in FIG. 5 was assembled.

COMPARATIVE EXAMPLE 1

The same procedure as that of Example 1 was repeated to prepare a positive electrode except that the active material were prepared as follows. Namely, in this Comparative Example, particles comprising as a main component lithium-containing nickel oxide represented by a composition of $LiNiO_{1.85}F_{0.15}$ and having an average particle diameter of 8.5 μm was prepared by the steps of mixing ($LiOH \cdot H_2O$), $Ni(OH)_2$ and LiF at a molar ratio of 0.83:1.0:0.17, keeping the mixture thus obtained in 1 atm. of pure oxygen at a temperature of 550° C. for 5 hours, sintering the resultant mixture at 650° C. in 1 atm. of pure oxygen for 20 hours, and pulverizing the sintered mixture in an agate mortar. Then, by employing the negative electrode, the reference electrode and the nonaqueous electrolyte each obtained in the same manner as explained in Example 1, a battery for evaluating the positive electrode as shown in FIG. 5 was assembled.

COMPARATIVE EXAMPLE 2

The same procedure as that of Example 1 was repeated to prepare a positive electrode except that the active material were prepared as follows. Namely, in this Comparative Example, particles comprising as a main component lithium-containing nickel oxide represented by a composition of $Li_{1.025}Ni_{0.975}O_2$ and having an average particle diameter of 8.5 μm was prepared by the steps of mixing ($LiOH \cdot H_2O$) and $Ni(OH)_2$ at a molar ratio of 1.025:0.975, keeping the mixture thus obtained in 1 atm. of pure oxygen at a temperature of 550° C. for 5 hours, sintering the resultant mixture at 650° C. in 1 atm. of pure oxygen for 20 hours, and pulverizing the sintered mixture in an agate mortar. Then, by employing the negative electrode, the reference electrode and the nonaqueous electrolyte each obtained in the same manner as explained in Example 1, a battery for evaluating the positive electrode as shown in FIG. 5 was assembled.

COMPARATIVE EXAMPLE 3

The same procedure as that of Example 1 was repeated to prepare a positive electrode except that the active material were prepared as follows. Namely, in this Comparative Example, particles comprising as a main component lithium-containing nickel oxide represented by a composition of $Li_{1.05}Ni_{0.95}O_{1.83}F_{0.17}$ and having an average particle diameter of 8.5 μm was prepared by the steps of mixing ($LiOH \cdot H_2O$), $Ni(OH)_2$ and LiF at a molar ratio of 0.85:0.95:0.2, keeping the mixture thus obtained in 1 atm. of pure oxygen at a temperature of 550° C. for 5 hours, sintering the resultant mixture at 650° C. in 1 atm. of pure oxygen for 20 hours, and pulverizing the sintered mixture in an agate mortar. Then, by employing the negative electrode, the reference electrode and the nonaqueous electrolyte each obtained in the same manner as explained in Example 1, a battery for evaluating the positive electrode as shown in FIG. 5 was assembled.

COMPARATIVE EXAMPLE 4

The same procedure as that of Example 1 was repeated to prepare a positive electrode except that the active material were prepared as follows. Namely, in this Comparative Example, particles comprising as a main component lithium-containing nickel oxide represented by a composition of $Li_{1.1}Ni_{0.9}O_{1.79}F_{0.21}$ and having an average particle diameter of 8.5 μm was prepared by the steps of mixing ($LiOH \cdot H_2O$), $Ni(OH)_2$ and LiF at a molar ratio of 0.85:0.9:0.25, keeping the mixture thus obtained in 1 atm. of pure oxygen at a temperature of 550° C. for 5 hours, sintering the resultant mixture at 650° C. in 1 atm. of pure oxygen for 20 hours, and pulverizing the sintered mixture in an agate mortar. Then, by employing the negative electrode, the reference electrode and the nonaqueous electrolyte each obtained in the same manner as explained in Example 1, a battery for evaluating the positive electrode as shown in FIG. 5 was assembled.

COMPARATIVE EXAMPLE 5

The same procedure as that of Example 1 was repeated to prepare a positive electrode except that the active material were prepared as follows. Namely, in this Comparative Example, particles comprising as a main component lithium-containing nickel oxide represented by a composition of $Li_{1.1}Ni_{0.9}O_{1.7}F_{0.3}$ and having an average particle diameter of 8.5 μm was prepared by the steps of mixing ($LiOH \cdot H_2O$), $Ni(OH)_2$ and LiF at a molar ratio of 0.75:0.9:0.35, keeping the mixture thus obtained in 1 atm. of pure oxygen at a temperature of 550° C. for 5 hours, sintering the resultant mixture at 650° C. in 1 atm. of pure oxygen for 20 hours, and pulverizing the sintered mixture in an agate mortar. Then, by employing the negative electrode, the reference electrode and the nonaqueous electrolyte each obtained in the same manner as explained in Example 1, a battery for evaluating the positive electrode as shown in FIG. 5 was assembled.

COMPARATIVE EXAMPLE 6

The same procedure as that of Example 1 was repeated to prepare a positive electrode except that the active material were prepared as follows. Namely, in this Comparative Example, particles comprising as a main component lithium-containing nickel oxide represented by a composition of $Li_{1.15}Ni_{0.85}O_{1.62}F_{0.38}$ and having an average particle diameter of 8.5 μm was prepared by the steps of mixing ($LiOH \cdot H_2O$), $Ni(OH)_2$ and LiF at a molar ratio of 0.75:0.85:0.4, keeping the mixture thus obtained in 1 atm. of pure oxygen at a temperature of 550° C. for 5 hours, sintering the resultant mixture at 650° C. in 1 atm. of pure oxygen for 20 hours, and pulverizing the sintered mixture in an agate mortar. Then, by employing the negative electrode, the reference electrode and the nonaqueous electrolyte each obtained in the same manner as explained in Example 1, a battery for evaluating the positive electrode as shown in FIG. 5 was assembled.

COMPARATIVE EXAMPLE 7

The same procedure as that of Example 1 was repeated to prepare a positive electrode except that the active material were prepared as follows. Namely, in this Comparative Example, particles comprising as a main component lithium-containing nickel oxide represented by a composition of $Li_{1.15}Ni_{0.85}O_2$ and having an average particle diameter of 8.5 μm was prepared by the steps of mixing ($LiOH \cdot H_2O$) and $Ni(OH)_2$ at a molar ratio of 1.15:0.85, keeping the mixture thus obtained in 1 atm. of pure oxygen at a temperature of 550° C. for 5 hours, sintering the resultant mixture at 650° C. in 1 atm. of pure oxygen for 20 hours, and pulverizing the sintered mixture in an agate mortar. Then, by employing the negative electrode, the reference electrode and the nonaqueous electrolyte each obtained in the same manner as explained in Example 1, a battery for evaluating the positive electrode as shown in FIG. 5 was assembled.

COMPARATIVE EXAMPLE 8

The same procedure as that of Example 1 was repeated to prepare a positive electrode except that the active material were prepared as follows. Namely, in this Comparative Example, particles comprising as a main component lithium-containing nickel oxide represented by a composition of $Li_{1.15}Ni_{0.85}O_{1.7}F_{0.3}$ and having an average particle diameter of 8.5 μm was prepared by the steps of mixing ($LiOH \cdot H_2O$), $Ni(OH)_2$ and LiF at a molar ratio of 0.8:0.85:0.35, keeping the mixture thus obtained in 1 atm. of pure oxygen at a temperature of 550° C. for 5 hours, sintering the resultant mixture at 650° C. in 1 atm. of pure oxygen for 20 hours, and pulverizing the sintered mixture in an agate mortar. Then, by employing the negative electrode, the reference electrode and the nonaqueous electrolyte each obtained in the same manner as explained in Example 1, a battery for evaluating the positive electrode as shown in FIG. 5 was assembled.

The secondary batteries obtained in Examples 1 to 9 and Comparative Examples 1 to 8 were subjected to a repetition of charge/discharge cycle wherein each battery was charged to a depth of 4.2 V with a current of 1 mA followed by the suspension of the charging for 30 minutes, and then discharged down to 3.0 V with a current of 1 mA followed again by the suspension of the discharge for 30 minutes. This charge/discharge cycle was repeated and changes in discharge capacity with the times of the charge/discharge cycle were measured. Table 2 shown below denotes the initial discharge capacity and the discharge capacity at the 100th cycle.

TABLE 2

| | Composition | Discharge capacity at 1st cycle (mAh/g) | Discharge capacity at 100th cycle (mAh/g) |
|---|---|---|---|
| Example 1 | A | 202 | 132 |
| Example 2 | B | 205 | 124 |
| Example 3 | C | 203 | 137 |
| Example 4 | D | 152 | 118 |
| Example 5 | E | 198 | 122 |
| Example 6 | F | 202 | 133 |
| Example 7 | G | 223 | 145 |
| Example 8 | H | 215 | 140 |
| Example 9 | I | 208 | 134 |
| Comparative Example 1 | J | 217 | 72 |
| Comparative Example 2 | K | 220 | 82 |
| Comparative Example 3 | L | 163 | 51 |
| Comparative Example 4 | M | 198 | 91 |
| Comparative Example 5 | N | 152 | 47 |
| Comparative Example 6 | O | 122 | 36 |
| Comparative Example 7 | P | 142 | 108 |
| Comparative Example 8 | Q | 184 | 97 |

As apparent from Table 2, the batteries according to Examples 1 to 9 were superior than the batteries of Comparative Example 1 to 8 in terms of cycle life. This superiority of the batteries according to Examples 1 to 9 can be ascribed to the fact that, as apparent from Table 1 and FIG. 5, the positive electrode in the batteries according to Examples 1 to 9 contained a lithium-containing nickel oxide whose composition is formed of $Li_{1+x}Ni_{1-x}O_{u-y}F_y$ and the ranges of x, y and u therein meet the following equations (1) to (3).

$$(y+0.05)/2 \leq x < (y+1)/3 \quad (1)$$

$$y > 0 \quad (2)$$

$$1.9 \leq u \leq 2.1 \quad (3)$$

By contrast, the batteries of Comparative Examples 1 to 8 apparently indicated a short cycle life. This poor performance of the batteries according to Comparative Examples 1 to 8 can be ascribed to the fact that, as apparent from Table 1 and FIG. 5, the active materials for the positive electrode in the batteries according to Comparative Examples 1 to 8 were formed of a lithium-containing double oxide whose composition was outside the region defined by the aforementioned equations (1) to (3).

Figure 6:
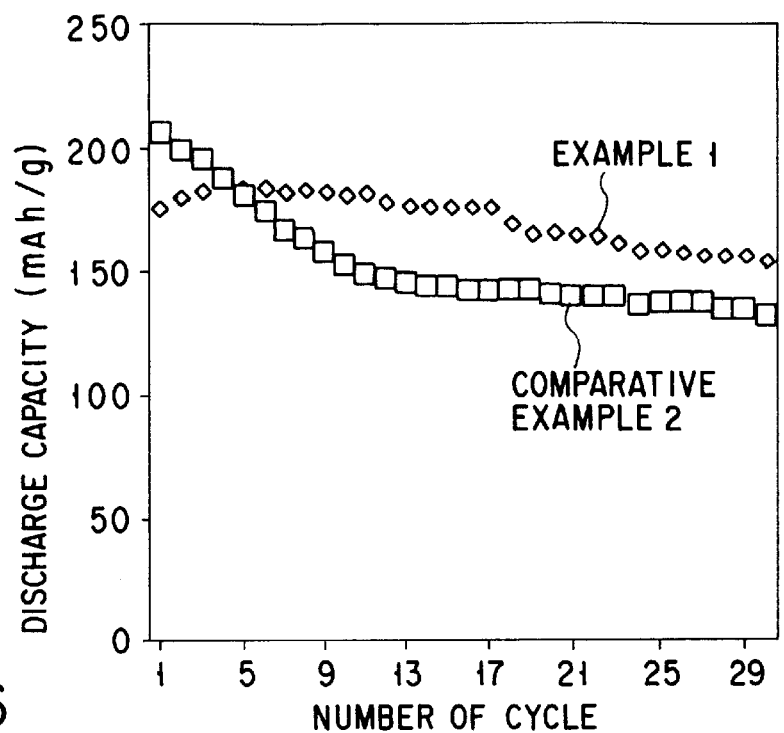
FIG. 6 is a graph showing a relationship between the number of cycles and the discharge capacity in a battery according to Example 1 of the present invention.

Additionally, the secondary batteries obtained in Example 1 and Comparative Example 2 were subjected to a repetition of charge/discharge cycle wherein each battery was charged to a depth of 4.2 V with a current of 1 mA followed by the suspension of the charging for 30 minutes, and then discharged down to 3.0 V with a current of 1 mA followed again by the suspension of the discharge for 30 minutes. This charge/discharge cycle was repeated 30 times and changes in discharge capacity with the times of the charge/discharge cycle were measured. FIG. 6 illustrates changes in discharge capacity up to the 30th cycle.

As apparent from FIG. 6, the battery according to Example 1 which was provided with a positive electrode comprising a lithium-containing nickel oxide represented by the aforementioned composition of $Li_{1+x}Ni_{1-x}O_{u-y}F_y$ was capable of retaining a high capacity throughout 30 times of the charge/discharge cycle. By contrast, although the battery according to Comparative Example 2 indicated a higher initial capacity than the battery of Example 1, the discharge capacity at the 30th cycle of the battery according to Comparative Example 2 was far lower than that of the battery of Example 1. This can be ascribed to the fact that the active materials for the positive electrode in the battery according to Comparative Example 2 was formed of $Li_{1.025}Ni_{0.975}O_2$.

Figure 7:
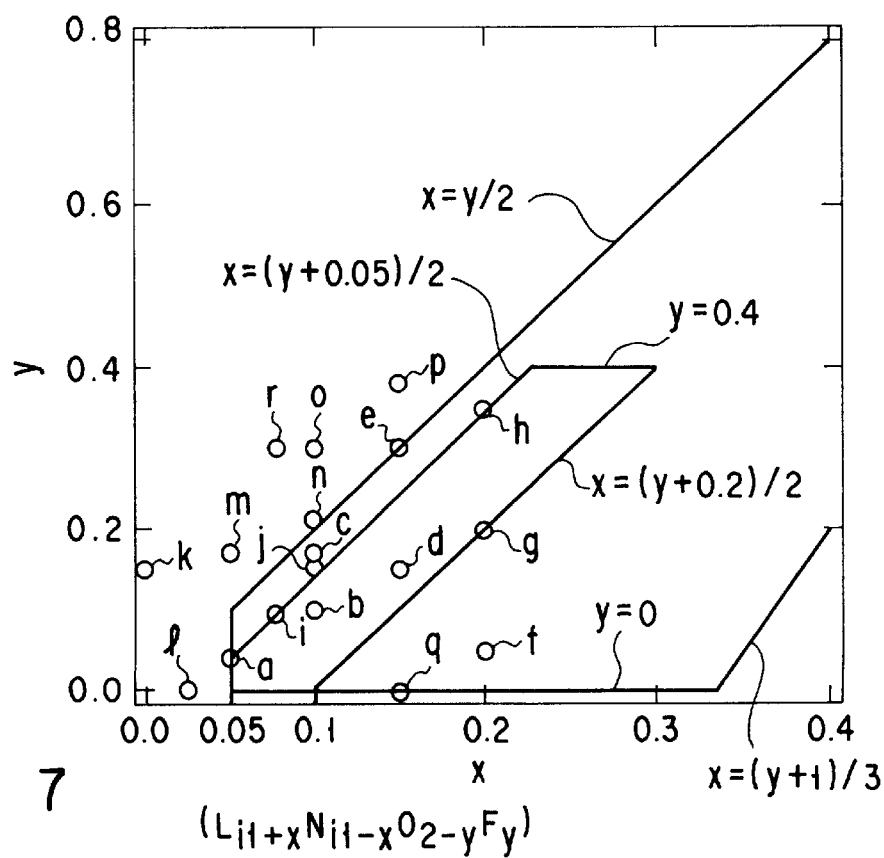
FIG. 7 is a graph showing the composition of a lithium-containing nickel oxide to be included in a battery according to Examples 10 to 36, 38, 44 to 47 and 49 of the present invention.

Table 3 shows composition formulas of lithium-containing nickel oxide to be employed as an active material for the positive electrode in the following Examples 10 to 33, 34 to 36 and 38. FIG. 7 illustrates the distribution of the compositions of these oxides.

TABLE 3

| | x | y | u | $Li_{1+x}Ni_{1-x}O_{u-y}F_y$ |
|---|---|---|---|---|
| a | 0.05 | 0.04 | 2 | $Li_{1.05}Ni_{0.95}O_{1.96}F_{0.04}$ |
| b | 0.1 | 0.1 | 2 | $Li_{1.1}Ni_{0.9}O_{1.9}F_{0.1}$ |
| c | 0.1 | 0.17 | 2 | $Li_{1.1}Ni_{0.9}O_{1.83}F_{0.17}$ |
| d | 0.15 | 0.15 | 2 | $Li_{1.15}Ni_{0.85}O_{1.85}F_{0.15}$ |
| e | 0.15 | 0.3 | 2 | $Li_{1.15}Ni_{0.85}O_{1.7}F_{0.3}$ |
| f | 0.2 | 0.05 | 2 | $Li_{1.2}Ni_{0.8}O_{1.95}F_{0.05}$ |
| g | 0.2 | 0.2 | 2 | $Li_{1.2}Ni_{0.8}O_{1.8}F_{0.2}$ |
| h | 0.2 | 0.35 | 2 | $Li_{1.2}Ni_{0.8}O_{1.65}F_{0.35}$ |
| i | 0.075 | 0.1 | 2 | $Li_{1.075}Ni_{0.925}O_{1.9}F_{0.1}$ |
| j | 0.1 | 0.14 | 1.99 | $Li_{1.1}Ni_{0.9}O_{1.85}F_{0.14}$ |
| k | 0.08 | 0.1 | 2 | $Li_{1.08}Ni_{0.92}O_{1.9}F_{0.1}$ |
| l | 0.15 | 0 | 2 | $Li_{1.15}Ni_{0.85}O_2$ |
| m | 0 | 0.15 | 2 | $LiNiO_{1.85}F_{0.15}$ |
| n | 0.025 | 0 | 2 | $Li_{1.025}Ni_{0.975}O_2$ |
| o | 0.05 | 0.17 | 2 | $Li_{1.05}Ni_{0.95}O_{1.83}F_{0.17}$ |
| p | 0.1 | 0.21 | 2 | $Li_{1.1}Ni_{0.9}O_{1.79}F_{0.21}$ |
| q | 0.1 | 0.3 | 2 | $Li_{1.1}Ni_{0.9}O_{1.7}F_{0.3}$ |
| r | 0.15 | 0.38 | 2 | $Li_{1.15}Ni_{0.85}O_{1.62}F_{0.38}$ |
| s | 0.02 | 0 | 2.02 | $Li_{1.02}Ni_{0.98}O_{2.02}$ |
| t | 0.075 | 0.29 | 1.99 | $Li_{1.075}Ni_{0.925}O_{1.7}F_{0.29}$ |

EXAMPLES 10

($LiOH \cdot H_2O$), $Ni(OH)_2$ and LiF were mixed together at a molar ratio of 1.0:0.95:0.05 to prepare a mixture, which was then kept in 1 atm. of pure oxygen at a temperature of 550° C. for 5 hours and thereafter sintered in 1 atm. of pure oxygen at 650° C. for 20 hours. The resultant sintered mixture was then pulverized in an agate mortar to prepare particles consisting mainly of a lithium-containing nickel oxide represented by $Li_{1.05}Ni_{0.95}O_{1.96}F_{0.04}$. An average particle diameter of the particles thus obtained was 8.5 μm. Meanwhile, a 1 mol/l aqueous mixed solution comprising lithium nitrate and cobalt nitrate was prepared. The molar ratio between lithium and cobalt was set to 1:1. Then, 5 cc of the mixed solution was added to one mole of the above-mentioned particles to allow the mixed solution to be penetrated fully into the particles, and then the particle was baked in a pure oxygen atmosphere of 1 atmosphere at a temperature of 550° C. for 20 hours thereby allowing a film consisting mainly of $LiCoO_2$ to be epitaxially grown on the entire surface of the particles. A thickness of the film was 20 nm. This $LiCoO_2$ was found as being formed of a crystal structure whose c-axis was directed in the same direction as the c-axis of the $Li_{1.05}Ni_{0.95}O_{1.96}F_{0.04}$.

Then, the same procedures as those explained in Example 1 were repeated except the particles obtained above were employed, thereby obtaining a positive electrode. Then, a battery for evaluating the positive electrode as shown in FIG. 5 was assembled by employing this positive electrode, together with the negative electrode, the reference electrode and the nonaqueous electrolyte, each obtained in the same manner as explained in Example 1.

EXAMPLE 11

($LiOH \cdot H_2O$), $Ni(OH)_2$ and LiF were mixed together at a molar ratio of 0.98:0.9:0.12 to prepare a mixture, which was then kept in 1 atm. of pure oxygen at a temperature of 550° C. for 5 hours and thereafter sintered in 1 atm. of pure oxygen at 650° C. for 20 hours. The resultant sintered mixture was then pulverized in an agate mortar to prepare particles consisting mainly of a lithium-containing nickel oxide represented by $Li_{1.1}Ni_{0.9}O_{1.9}F_{0.1}$. An average particle diameter of the particles thus obtained was 8.5 μm. Then, 5 cc of the mixed solution of the same composition as employed in Example 10 was added to one mole of the above-mentioned particles to allow the mixed solution to be penetrated fully into the particles, and then the particle was baked in a pure oxygen atmosphere of 1 atmosphere at a temperature of 550° C. for 20 hours thereby allowing a film consisting mainly of $LiCoO_2$ film to be epitaxially grown on the entire surface of the particles. A thickness of the film was 20 nm. This $LiCoO_2$ was found as being formed of a crystal structure whose c-axis was directed in the same direction as the c-axis of the $Li_{1.1}Ni_{0.9}O_{1.9}F_{0.1}$.

Then, the same procedures as those explained in Example 1 were repeated except the particles obtained above were employed, thereby obtaining a positive electrode. Then, a battery for evaluating the positive electrode as shown in FIG. 5 was assembled by employing this positive electrode, together with the negative electrode, the reference electrode and the nonaqueous electrolyte, each obtained in the same manner as explained in Example 1.

EXAMPLE 12

($LiOH \cdot H_2O$), $Ni(OH)_2$ and LiF were mixed together at a molar ratio of 0.9:0.9:0.2 to prepare a mixture, which was then kept in 1 atm. of pure oxygen at a temperature of 550° C. for 5 hours and thereafter sintered in 1 atm. of pure oxygen at 650° C. for 20 hours. The resultant sintered mixture was then pulverized in an agate mortar to prepare particles consisting mainly of a lithium-containing nickel oxide represented by $Li_{1.1}Ni_{0.9}O_{1.83}F_{0.17}$. An average particle diameter of the particles thus obtained was 8.5 μm. Then, 5 cc of the mixed solution of the same composition as employed in Example 10 was added to one mole of the above-mentioned particles to allow the mixed solution to be penetrated fully into the particles, and then the particle was baked in a pure oxygen atmosphere of 1 atmosphere at a temperature of 550° C. for 20 hours thereby allowing a film consisting mainly of $LiCoO_2$ 20 nm in thickness to be epitaxially grown on the entire surface of the particles. This $LiCoO_2$ was found as being formed of a crystal structure whose c-axis was directed in the same direction as the c-axis of the $Li_{1.1}Ni_{0.9}O_{1.83}F_{0.17}$.

Then, the same procedures as those explained in Example 1 were repeated except the particles obtained above were employed, thereby obtaining a positive electrode. Then, a battery for evaluating the positive electrode as shown in FIG. 5 was assembled by employing this positive electrode, together with the negative electrode, the reference electrode and the nonaqueous electrolyte, each obtained in the same manner as explained in Example 1.

EXAMPLE 13

$(LiOH \cdot H_2O)$, $Ni(OH)_2$ and LiF were mixed together at a molar ratio of 0.98:0.85:0.17 to prepare a mixture, which was then kept in 1 atm. of pure oxygen at a temperature of 550° C. for 5 hours and thereafter sintered in 1 atm. of pure oxygen at 650° C. for 20 hours. The resultant sintered mixture was then pulverized in an agate mortar to prepare particles consisting mainly of a lithium-containing nickel oxide represented by $Li_{1.15}Ni_{0.85}O_{1.85}F_{0.15}$. An average particle diameter of the particles thus obtained was 8.5 µm. Then, 5 cc of the mixed solution of the same composition as employed in Example 10 was added to one mole of the above-mentioned particles to allow the mixed solution to be penetrated fully into the particles, and then the particle was baked in a pure oxygen atmosphere of 1 atmosphere at a temperature of 550° C. for 20 hours thereby allowing a film consisting mainly of $LiCoO_2$ 20 nm in thickness to be epitaxially grown on the entire surface of the particles. This $LiCoO_2$ was found as being formed of a crystal structure whose c-axis was directed in the same direction as the c-axis of the $Li_{1.15}Ni_{0.85}O_{1.85}F_{0.15}$.

Then, the same procedures as those explained in Example 1 were repeated except the particles obtained above were employed, thereby obtaining a positive electrode. Then, a battery for evaluating the positive electrode as shown in FIG. 5 was assembled by employing this positive electrode, together with the negative electrode, the reference electrode and the nonaqueous electrolyte, each obtained in the same manner as explained in Example 1.

EXAMPLE 14

$(LiOH \cdot H_2O)$, $Ni(OH)_2$ and LiF were mixed together at a molar ratio of 0.8:0.85:0.35 to prepare a mixture, which was then kept in 1 atm. of pure oxygen at a temperature of 550° C. for 5 hours and thereafter sintered in 1 atm. of pure oxygen at 650° C. for 20 hours. The resultant sintered mixture was then pulverized in an agate mortar to prepare particles consisting mainly of a lithium-containing nickel oxide represented by $Li_{1.15}Ni_{0.85}O_{1.7}F_{0.3}$. An average particle diameter of the particles thus obtained was 8.5 µm. Then, 5 cc of the mixed solution of the same composition as employed in Example 10 was added to one mole of the above-mentioned particles to allow the mixed solution to be penetrated fully into the particles, and then the particle was baked in a pure oxygen atmosphere of 1 atmosphere at a temperature of 550° C. for 20 hours thereby allowing a film consisting mainly of $LiCoO_2$ 20 nm in thickness to be epitaxially grown on the entire surface of the particles. This $LiCoO_2$ was found as being formed of a crystal structure whose c-axis was directed in the same direction as the c-axis of the $Li_{1.15}Ni_{0.85}O_{1.7}F_{0.3}$.

Then, the same procedures as those explained in Example 1 were repeated except the particles obtained above were employed, thereby obtaining a positive electrode. Then, a battery for evaluating the positive electrode as shown in FIG. 5 was assembled by employing this positive electrode, together with the negative electrode, the reference electrode and the nonaqueous electrolyte, each obtained in the same manner as explained in Example 1.

EXAMPLE 15

$(LiOH \cdot H_2O)$, $Ni(OH)_2$ and LiF were mixed together at a molar ratio of 1.14:0.8:0.06 to prepare a mixture, which was then kept in 1 atm. of pure oxygen at a temperature of 550° C. for 5 hours and thereafter sintered in 1 atm. of pure oxygen at 650° C. for 20 hours. The resultant sintered mixture was then pulverized in an agate mortar to prepare particles consisting mainly of a lithium-containing nickel oxide represented by $Li_{1.2}Ni_{0.8}O_{1.95}F_{0.05}$. An average particle diameter of the particles thus obtained was 8.5 µm. Then, 5 cc of the mixed solution of the same composition as employed in Example 10 was added to one mole of the above-mentioned particles to allow the mixed solution to be penetrated fully into the particles, and then the particle was baked in a pure oxygen atmosphere of 1 atmosphere at a temperature of 550° C. for 20 hours thereby allowing a film consisting mainly of $LiCoO_2$ 20 nm in thickness to be epitaxially grown on the entire surface of the particles. This $LiCoO_2$ was found as being formed of a crystal structure whose c-axis was directed in the same direction as the c-axis of the $Li_{1.2}Ni_{0.8}O_{1.95}F_{0.05}$.

Then, the same procedures as those explained in Example 1 were repeated except the particles obtained above were employed, thereby obtaining a positive electrode. Then, a battery for evaluating the positive electrode as shown in FIG. 5 was assembled by employing this positive electrode, together with the negative electrode, the reference electrode and the nonaqueous electrolyte, each obtained in the same manner as explained in Example 1.

EXAMPLE 16

$(LiOH \cdot H_2O)$, $Ni(OH)_2$ and LiF were mixed together at a molar ratio of 0.95:0.8:0.25 to prepare a mixture, which was then kept in 1 atm. of pure oxygen at a temperature of 550° C. for 5 hours and thereafter sintered in 1 atm. of pure oxygen at 650° C. for 20 hours. The resultant sintered mixture was then pulverized in an agate mortar to prepare particles consisting mainly of a lithium-containing nickel oxide represented by $Li_{1.2}Ni_{0.8}O_{1.8}F_{0.2}$. An average particle diameter of the particles thus obtained was 8.5 µm. Then, 5 cc of the mixed solution of the same composition as employed in Example 10 was added to one mole of the above-mentioned particles to allow the mixed solution to be penetrated fully into the particles, and then the particle was baked in a pure oxygen atmosphere of 1 atmosphere at a temperature of 550° C. for 20 hours thereby allowing a film consisting mainly of $LiCoO_2$ 20 nm in thickness to be epitaxially grown on the entire surface of the particles. This $LiCoO_2$ was found as being formed of a crystal structure whose c-axis was directed in the same direction as the c-axis of the $Li_{1.2}Ni_{0.8}O_{1.8}F_{0.2}$. Then, the same procedures as those explained in Example 1 were repeated except the particles obtained above were employed, thereby obtaining a positive electrode. Then, a battery for evaluating the positive electrode as shown in FIG. 5 was assembled by employing this positive electrode, together with the negative electrode, the reference electrode and the nonaqueous electrolyte, each obtained in the same manner as explained in Example 1.

EXAMPLE 17

(LiOH·H$_2$O), Ni(OH)$_2$ and LiF were mixed together at a molar ratio of 0.8:0.8:0.4 to prepare a mixture, which was then kept in 1 atm. of pure oxygen at a temperature of 550° C. for 5 hours and thereafter sintered in 1 atm. of pure oxygen at 650° C. for 20 hours. The resultant sintered mixture was then pulverized in an agate mortar to prepare particles consisting mainly of a lithium-containing nickel oxide represented by Li$_{1.2}$Ni$_{0.8}$O$_{1.65}$F$_{0.35}$. An average particle diameter of the particles thus obtained was 8.5 μm. Then, 5 cc of the mixed solution of the same composition as employed in Example 10 was added to one mole of the above-mentioned particles to allow the mixed solution to be penetrated fully into the particles, and then the particle was baked in a pure oxygen atmosphere of 1 atmosphere at a temperature of 550° C. for 20 hours thereby allowing a film consisting mainly of LiCoO$_2$ 20 nm in thickness to be epitaxially grown on the entire surface of the particles. This LiCoO$_2$ was found as being formed of a crystal structure whose c-axis was directed in the same direction as the c-axis of the Li$_{1.2}$Ni$_{0.8}$O$_{1.65}$F$_{0.35}$.

Then, the same procedures as those explained in Example 1 were repeated except the particles obtained above were employed, thereby obtaining a positive electrode. Then, a battery for evaluating the positive electrode as shown in FIG. 5 was assembled by employing this positive electrode, together with the negative electrode, the reference electrode and the nonaqueous electrolyte, each obtained in the same manner as explained in Example 1.

COMPARATIVE EXAMPLE 9

(LiOH·H$_2$O) and Ni(OH)$_2$ were mixed together at a molar ratio of 1.15:0.85 to prepare a mixture, which was then kept in 1 atm. of pure oxygen at a temperature of 550° C. for 5 hours and thereafter sintered in 1 atm. of pure oxygen at 650° C. for 20 hours. The resultant sintered mixture was then pulverized in an agate mortar to prepare particles consisting mainly of a lithium-containing nickel oxide represented by Li$_{1.15}$Ni$_{1.85}$O$_2$. An average particle diameter of the particles thus obtained was 8.5 μm. Then, 5 cc of the mixed solution of the same composition as employed in Example 10 was added to one mole of the above-mentioned particles to allow the mixed solution to be penetrated fully into the particles, and then the particle was baked in a pure oxygen atmosphere of 1 atmosphere at a temperature of 550° C. for 20 hours thereby allowing a film consisting mainly of LiCoO$_2$ 20 nm in thickness to be epitaxially grown on the entire surface of the particles. This LiCoO$_2$ was found as being formed of a crystal structure whose c-axis was directed in the same direction as the c-axis of the Li$_{1.15}$Ni$_{0.85}$O$_2$.

Then, the same procedures as those explained in Example 1 were repeated except the particles obtained above were employed, thereby obtaining a positive electrode. Then, a battery for evaluating the positive electrode as shown in FIG. 5 was assembled by employing this positive electrode, together with the negative electrode, the reference electrode and the nonaqueous electrolyte, each obtained in the same manner as explained in Example 1.

COMPARATIVE EXAMPLE 10

(LiOH·H$_2$O), Ni(OH)$_2$ and LiF were mixed together at a molar ratio of 0.85:1.0:0.15 to prepare a mixture, which was then kept in 1 atm. of pure oxygen at a temperature of 550° C. for 5 hours and thereafter sintered in 1 atm. of pure oxygen at 650° C. for 20 hours. The resultant sintered mixture was then pulverized in an agate mortar to prepare particles consisting mainly of a lithium-containing nickel oxide represented by LiNiO$_{1.85}$F$_{0.15}$. An average particle diameter of the particles thus obtained was 8.5 μm. Then, 5 cc of the mixed solution of the same composition as employed in Example 10 was added to one mole of the above-mentioned particles to allow the mixed solution to be penetrated fully into the particles, and then the particle was baked in a pure oxygen atmosphere of 1 atmosphere at a temperature of 550° C. for 20 hours thereby allowing a film consisting mainly of LiCoO$_2$ 20 nm in thickness to be epitaxially grown on the entire surface of the particles. This LiCoO$_2$ was found as being formed of a crystal structure whose c-axis was directed in the same direction as the c-axis of the LiNiO$_{1.85}$F$_{0.15}$.

Then, the same procedures as those explained in Example 1 were repeated except the particles obtained above were employed, thereby obtaining a positive electrode. Then, a battery for evaluating the positive electrode as shown in FIG. 5 was assembled by employing this positive electrode, together with the negative electrode, the reference electrode and the nonaqueous electrolyte, each obtained in the same manner as explained in Example 1.

COMPARATIVE EXAMPLE 11

(LiOH·H$_2$O) and Ni(OH)$_2$ were mixed together at a molar ratio of 1.025:0.975 to prepare a mixture, which was then kept in 1 atm. of pure oxygen at a temperature of 550° C. for 5 hours and thereafter sintered in 1 atm. of pure oxygen at 650° C. for 20 hours. The resultant sintered mixture was then pulverized in an agate mortar to prepare particles consisting mainly of a lithium-containing nickel oxide represented by Li$_{1.025}$Ni$_{0.975}$O$_2$. An average particle diameter of the particles thus obtained was 8.5 μm. Then, 5 cc of the mixed solution of the same composition as employed in Example 10 was added to one mole of the above-mentioned particles to allow the mixed solution to be penetrated fully into the particles, and then the particle was baked in a pure oxygen atmosphere of 1 atmosphere at a temperature of 550° C. for 20 hours thereby allowing a film consisting mainly of LiCoO$_2$ 20 nm in thickness to be epitaxially grown on the entire surface of the particles. This LiCoO$_2$ was found as being formed of a crystal structure whose c-axis was directed in the same direction as the c-axis of the Li$_{1.025}$Ni$_{0.975}$O$_2$.

Then, the same procedures as those explained in Example 1 were repeated except the particles obtained above were employed, thereby obtaining a positive electrode. Then, a battery for evaluating the positive electrode as shown in FIG. 5 was assembled by employing this positive electrode, together with the negative electrode, the reference electrode and the nonaqueous electrolyte, each obtained in the same manner as explained in Example 1.

COMPARATIVE EXAMPLE 12

(LiOH·H$_2$O), Ni(OH)$_2$ and LiF were mixed together at a molar ratio of 0.85:0.95:0.2 to prepare a mixture, which was then kept in 1 atm. of pure oxygen at a temperature of 550° C. for 5 hours and thereafter sintered in 1 atm. of pure oxygen at 650° C. for 20 hours. The resultant sintered mixture was then pulverized in an agate mortar to prepare particles consisting mainly of a lithium-containing nickel oxide represented by Li$_{1.05}$Ni$_{0.95}$O$_{1.83}$F$_{0.17}$. An average particle diameter of the particles thus obtained was 8.5 μm. Then, 5 cc of the mixed solution of the same composition as employed in Example 10 was added to one mole of the above-mentioned particles to allow the mixed solution to be penetrated fully into the particles, and then the particle was baked in a pure oxygen atmosphere of 1 atmosphere at a temperature of 550° C. for 20 hours thereby allowing a film consisting mainly of $LiCoO_2$ 20 nm in thickness to be epitaxially grown on the entire surface of the particles. This $LiCoO_2$ was found as being formed of a crystal structure whose c-axis was directed in the same direction as the c-axis of the $Li_{1.05}Ni_{0.95}O_{1.83}F_{0.17}$.

Then, the same procedures as those explained in Example 1 were repeated except the particles obtained above were employed, thereby obtaining a positive electrode. Then, a battery for evaluating the positive electrode as shown in FIG. 5 was assembled by employing this positive electrode, together with the negative electrode, the reference electrode and the nonaqueous electrolyte, each obtained in the same manner as explained in Example 1.

COMPARATIVE EXAMPLE 13

($LiOH \cdot H_2O$), $Ni(OH)_2$ and LiF were mixed together at a molar ratio of 0.85:0.9:0.25 to prepare a mixture, which was then kept in 1 atm. of pure oxygen at a temperature of 550° C. for 5 hours and thereafter sintered in 1 atm. of pure oxygen at 650° C. for 20 hours. The resultant sintered mixture was then pulverized in an agate mortar to prepare particles consisting mainly of a lithium-containing nickel oxide represented by $Li_{1.1}Ni_{0.9}O_{1.79}F_{0.21}$. An average particle diameter of the particles thus obtained was 8.5 μm. Then, 5 cc of the mixed solution of the same composition as employed in Example 10 was added to one mole of the above-mentioned particles to allow the mixed solution to be penetrated fully into the particles, and then the particle was baked in a pure oxygen atmosphere of 1 atmosphere at a temperature of 550° C. for 20 hours thereby allowing a film consisting mainly of $LiCoO_2$ 20 nm in thickness to be epitaxially grown on the entire surface of the particles. This $LiCoO_2$ was found as being formed of a crystal structure whose c-axis was directed in the same direction as the c-axis of the $Li_{1.1}Ni_{0.9}O_{1.79}F_{0.21}$.

Then, the same procedures as those explained in Example 1 were repeated except the particles obtained above were employed, thereby obtaining a positive electrode. Then, a battery for evaluating the positive electrode as shown in FIG. 5 was assembled by employing this positive electrode, together with the negative electrode, the reference electrode and the nonaqueous electrolyte, each obtained in the same manner as explained in Example 1.

COMPARATIVE EXAMPLE 14

($LiOH \cdot H_2O$), $Ni(OH)_2$ and LiF were mixed together at a molar ratio of 0.75:0.9:0.35 to prepare a mixture, which was then kept in 1 atm. of pure oxygen at a temperature of 550° C. for 5 hours and thereafter sintered in 1 atm. of pure oxygen at 650° C. for 20 hours. The resultant sintered mixture was then pulverized in an agate mortar to prepare particles consisting mainly of a lithium-containing nickel oxide represented by $Li_{1.1}Ni_{0.9}O_{1.7}F_3$. An average particle diameter of the particles thus obtained was 8.5 μm. Then, 5 cc of the mixed solution of the same composition as employed in Example 10 was added to one mole of the above-mentioned particles to allow the mixed solution to be penetrated fully into the particles, and then the particle was baked in a pure oxygen atmosphere of 1 atmosphere at a temperature of 550° C. for 20 hours thereby allowing a film consisting mainly of $LiCoO_2$ 20 nm in thickness to be epitaxially grown on the entire surface of the particles. This $LiCoO_2$ was found as being formed of a crystal structure whose c-axis was directed in the same direction as the c-axis of the $Li_{1.1}Ni_{0.9}O_{1.7}F_{0.3}$.

Then, the same procedures as those explained in Example 1 were repeated except the particles obtained above were employed, thereby obtaining a positive electrode. Then, a battery for evaluating the positive electrode as shown in FIG. 5 was assembled by employing this positive electrode, together with the negative electrode, the reference electrode and the nonaqueous electrolyte, each obtained in the same manner as explained in Example 1.

COMPARATIVE EXAMPLE 15

($LiOH \cdot H_2O$), $Ni(OH)_2$ and LiF were mixed together at a molar ratio of 0.75:0.85:0.4 to prepare a mixture, which was then kept in 1 atm. of pure oxygen at a temperature of 550° C. for 5 hours and thereafter sintered in 1 atm. of pure oxygen at 650° C. for 20 hours. The resultant sintered mixture was then pulverized in an agate mortar to prepare particles consisting mainly of a lithium-containing nickel oxide represented by $Li_{1.15}Ni_{0.85}O_{1.62}F_{0.38}$. An average particle diameter of the particles thus obtained was 8.5 μm. Then, 5 cc of the mixed solution of the same composition as employed in Example 10 was added to one mole of the above-mentioned particles to allow the mixed solution to be penetrated fully into the particles, and then the particle was baked in a pure oxygen atmosphere of 1 atmosphere at a temperature of 550° C. for 20 hours thereby allowing a film consisting mainly of $LiCoO_2$ 20 nm in thickness to be epitaxially grown on the entire surface of the particles. This $LiCoO_2$ was found as being formed of a crystal structure whose c-axis was directed in the same direction as the c-axis of the $Li_{1.15}Ni_{0.85}O_{1.62}F_{0.38}$ Then, the same procedures as those explained in Example 1 were repeated except the particles obtained above were employed, thereby obtaining a positive electrode. Then, a battery for evaluating the positive electrode as shown in FIG. 5 was assembled by employing this positive electrode, together with the negative electrode, the reference electrode and the nonaqueous electrolyte, each obtained in the same manner as explained in Example 1.

The secondary batteries obtained in Examples 10 to 17 and Comparative Examples 9 to 15 were subjected to a repetition of charge/discharge cycle wherein each battery was charged to a depth of 4.2 V with a current of 1 mA followed by the suspension of the charging for 30 minutes, and then discharged down to 3.0 V with a current of 1 mA followed again by the suspension of the discharge for 30 minutes. This charge/discharge cycle was repeated and changes in discharge capacity with the times of the charge/discharge cycle were measured. Table 4 shown below denotes the initial discharge capacity and the discharge capacity at the 100th cycle.

TABLE 4

|  | Composition | Discharge capacity at 1st cycle (mAh/g) | Discharge capacity at 100th cycle (mAh/g) |
|---|---|---|---|
| Example 10 | a | 216 | 144 |
| Example 11 | b | 209 | 134 |

TABLE 4-continued

| | Composition | Discharge capacity at 1st cycle (mAh/g) | Discharge capacity at 100th cycle (mAh/g) |
|---|---|---|---|
| Example 12 | c | 221 | 146 |
| Example 13 | d | 209 | 141 |
| Example 14 | e | 182 | 120 |
| Example 15 | f | 159 | 117 |
| Example 16 | g | 202 | 131 |
| Example 17 | h | 210 | 148 |
| Comparative Example 9 | l | 149 | 120 |
| Comparative Example 10 | m | 214 | 67 |
| Comparative Example 11 | n | 224 | 84 |
| Comparative Example 12 | o | 166 | 57 |
| Comparative Example 13 | p | 206 | 97 |
| Comparative Example 14 | q | 154 | 45 |
| Comparative Example 15 | r | 129 | 41 |

As apparent from Table 4, the batteries according to Examples 10 to 17 were superior than the batteries according to Comparative Examples 9 to 15 in terms of the cycle life. This superiority of the batteries according to Examples 10 to 17 can be ascribed to the fact that, as apparent from Table 3 and FIG. 7, the positive electrode in the batteries according to Examples 10 to 17 contained, as an active material, particles made mainly of a lithium-containing nickel oxide which meets the following equations (4) to (7), at least some of the particles having the film made mainly of $LiCOCO_2$.

$$y/2 \leq x < (y+1)/3 \quad (4)$$

$$y > 0 \quad (5)$$

$$x \geq 0.05 \quad (6)$$

$$1.9 \leq u \leq 2.1 \quad (7)$$

By contrast, the batteries of Comparative Examples 9 to 15 apparently indicated a short cycle life. This poor performance of the batteries according to these Comparative Examples can be ascribed to the fact that the positive electrode in these Comparative Examples contained a lithium-containing nickel oxide whose composition was outside the region defined by the aforementioned equations (4) to (7).

EXAMPLE 18

Particles consisting mainly of a lithium-containing nickel oxide represented by $Li_{1.05}Ni_{0.95}O_{1.96}F_{0.04}$ and having an average particle diameter of 8.5 μm were prepared in the same manner as in Example 10. Meanwhile, a 1 mol/l aqueous mixed solution comprising lithium nitrate and aluminum nitrate was prepared. The molar ratio between lithium and aluminum was set to 1:1. Then, 5 cc of the mixed solution was added to one mole of the above-mentioned particles to allow the mixed solution to be penetrated fully into the particles, and then the particle was baked in a pure oxygen atmosphere of 1 atmosphere at a temperature of 550° C. for 20 hours thereby allowing a film consisting mainly of $LiAlO_2$ 20 nm in thickness to be epitaxially grown on the entire surface of the particles. This $LiAlO_2$ was found as being formed of a crystal structure whose c-axis was directed in the same direction as the c-axis of the $Li_{1.05}Ni_{0.95}O_{1.96}F_{0.04}$.

Then, the same procedures as those explained in Example 1 were repeated except the particles obtained above were employed, thereby obtaining a positive electrode. Then, a battery for evaluating the positive electrode as shown in FIG. 5 was assembled by employing this positive electrode, together with the negative electrode, the reference electrode and the nonaqueous electrolyte, each obtained in the same manner as explained in Example 1.

EXAMPLE 19

Particles consisting mainly of a lithium-containing nickel oxide represented by $Li_{1.1}Ni_{0.9}O_{1.9}F_{0.1}$ and having an average particle diameter of 8.5 μm were prepared in the same manner as in Example 11. Then, 5 cc of the mixed solution having the same composition as that employed in Example 18 was added to one mole of the above-mentioned particles to allow the mixed solution to be penetrated fully into the particles, and then the particle was baked in a pure oxygen atmosphere of 1 atmosphere at a temperature of 550° C. for 20 hours thereby allowing a film consisting mainly of $LiAlO_2$ 20 nm in thickness to be epitaxially grown on the entire surface of the particles. This $LiAlO_2$ was found as being formed of a crystal structure whose c-axis was directed in the same direction as the c-axis of the $Li_{1.1}Ni_{0.9}O_{1.9}F_{0.1}$.

Then, the same procedures as those explained in Example 1 were repeated except the particles obtained above were employed, thereby obtaining a positive electrode. Then, a battery for evaluating the positive electrode as shown in FIG. 5 was assembled by employing this positive electrode, together with the negative electrode, the reference electrode and the nonaqueous electrolyte, each obtained in the same manner as explained in Example 1.

EXAMPLE 20

Particles consisting mainly of a lithium-containing nickel oxide represented by $Li_{1.1}Ni_{0.9}O_{1.83}F_{0.17}$ and having an average particle diameter of 8.5 μm were prepared in the same manner as in Example 12. Then, 5 cc of the mixed solution having the same composition as that employed in Example 18 was added to one mole of the above-mentioned particles to allow the mixed solution to be penetrated fully into the particles, and then the particle was baked in a pure oxygen atmosphere of 1 atmosphere at a temperature of 550° C. for 20 hours thereby allowing a film consisting mainly of $LiAlO_2$ 20 nm in thickness to be epitaxially grown on the entire surface of the particles. This $LiAlO_2$ was found as being formed of a crystal structure whose c-axis was directed in the same direction as the c-axis of the $Li_{1.1}Ni_{0.9}O_{1.83}F_{0.17}$.

Then, the same procedures as those explained in Example 1 were repeated except the particles obtained above were employed, thereby obtaining a positive electrode. Then, a battery for evaluating the positive electrode as shown in FIG. 5 was assembled by employing this positive electrode, together with the negative electrode, the reference electrode and the nonaqueous electrolyte, each obtained in the same manner as explained in Example 1.

EXAMPLE 21

Particles consisting mainly of a lithium-containing nickel oxide represented by $Li_{1.15}Ni_{0.85}O_{1.85}F_{0.15}$ and having an average particle diameter of 8.5 μm were prepared in the same manner as in Example 13. Then, 5 cc of the mixed solution having the same composition as that employed in Example 18 was added to one mole of the above-mentioned particles to allow the mixed solution to be penetrated fully into the particles, and then the particle was baked in a pure oxygen atmosphere of 1 atmosphere at a temperature of 550° C. for 20 hours thereby allowing a film consisting mainly of $LiAlO_2$ 20 nm in thickness to be epitaxially grown on the entire surface of the particles. This $LiAlO_2$ was found as being formed of a crystal structure whose c-axis was directed in the same direction as the c-axis of the $Li_{1.15}Ni_{0.85}O_{1.85}F_{0.15}$.

Then, the same procedures as those explained in Example 1 were repeated except the particles obtained above were employed, thereby obtaining a positive electrode. Then, a battery for evaluating the positive electrode as shown in FIG. 5 was assembled by employing this positive electrode, together with the negative electrode, the reference electrode and the nonaqueous electrolyte, each obtained in the same manner as explained in Example 1.

EXAMPLE 22

Particles consisting mainly of a lithium-containing nickel oxide represented by $Li_{1.15}Ni_{0.85}O_{1.7}F_{0.3}$ and having an average particle diameter of 8.5 μm were prepared in the same manner as in Example 14. Then, 5 cc of the mixed solution having the same composition as that employed in Example 18 was added to one mole of the above-mentioned particles to allow the mixed solution to be penetrated fully into the particles, and then the particle was baked in a pure oxygen atmosphere of 1 atmosphere at a temperature of 550° C. for 20 hours thereby allowing a film consisting mainly of $LiAlO_2$ 20 nm in thickness to be epitaxially grown on the entire surface of the particles. This $LiAlO_2$ was found as being formed of a crystal structure whose c-axis was directed in the same direction as the c-axis of the $Li_{1.15}Ni_{0.85}O_{1.7}F_{0.3}$.

Then, the same procedures as those explained in Example 1 were repeated except the particles obtained above were employed, thereby obtaining a positive electrode. Then, a battery for evaluating the positive electrode as shown in FIG. 4 was assembled by employing this positive electrode, together with the negative electrode, the reference electrode and the nonaqueous electrolyte, each obtained in the same manner as explained in Example 1.

EXAMPLE 23

Particles consisting mainly of a lithium-containing nickel oxide represented by $Li_{1.2}Ni_{0.8}O_{1.95}F_{0.05}$ and having an average particle diameter of 8.5 μm were prepared in the same manner as in Example 15. Then, 5 cc of the mixed solution having the same composition as that employed in Example 18 was added to one mole of the above-mentioned particles to allow the mixed solution to be penetrated fully into the particles, and then the particle was baked in a pure oxygen atmosphere of 1 atmosphere at a temperature of 550° C. for 20 hours thereby allowing a film consisting mainly of $LiAlO_2$ 20 nm in thickness to be epitaxially grown on the entire surface of the particles. This $LiAlO_2$ was found as being formed of a crystal structure whose c-axis was directed in the same direction as the c-axis of the $Li_{1.2}Ni_{0.8}O_{1.95}F_{0.05}$.

Then, the same procedures as those explained in Example 1 were repeated except the particles obtained above were employed, thereby obtaining a positive electrode. Then, a battery for evaluating the positive electrode as shown in FIG. 5 was assembled by employing this positive electrode, together with the negative electrode, the reference electrode and the nonaqueous electrolyte, each obtained in the same manner as explained in Example 1.

EXAMPLE 24

Particles consisting mainly of a lithium-containing nickel oxide represented by $Li_{1.2}Ni_{0.8}O_{1.8}F_{0.2}$ and having an average particle diameter of 8.5 μm were prepared in the same manner as in Example 16. Then, 5 cc of the mixed solution having the same composition as that employed in Example 18 was added to one mole of the above-mentioned particles to allow the mixed solution to be penetrated fully into the particles, and then the particle was baked in a pure oxygen atmosphere of 1 atmosphere at a temperature of 550° C. for 20 hours thereby allowing a film consisting mainly of $LiAlO_2$ 20 nm in thickness to be epitaxially grown on the entire surface of the particles. This $LiAlO_2$ was found as being formed of a crystal structure whose c-axis was directed in the same direction as the c-axis of the $Li_{1.2}Ni_{0.8}O_{1.8}F_{0.2}$.

Then, the same procedures as those explained in Example 1 were repeated except the particles obtained above were employed, thereby obtaining a positive electrode. Then, a battery for evaluating the positive electrode as shown in FIG. 5 was assembled by employing this positive electrode, together with the negative electrode, the reference electrode and the nonaqueous electrolyte, each obtained in the same manner as explained in Example 1.

EXAMPLE 25

Particles consisting mainly of a lithium-containing nickel oxide represented by $Li_{1.2}Ni_{0.8}O_{1.65}F_{0.35}$ and having an average particle diameter of 8.5 μm were prepared in the same manner as in Example 17. Then, 5 cc of the mixed solution having the same composition as that employed in Example 18 was added to one mole of the above-mentioned particles to allow the mixed solution to be penetrated fully into the particles, and then the particle was baked in a pure oxygen atmosphere of 1 atmosphere at a temperature of 550° C. for 20 hours thereby allowing a film consisting mainly of $LiAlO_2$ 20 nm in thickness to be epitaxially grown on the entire surface of the particles. This $LiAlO_2$ was found as being formed of a crystal structure whose c-axis was directed in the same direction as the c-axis of the $Li_{1.2}N_{0.8}O_{1.65}F_{0.35}$.

Then, the same procedures as those explained in Example 1 were repeated except the particles obtained above were employed, thereby obtaining a positive electrode. Then, a battery for evaluating the positive electrode as shown in FIG. 5 was assembled by employing this positive electrode, together with the negative electrode, the reference electrode and the nonaqueous electrolyte, each obtained in the same manner as explained in Example 1.

COMPARATIVE EXAMPLE 16

Particles consisting mainly of a lithium-containing nickel oxide represented by $Li_{1.15}Ni_{0.85}O_2$ and having an average particle diameter of 8.5 μm were prepared in the same manner as in Comparative Example 9. Then, 5 cc of the mixed solution having the same composition as that employed in Example 18 was added to one mole of the above-mentioned particles to allow the mixed solution to be penetrated fully into the particles, and then the particle was baked in a pure oxygen atmosphere of 1 atmosphere at a temperature of 550° C. for 20 hours thereby allowing a film consisting mainly of LiAlO$_2$ 20 nm in thickness to be epitaxially grown on the entire surface of the particles. This LiAlO$_2$ was found as being formed of a crystal structure whose c-axis was directed in the same direction as the c-axis of the Li$_{1.15}$Ni$_{0.85}$O$_2$.

Then, the same procedures as those explained in Example 1 were repeated except the particles obtained above were employed, thereby obtaining a positive electrode. Then, a battery for evaluating the positive electrode as shown in FIG. 5 was assembled by employing this positive electrode, together with the negative electrode, the reference electrode and the nonaqueous electrolyte, each obtained in the same manner as explained in Example 1.

COMPARATIVE EXAMPLE 17

Particles consisting mainly of a lithium-containing nickel oxide represented by LiNiO$_{1.85}$F$_{0.15}$ and having an average particle diameter of 8.5 μm were prepared in the same manner as in Comparative Example 10. Then, 5 cc of the mixed solution having the same composition as that employed in Example 18 was added to one mole of the above-mentioned particles to allow the mixed solution to be penetrated fully into the particles, and then the particle was baked in a pure oxygen atmosphere of 1 atmosphere at a temperature of 550° C. for 20 hours thereby allowing a film consisting mainly of LiAlO$_2$ 20 nm in thickness to be epitaxially grown on the entire surface of the particles. This LiAlO$_2$ was found as being formed of a crystal structure whose c-axis was directed in the same direction as the c-axis of the LiNiO$_{1.85}$F$_{0.15}$.

Then, the same procedures as those explained in Example 1 were repeated except the particles obtained above were employed, thereby obtaining a positive electrode. Then, a battery for evaluating the positive electrode as shown in FIG. 5 was assembled by employing this positive electrode, together with the negative electrode, the reference electrode and the nonaqueous electrolyte, each obtained in the same manner as explained in Example 1.

COMPARATIVE EXAMPLE 18

Particles consisting mainly of a lithium-containing nickel oxide represented by Li$_{1.025}$Ni$_{0.975}$O$_2$ and having an average particle diameter of 8.5 μm were prepared in the same manner as in Comparative Example 11. Then, 5 cc of the mixed solution having the same composition as that employed in Example 18 was added to one mole of the above-mentioned particles to allow the mixed solution to be penetrated fully into the particles, and then the particle was baked in a pure oxygen atmosphere of 1 atmosphere at a temperature of 550° C. for 20 hours thereby allowing a film consisting mainly of LiAlO$_2$ 20 nm in thickness to be epitaxially grown on the entire surface of the particles. This LiAlO$_2$ was found as being formed of a crystal structure whose c-axis was directed in the same direction as the c-axis of the Li$_{1.025}$Ni$_{0.975}$O$_2$.

Then, the same procedures as those explained in Example 1 were repeated except the particles obtained above were employed, thereby obtaining a positive electrode. Then, a battery for evaluating the positive electrode as shown in FIG. 5 was assembled by employing this positive electrode, together with the negative electrode, the reference electrode and the nonaqueous electrolyte, each obtained in the same manner as explained in Example 1.

COMPARATIVE EXAMPLE 19

Particles consisting mainly of a lithium-containing nickel oxide represented by Li$_{1.05}$Ni$_{0.95}$O$_{1.83}$F$_{0.17}$ and having an average particle diameter of 8.5 μm were prepared in the same manner as in Comparative Example 12. Then, 5 cc of the mixed solution having the same composition as that employed in Example 18 was added to one mole of the above-mentioned particles to allow the mixed solution to be penetrated fully into the particles, and then the particle was baked in a pure oxygen atmosphere of 1 atmosphere at a temperature of 550° C. for 20 hours thereby allowing a film consisting mainly of LiAlO$_2$ 20 nm in thickness to be epitaxially grown on the entire surface of the particles. This LiAlO$_2$ was found as being formed of a crystal structure whose c-axis was directed in the same direction as the c-axis of the Li$_{1.05}$Ni$_{0.95}$O$_{1.83}$F$_{0.17}$.

Then, the same procedures as those explained in Example 1 were repeated except the particles obtained above were employed, thereby obtaining a positive electrode. Then, a battery for evaluating the positive electrode as shown in FIG. 5 was assembled by employing this positive electrode, together with the negative electrode, the reference electrode and the nonaqueous electrolyte, each obtained in the same manner as explained in Example 1.

COMPARATIVE EXAMPLE 20

Particles consisting mainly of a lithium-containing nickel oxide represented by Li$_{1.1}$Ni$_{0.9}$O$_{1.79}$F$_{0.21}$ and having an average particle diameter of 8.5 μm were prepared in the same manner as in Comparative Example 13. Then, 5 cc of the mixed solution having the same composition as that employed in Example 18 was added to one mole of the above-mentioned particles to allow the mixed solution to be penetrated fully into the particles, and then the particle was baked in a pure oxygen atmosphere of 1 atmosphere at a temperature of 550° C. for 20 hours thereby allowing a film consisting mainly of LiAlO$_2$ 20 nm in thickness to be epitaxially grown on the entire surface of the particles. This LiAlO$_2$ was found as being formed of a crystal structure whose c-axis was directed in the same direction as the c-axis of the Li$_{1.1}$Ni$_{0.9}$O$_{1.79}$F$_{0.21}$.

Then, the same procedures as those explained in Example 1 were repeated except the particles obtained above were employed, thereby obtaining a positive electrode. Then, a battery for evaluating the positive electrode as shown in FIG. 5 was assembled by employing this positive electrode, together with the negative electrode, the reference electrode and the nonaqueous electrolyte, each obtained in the same manner as explained in Example 1.

COMPARATIVE EXAMPLE 21

Particles consisting mainly of a lithium-containing nickel oxide represented by Li$_{1.1}$Ni$_{0.9}$O$_{1.7}$F$_{0.3}$ and having an average particle diameter of 8.5 μm were prepared in the same manner as in Comparative Example 14. Then, 5 cc of the mixed solution having the same composition as that employed in Example 18 was added to one mole of the above-mentioned particles to allow the mixed solution to be penetrated fully into the particles, and then the particle was baked in a pure oxygen atmosphere of 1 atmosphere at a temperature of 550° C. for 20 hours thereby allowing a film consisting mainly of LiAlO$_2$ 20 nm in thickness to be epitaxially grown on the entire surface of the particles. This LiAlO$_2$ was found as being formed of a crystal structure whose c-axis was directed in the same direction as the c-axis of the Li$_{1.1}$Ni$_{0.9}$O$_{1.7}$F$_{0.3}$.

Then, the same procedures as those explained in Example 1 were repeated except the particles obtained above were employed, thereby obtaining a positive electrode. Then, a battery for evaluating the positive electrode as shown in FIG. 5 was assembled by employing this positive electrode, together with the negative electrode, the reference electrode and the nonaqueous electrolyte, each obtained in the same manner as explained in Example 1.

COMPARATIVE EXAMPLE 22

Particles consisting mainly of a lithium-containing nickel oxide represented by $Li_{1.15}Ni_{0.85}O_{1.62}F_{0.38}$ and having an average particle diameter of 8.5 µm were prepared in the same manner as in Comparative Example 15. Then, 5 cc of the mixed solution having the same composition as that employed in Example 18 was added to one mole of the above-mentioned particles to allow the mixed solution to be penetrated fully into the particles, and then the particle was baked in a pure oxygen atmosphere of 1 atmosphere at a temperature of 550° C. for 20 hours thereby allowing a film consisting mainly of $LiAlO_2$ 20 nm in thickness to be epitaxially grown on the entire surface of the particles. This $LiAlO_2$ was found as being formed of a crystal structure whose c-axis was directed in the same direction as the c-axis of the $Li_{1.15}Ni_{0.85}O_{1.62}F_{0.38}$.

Then, the same procedures as those explained in Example 1 were repeated except the particles obtained above were employed, thereby obtaining a positive electrode. Then, a battery for evaluating the positive electrode as shown in FIG. 5 was assembled by employing this positive electrode, together with the negative electrode, the reference electrode and the nonaqueous electrolyte, each obtained in the same manner as explained in Example 1.

The secondary batteries obtained in Examples 18 to 25 and Comparative Examples 16 to 22 were subjected to a repetition of charge/discharge cycle wherein each battery was charged to a depth of 4.2 V with a current of 1 mA followed by the suspension of the charging for 30 minutes, and then discharged down to 3.0 V with a current of 1 mA followed again by the suspension of the discharge for 30 minutes. This charge/discharge cycle was repeated and changes in discharge capacity with the times of the charge/discharge cycle were measured. Table 5 shown below denotes the initial discharge capacity and the discharge capacity at the 100th cycle.

TABLE 5

|  | Composition | Discharge capacity at 1st cycle (mAh/g) | Discharge capacity at 100th cycle (mAh/g) |
| --- | --- | --- | --- |
| Example 18 | a | 217 | 144 |
| Example 19 | b | 215 | 128 |
| Example 20 | c | 220 | 147 |
| Example 21 | d | 207 | 141 |
| Example 22 | e | 187 | 118 |
| Example 23 | f | 157 | 112 |
| Example 24 | g | 201 | 124 |
| Example 25 | h | 205 | 147 |
| Comparative Example 16 | l | 147 | 118 |
| Comparative Example 17 | m | 215 | 70 |
| Comparative Example 18 | n | 225 | 87 |
| Comparative Example 19 | o | 168 | 59 |
| Comparative Example 20 | p | 205 | 96 |
| Comparative Example 21 | q | 158 | 48 |
| Comparative Example 22 | r | 129 | 40 |

As apparent from Table 5, the batteries according to Examples 18 to 25 were superior than the batteries according to Comparative Examples 16 to 22, in term of the cycle life. This superiority of the batteries according to Examples 18 to 25 can be ascribed to the fact that, as apparent from Table 3 and FIG. 7, the positive electrode in the batteries according to Examples 18 to 25 contained, as an active material, particles made mainly of a lithium-containing nickel oxide which meets the aforementioned equations (4) to (7), at least some of the particle having the film made mainly of $LiAlO_2$.

By contrast, the batteries of Comparative Examples 16 to 22 apparently indicated a short cycle life. This poor performance of the batteries according to these Comparative Examples can be ascribed to the fact that the positive electrode in these Comparative Examples contained particles mainly formed of a lithium-containing nickel oxide whose composition was outside the region defined by the aforementioned equations (4) to (7).

EXAMPLE 26

Particles consisting mainly of a lithium-containing nickel oxide represented by $Li_{1.05}Ni_{0.95}O_{1.96}F_{0.04}$ and having an average particle diameter of 8.5 µm were prepared in the same manner as in Example 10. Meanwhile, a 1 mol/l aqueous mixed solution comprising lithium nitrate and manganese nitrate was prepared. The molar ratio between lithium and manganese was set to 2:1. Then, 5 cc of the mixed solution was added to one mole of the above-mentioned particles to allow the mixed solution to be penetrated fully into the particles, and then the particle was baked in a pure oxygen atmosphere of 1 atmosphere at a temperature of 550° C. for 20 hours thereby allowing a film consisting mainly of $Li_2MnO_3$ film 20 nm in thickness to be epitaxially grown on the entire surface of the particles. This $Li_2MnO_3$ was found as being formed of a crystal structure whose c-axis was directed in the same direction as the c-axis of the $Li_{1.05}Ni_{0.95}O_{1.96}F_{0.04}$.

Then, the same procedures as those explained in Example 1 were repeated except the particles obtained above were employed, thereby obtaining a positive electrode. Then, a battery for evaluating the positive electrode as shown in FIG. 5 was assembled by employing this positive electrode, together with the negative electrode, the reference electrode and the nonaqueous electrolyte, each obtained in the same manner as explained in Example 1.

EXAMPLE 27

Particles consisting mainly of a lithium-containing nickel oxide represented by $Li_{1.1}Ni_{0.9}O_{1.0}F_{0.1}$ and having an average particle diameter of 8.5 µm were prepared in the same manner as in Example 11. Then, 5 cc of the mixed solution having the same composition as that employed in Example 26 was added to one mole of the above-mentioned particles to allow the mixed solution to be penetrated fully into the particles, and then the particle was baked in a pure oxygen atmosphere of 1 atmosphere at a temperature of 550° C. for 20 hours thereby allowing a film consisting mainly of $Li_2MnO_3$ 20 nm in thickness to be epitaxially grown on the entire surface of the particles. This $Li_2MnO_3$ was found as being formed of a crystal structure whose c-axis was directed in the same direction as the c-axis of the $Li_{1.1}Ni_{0.9}O_{1.9}F_{0.1}$.

Then, the same procedures as those explained in Example 1 were repeated except the particles obtained above were employed, thereby obtaining a positive electrode. Then, a battery for evaluating the positive electrode as shown in FIG. 5 was assembled by employing this positive electrode, together with the negative electrode, the reference electrode and the nonaqueous electrolyte, each obtained in the same manner as explained in Example 1.

EXAMPLE 28

Particles consisting mainly of a lithium-containing nickel oxide represented by $Li_{1.1}Ni_{0.9}O_{1.83}F_{0.17}$ and having an average particle diameter of 8.5 μm were prepared in the same manner as in Example 12. Then, 5 cc of the mixed solution having the same composition as that employed in Example 26 was added to one mole of the above-mentioned particles to allow the mixed solution to be penetrated fully into the particles, and then the particle was baked in a pure oxygen atmosphere of 1 atmosphere at a temperature of 550° C. for 20 hours thereby allowing a film consisting mainly of $Li_2MnO_3$ 20 nm in thickness to be epitaxially grown on the entire surface of the particles. This $Li_2MnO_3$ was found as being formed of a crystal structure whose c-axis was directed in the same direction as the c-axis of the $Li_{1.1}Ni_{0.9}O_{1.83}F_{0.17}$.

Then, the same procedures as those explained in Example 1 were repeated except the particles obtained above were employed, thereby obtaining a positive electrode. Then, a battery for evaluating the positive electrode as shown in FIG. 5 was assembled by employing this positive electrode, together with the negative electrode, the reference electrode and the nonaqueous electrolyte, each obtained in the same manner as explained in Example 1.

EXAMPLE 29

Particles consisting mainly of a lithium-containing nickel oxide represented by $Li_{1.15}Ni_{0.85}O_{1.85}F_{0.15}$ and having an average particle diameter of 8.5 μm were prepared in the same manner as in Example 13. Then, 5 cc of the mixed solution having the same composition as that employed in Example 26 was added to one mole of the above-mentioned particles to allow the mixed solution to be penetrated fully into the particles, and then the particle was baked in a pure oxygen atmosphere of 1 atmosphere at a temperature of 550° C. for 20 hours thereby allowing a film consisting mainly of $Li_2MnO_3$ 20 nm in thickness to be epitaxially grown on the entire surface of the particles. This $Li_2MnO_3$ was found as being formed of a crystal structure whose c-axis was directed in the same direction as the c-axis of the $Li_{1.15}Ni_{0.85}O_{1.85}F_{0.15}$.

Then, the same procedures as those explained in Example 1 were repeated except the particles obtained above were employed, thereby obtaining a positive electrode. Then, a battery for evaluating the positive electrode as shown in FIG. 5 was assembled by employing this positive electrode, together with the negative electrode, the reference electrode and the nonaqueous electrolyte, each obtained in the same manner as explained in Example 1.

EXAMPLE 30

Particles consisting mainly of a lithium-containing nickel oxide represented by $Li_{1.15}Ni_{0.85}O_{1.7}F_{0.3}$ and having an average particle diameter of 8.5 μm were prepared in the same manner as in Example 14. Then, 5 cc of the mixed solution having the same composition as that employed in Example 26 was added to one mole of the above-mentioned particles to allow the mixed solution to be penetrated fully into the particles, and then the particle was baked in a pure oxygen atmosphere of 1 atmosphere at a temperature of 550° C. for 20 hours thereby allowing a film consisting mainly of $Li_2MnO_3$ 20 nm in thickness to be epitaxially grown on the entire surface of the particles. This $Li_2MnO_3$ was found as being formed of a crystal structure whose c-axis was directed in the same direction as the c-axis of the $Li_{1.15}Ni_{0.85}O_{1.7}F_{0.3}$.

Then, the same procedures as those explained in Example 1 were repeated except the particles obtained above were employed, thereby obtaining a positive electrode. Then, a battery for evaluating the positive electrode as shown in FIG. 5 was assembled by employing this positive electrode, together with the negative electrode, the reference electrode and the nonaqueous electrolyte, each obtained in the same manner as explained in Example 1.

EXAMPLE 31

Particles consisting mainly of a lithium-containing nickel oxide represented by $Li_{1.2}Ni_{0.8}O_{1.95}F_{0.05}$ and having an average particle diameter of 8.5 μm were prepared in the same manner as in Example 15. Then, 5 cc of the mixed solution having the same composition as that employed in Example 26 was added to one mole of the above-mentioned particles to allow the mixed solution to be penetrated fully into the particles, and then the particle was baked in a pure oxygen atmosphere of 1 atmosphere at a temperature of 550° C. for 20 hours thereby allowing a film consisting mainly of $Li_2MnO_3$ 20 nm in thickness to be epitaxially grown on the entire surface of the particles. This $Li_2MnO_3$ was found as being formed of a crystal structure whose c-axis was directed in the same direction as the c-axis of the $Li_{1.2}Ni_{0.8}O_{1.95}F_{0.05}$.

Then, the same procedures as those explained in Example 1 were repeated except the particles obtained above were employed, thereby obtaining a positive electrode. Then, a battery for evaluating the positive electrode as shown in FIG. 5 was assembled by employing this positive electrode, together with the negative electrode, the reference electrode and the nonaqueous electrolyte, each obtained in the same manner as explained in Example 1.

EXAMPLE 32

Particles consisting mainly of a lithium-containing nickel oxide represented by $Li_{1.2}Ni_{0.8}O_{1.8}F_{0.2}$ and having an average particle diameter of 8.5 μm were prepared in the same manner as in Example 16. Then, 5 cc of the mixed solution having the same composition as that employed in Example 26 was added to one mole of the above-mentioned particles to allow the mixed solution to be penetrated fully into the particles, and then the particle was baked in a pure oxygen atmosphere of 1 atmosphere at a temperature of 550° C. for 20 hours thereby allowing a film consisting mainly of $Li_2MnO_3$ 20 nm in thickness to be epitaxially grown on the entire surface of the particles. This $Li_2MnO_3$ was found as being formed of a crystal structure whose c-axis was directed in the same direction as the c-axis of the $Li_{1.2}Ni_{0.8}O_{1.8}F_{0.2}$.

Then, the same procedures as those explained in Example 1 were repeated except the particles obtained above were employed, thereby obtaining a positive electrode. Then, a battery for evaluating the positive electrode as shown in FIG. 5 was assembled by employing this positive electrode, together with the negative electrode, the reference electrode and the nonaqueous electrolyte, each obtained in the same manner as explained in Example 1.

EXAMPLE 33

Particles consisting mainly of a lithium-containing nickel oxide represented by $Li_{1.2}Ni_{0.8}O_{1.65}F_{0.35}$ and having an average particle diameter of 8.5 μm were prepared in the same manner as in Example 17. Then, 5 cc of the mixed solution having the same composition as that employed in Example 26 was added to one mole of the above-mentioned particles to allow the mixed solution to be penetrated fully into the particles, and then the particle was baked in a pure oxygen atmosphere of 1 atmosphere at a temperature of 550° C. for 20 hours thereby allowing a film consisting mainly of $Li_2MnO_3$ 20 nm in thickness to be epitaxially grown on the entire surface of the particles. This $Li_2MnO_3$ was found as being formed of a crystal structure whose c-axis was directed in the same direction as the c-axis of the $Li_{1.2}Ni_{0.8}O_{1.65}F_{0.35}$.

Then, the same procedures as those explained in Example 1 were repeated except the particles obtained above were employed, thereby obtaining a positive electrode. Then, a battery for evaluating the positive electrode as shown in FIG. 5 was assembled by employing this positive electrode, together with the negative electrode, the reference electrode and the nonaqueous electrolyte, each obtained in the same manner as explained in Example 1.

COMPARATIVE EXAMPLE 23

Particles consisting mainly of a lithium-containing nickel oxide represented by $Li_{1.15}Ni_{0.85}O_2$ and having an average particle diameter of 8.5 μm were prepared in the same manner as in Comparative Example 9. Then, 5 cc of the mixed solution having the same composition as that employed in Example 26 was added to one mole of the above-mentioned particles to allow the mixed solution to be penetrated fully into the particles, and then the particle was baked in a pure oxygen atmosphere of 1 atmosphere at a temperature of 550° C. for 20 hours thereby allowing a film consisting mainly of $Li_2MnO_3$ 20 nm in thickness to be epitaxially grown on the. entire surface of the particles. This $Li_2MnO_3$ was found as being formed of a crystal structure whose c-axis was directed in the same direction as the c-axis of the $Li_{1.15}Ni_{0.85}O_2$.

Then, the same procedures as those explained in Example 1 were repeated except the particles obtained above were employed, thereby obtaining a positive electrode. Then, a battery for evaluating the positive electrode as shown in FIG. 5 was assembled by employing this positive electrode, together with the negative electrode, the reference electrode and the nonaqueous electrolyte, each obtained in the same manner as explained in Example 1.

COMPARATIVE EXAMPLE 24

Particles consisting mainly of a lithium-containing nickel oxide represented by $LiNiO_{1.85}F_{0.15}$ and having an average particle diameter of 8.5 μm were prepared in the same manner as in Comparative Example 10. Then, 5 cc of the mixed solution having the same composition as that employed in Example 26 was added to one mole of the above-mentioned particles to allow the mixed solution to be penetrated fully into the particles, and then the particle was baked in a pure oxygen atmosphere of 1 atmosphere at a temperature of 550° C. for 20 hours thereby allowing a film consisting mainly of $Li_2MnO_3$ 20 nm in thickness to be epitaxially grown on the entire surface of the particles. This $Li_2MnO_3$ was found as being formed of a crystal structure whose c-axis was directed in the same direction as the c-axis of the $LiNiO_{1.85}F_{0.15}$.

Then, the same procedures as those explained in Example 1 were repeated except the particles obtained above were employed, thereby obtaining a positive electrode. Then, a battery for evaluating the positive electrode as shown in FIG. 5 was assembled by employing this positive electrode, together with the negative electrode, the reference electrode and the nonaqueous electrolyte, each obtained in the same manner as explained in Example 1.

COMPARATIVE EXAMPLE 25

Particles consisting mainly of a lithium-containing nickel oxide represented by $Li_{1.025}Ni_{0.975}O_2$ and having an average particle diameter of 8.5 μm were prepared in the same manner as in Comparative Example 11. Then, 5 cc of the mixed solution having the same composition as that employed in Example 26 was added to one mole of the above-mentioned particles to allow the mixed solution to be penetrated fully into the particles, and then the particle was baked in a pure oxygen atmosphere of 1 atmosphere at a temperature of 550° C. for 20 hours thereby allowing a film consisting mainly of $Li_2MnO_3$ 20 nm in thickness to be epitaxially grown on the entire surface of the particles. This $Li_2MnO_3$ was found as being formed of a crystal structure whose c-axis was directed in the same direction as the c-axis of the $Li_{1.025}Ni_{0.975}O_2$.

Then, the same procedures as those explained in Example 1 were repeated except the particles obtained above were employed, thereby obtaining a positive electrode. Then, a battery for evaluating the positive electrode as shown in FIG. 5 was assembled by employing this positive electrode, together with the negative electrode, the reference electrode and the nonaqueous electrolyte, each obtained in the same manner as explained in Example 1.

COMPARATIVE EXAMPLE 26

Particles consisting mainly of a lithium-containing nickel oxide represented by $Li_{1.05}Ni_{0.95}O_{1.83}F_{0.17}$ and having an average particle diameter of 8.5 μm were prepared in the same manner as in Comparative Example 12. Then, 5 cc of the mixed solution having the same composition as that employed in Example 26 was added to one mole of the above-mentioned particles to allow the mixed solution to be penetrated fully into the particles, and then the particle was baked in a pure oxygen atmosphere of 1 atmosphere at a temperature of 550° C. for 20 hours thereby allowing a film consisting mainly of $Li_2MnO_3$ 20 nm in thickness to be epitaxially grown on the entire surface of the particles. This $Li_2MnO_3$ was found as being formed of a crystal structure whose c-axis was directed in the same direction as the c-axis of the $Li_{1.05}Ni_{0.95}O_{1.83}F_{0.17}$.

Then, the same procedures as those explained in Example 1 were repeated except the particles obtained above were employed, thereby obtaining a positive electrode. Then, a battery for evaluating the positive electrode as shown in FIG. 5 was assembled by employing this positive electrode, together with the negative electrode, the reference electrode and the nonaqueous electrolyte, each obtained in the same manner as explained in Example 1.

COMPARATIVE EXAMPLE 27

Particles consisting mainly of a lithium-containing nickel oxide represented by $Li_{1.1}Ni_{0.9}O_{1.79}F_{0.21}$ and having an average particle diameter of 8.5 μm were prepared in the same manner as in Comparative Example 13. Then, 5 cc of the mixed solution having the same composition as that employed in Example 26 was added to one mole of the above-mentioned particles to allow the mixed solution to be penetrated fully into the particles, and then the particle was baked in a pure oxygen atmosphere of 1 atmosphere at a temperature of 550° C. for 20 hours thereby allowing a film consisting mainly of $Li_2MnO_3$ 20 nm in thickness to be epitaxially grown on the entire surface of the particles. This $Li_2MnO_3$ was found as being formed of a crystal structure whose c-axis was directed in the same direction as the c-axis of the $Li_{1.1}Ni_{0.9}O_{1.79}F_{0.21}$.

Then, the same procedures as those explained in Example 1 were repeated except the particles obtained above were employed, thereby obtaining a positive. electrode. Then, a battery for evaluating the positive electrode as shown in FIG. 5 was assembled by employing this positive electrode, together with the negative electrode, the reference electrode and the nonaqueous electrolyte, each obtained in the same manner as explained in Example 1.

COMPARATIVE EXAMPLE 28

Particles consisting mainly of a lithium-containing nickel oxide represented by $Li_{1.1}Ni_{0.9}O_{1.7}F_{0.3}$ and having an average particle diameter of 8.5 μm were prepared in the same manner as in Comparative Example 14. Then, 5 cc of the mixed solution having the same composition as that employed in Example 26 was added to one mole of the above-mentioned particles to allow the mixed solution to be penetrated fully into the particles, and then the particle was baked in a pure oxygen atmosphere of 1 atmosphere at a temperature of 550° C. for 20 hours thereby allowing a film consisting mainly of $Li_2MnO_3$ 20 nm in thickness to be epitaxially grown on the entire surface of the particles. This $Li_2MnO_3$ was found as being formed of a crystal structure whose c-axis was directed in the same direction as the c-axis of the $Li_{1.1}Ni_{0.9}O_{1.7}F_{0.3}$.

Then, the same procedures as those explained in Example 1 were repeated except the particles obtained above were employed, thereby obtaining a positive electrode. Then, a battery for evaluating the positive electrode as shown in FIG. 5 was assembled by employing this positive electrode, together with the negative electrode, the reference electrode and the nonaqueous electrolyte, each obtained in the same manner as explained in Example 1.

COMPARATIVE EXAMPLE 29

Particles consisting mainly of a lithium-containing nickel oxide represented by $Li_{1.15}Ni_{0.85}O_{1.62}F_{0.38}$ and having an average particle diameter of 8.5 μm were prepared in the same manner as in Comparative Example 15. Then, 5 cc of the mixed solution having the same composition as that employed in Example 26 was added to one mole of the above-mentioned particles to allow the mixed solution to be penetrated fully into the particles, and then the particle was baked in a pure oxygen atmosphere of 1 atmosphere at a temperature of 550° C. for 20 hours thereby allowing a film consisting mainly of $Li_2MnO_3$ 20 nm in thickness to be epitaxially grown on the entire surface of the particles. This $Li_2MnO_3$ was found as being formed of a crystal structure whose c-axis was directed in the same direction as the c-axis of the $Li_{1.15}Ni_{0.85}O_{1.62}F_{0.38}$.

Then, the same procedures as those explained in Example 1 were repeated except the particles obtained above were employed, thereby obtaining a positive electrode. Then, a battery for evaluating the positive electrode as shown in FIG. 5 was assembled by employing this positive electrode, together with the negative electrode, the reference electrode and the nonaqueous electrolyte, each obtained in the same manner as explained in Example 1.

The secondary batteries obtained in Examples 26 to 33 and Comparative Examples 23 to 29 were subjected to a repetition of charge/discharge cycle wherein each battery was charged to a depth of 4.2 V with a current of 1 mA followed by the suspension of the charging for 30 minutes, and then discharged down to 3.0 V with a current of 1 mA followed again by the suspension of the discharge for 30 minutes. This charge/discharge cycle was repeated and changes in discharge capacity with the times of the charge/discharge cycle were measured. Table 6 shown below denotes the initial discharge capacity and the discharge capacity at the 100th cycle.

TABLE 6

|  | Composition | Discharge capacity at 1st cycle (mAh/g) | Discharge capacity at 100th cycle (mAh/g) |
| --- | --- | --- | --- |
| Example 26 | a | 219 | 150 |
| Example 27 | b | 216 | 128 |
| Example 28 | c | 218 | 150 |
| Example 29 | d | 206 | 143 |
| Example 30 | e | 192 | 121 |
| Example 31 | f | 159 | 115 |
| Example 32 | g | 200 | 127 |
| Example 33 | h | 207 | 146 |
| Comparative Example 23 | l | 148 | 112 |
| Comparative Example 24 | m | 216 | 68 |
| Comparative Example 25 | n | 227 | 90 |
| Comparative Example 26 | o | 171 | 59 |
| Comparative Example 27 | p | 206 | 93 |
| Comparative Example 28 | q | 159 | 47 |
| Comparative Example 29 | r | 131 | 44 |

As apparent from Table 6, the batteries according to Examples 26 to 33 were superior than the batteries according to Comparative Examples 23 to 29 in terms of the cycle life. This superiority of the batteries according to Examples 26 to 33 can be ascribed to the fact that, as apparent from Table 3 and FIG. 7, the positive electrode in the batteries according to Examples 26 to 33 contained, as an active material, particles made mainly of a lithium-containing nickel oxide which meets the aforementioned equations (4) to (7), at least some of the particles having the film made mainly of $Li_2MnO_3$.

By contrast, the batteries of Comparative Examples 23 to 29 apparently indicated a short cycle life. This poor performance of the batteries according to these Comparative Examples can be ascribed to the fact that the positive electrode in these Comparative Examples contained particles mainly formed of a lithium-containing nickel oxide whose composition was outside the region defined by the aforementioned equations (4) to (7).

EXAMPLE 34

$(LiOH \cdot H_2O)$, $Ni(OH)_2$ and LiF were mixed together at a molar ratio of 0.98:0.92:0.1 to prepare a mixture, which was then kept in 1 atm. of pure oxygen at a temperature of 550° C. for 5 hours and thereafter sintered in 1 atm. of pure oxygen at 650° C. for 20 hours. The resultant sintered mixture was then pulverized in an agate mortar to prepare particles consisting mainly of a lithium-containing nickel oxide represented by $Li_{1.075}Ni_{0.925}O_{1.9}F_{0.1}$. An average particle diameter of 8.5 μm. Meanwhile, a 1 mol/l aqueous mixed solution comprising lithium nitrate and cobalt nitrate was prepared. The molar ratio between lithium and cobalt was set to 1:1. Then, 5 cc of the mixed solution was added to one mole of the above-mentioned particles to allow the mixed solution to be penetrated fully into the particles, and then the particle was baked in a pure oxygen atmosphere of 1 atmosphere at a temperature of 550° C. for 20 hours thereby allowing a film consisting mainly of $LiCoO_2$ 10 nm in thickness to be epitaxially grown on the entire surface of the particles. This $LiCoO_2$ was found as being formed of a crystal structure whose c-axis was directed in the same direction as the c-axis of the $Li_{1.075}Ni_{0.925}O_{1.9}F_{0.1}$.

Then, the same procedures as those explained in Example 1 were repeated except the particles obtained above were employed, thereby obtaining a positive electrode. Then, a battery for evaluating the positive electrode as shown in FIG. 5 was assembled by employing this positive electrode, together with the negative electrode, the reference electrode and the nonaqueous electrolyte, each obtained in the same manner as explained in Example 1.

EXAMPLE 35

Particles consisting mainly of a lithium-containing nickel oxide represented by $Li_{1.075}Ni_{0.925}O_{1.9}F_{0.1}$ and having an average particle diameter of 8.5 μm were prepared in the same manner as in Example 34. Meanwhile, a 0.4 mol/l aqueous mixed solution comprising lithium nitrate and cobalt nitrate was prepared. The molar ratio between lithium and cobalt was set to 1:1. Then, 5 cc of the mixed solution was added to one mole of the above-mentioned particles to allow the mixed solution to be penetrated fully into the particles, and then the particle was baked in a pure oxygen atmosphere of 1 atmosphere at a temperature of 550° C. for 20 hours thereby allowing a film consisting mainly of $LiCoO_2$ 4 nm in thickness to be epitaxially grown on the entire surface of the particles. This $LiCoO_2$ was found as being formed of a crystal structure whose c-axis was directed in the same direction as the c-axis of the $Li_{1.075}Ni_{0.925}O_{1.9}F_{0.1}$.

Then, the same procedures as those explained in Example 1 were repeated except the particles obtained above were employed, thereby obtaining a positive electrode. Then, a battery for evaluating the positive electrode as shown in FIG. 5 was assembled by employing this positive electrode, together with the negative electrode, the reference electrode and the nonaqueous electrolyte, each obtained in the same manner as explained in Example 1.

EXAMPLE 36

Particles consisting mainly of a lithium-containing nickel oxide represented by $Li_{1.075}Ni_{0.925}O_{1.9}F_{0.1}$ and having an average particle diameter of 8.5 μm were prepared in the same manner as in Example 34. Meanwhile, a 2 mol/l aqueous mixed solution comprising lithium nitrate and cobalt nitrate was prepared. The molar ratio between lithium and cobalt was set to 1:1. Then, 5 cc of the mixed solution was added to one mole of the above-mentioned particles to allow the mixed solution to be penetrated fully into the particles, and then the particle was baked in a pure oxygen atmosphere of 1 atmosphere at a temperature of 550° C. for 20 hours thereby allowing a film consisting mainly of $LiCoO_2$ 20 nm in thickness to be epitaxially grown on the entire surface of the particles. This $LiCoO_2$ film was found as being formed of a crystal structure whose c-axis was directed in the same direction as the c-axis of the $Li_{1.075}Ni_{0.925}O_{1.9}F_{0.1}$.

Then, the same procedures as those explained in Example 1 were repeated except the particles obtained above were employed, thereby obtaining a positive electrode. Then, a battery for evaluating the positive electrode as shown in FIG. 5 was assembled by employing this positive electrode, together with the negative electrode, the reference electrode and the nonaqueous electrolyte, each obtained in the same manner as explained in Example 1.

EXAMPLE 37

Particles consisting mainly of a lithium-containing nickel oxide represented by $Li_{1.075}Ni_{0.925}O_{1.9}F_{0.1}$ and having an average particle diameter of 8.5 μm were prepared in the same manner as in Example 34.

Then, the same procedures as those explained in Example 1 were repeated except the particles obtained above were employed, thereby obtaining a positive electrode. Then, a battery for evaluating the positive electrode as shown in FIG. 5 was assembled by employing this positive electrode, together with the negative electrode, the reference electrode and the nonaqueous electrolyte, each obtained in the same manner as explained in Example 1.

COMPARATIVE EXAMPLE 30

$(LiOH \cdot H_2O)$ and $Ni(OH)_2$ were mixed together at a molar ratio of 1.03:0.97 to prepare a mixture, which was then kept in 1 atm. of pure oxygen at a temperature of 550° C. for 5 hours and thereafter sintered in 1 atm. of pure oxygen at 650° C. for 20 hours. The resultant sintered mixture was then pulverized in an agate mortar to prepare particles consisting mainly of a lithium-containing nickel oxide represented by $Li_{1.02}Ni_{0.98}O_{2.02}$. An average particle diameter of the particles thus obtained was 8.5 μm. Then, 5 cc of the aqueous solution of the same composition as that employed in Example 34 for forming a film was added to one mole of the above-mentioned particles to allow the mixed solution to be penetrated fully into the particles, and then the particle was baked in a pure oxygen atmosphere of 1 atmosphere at a temperature of 550° C. for 20 hours thereby allowing a film consisting mainly of $LiCoO_2$ 10 nm in thickness to be epitaxially grown on the entire surface of the particles. This $LiCoO_2$ was found as being formed of a crystal structure whose c-axis was directed in the same direction as the c-axis of the $Li_{1.02}Ni_{0.98}O_{2.02}$.

Then, the same procedures as those explained in Example 1 were repeated except the particles obtained above were employed, thereby obtaining a positive electrode. Then, a battery for evaluating the positive electrode as shown in FIG. 5 was assembled by employing this positive electrode, together with the negative electrode, the reference electrode and the nonaqueous electrolyte, each obtained in the same manner as explained in Example 1.

COMPARATIVE EXAMPLE 31

$(LiOH \cdot H_2O)$, $Ni(OH)_2$ and LiF were mixed together at a molar ratio of 0.78:0.92:0.3 to prepare a mixture, which was then kept in 1 atm. of pure oxygen at a temperature of 550° C. for 5 hours and thereafter sintered in 1 atm. of pure oxygen at 650° C. for 20 hours. The resultant sintered mixture was then pulverized in an agate mortar to prepare particles consisting mainly of a lithium-containing nickel oxide represented by $Li_{1.075}Ni_{0.925}O_{1.7}F_{0.29}$. An average particle diameter of the particles thus obtained was 8.5 μm. Then, 5 cc of the aqueous solution of the same composition as that employed in Example 34 for forming a film was added to one mole of the above-mentioned particles to allow the mixed solution to be penetrated fully into the particles, and then the particle was baked in a pure oxygen atmosphere of 1 atmosphere at a temperature of 550° C. for 20 hours thereby allowing a film consisting mainly of $LiCoO_2$ 10 nm in thickness to be epitaxially grown on the entire surface of the particles. This $LiCoO_2$ was found as being formed of a crystal structure whose c-axis was directed in the same direction as the c-axis of the $Li_{1.075}Ni_{0.925}O_{1.7}F_{0.29}$.

Then, the same procedures as those explained in Example 1 were repeated except the particles obtained above were employed, thereby obtaining a positive electrode. Then, a battery for evaluating the positive electrode as shown in FIG. 5 was assembled by employing this positive electrode, together with the negative electrode, the reference electrode and the nonaqueous electrolyte, each obtained in the same manner as explained in Example 1.

The secondary batteries obtained in Examples 34 to 37 and Comparative Examples 30 and 31 were subjected to a repetition of charge/discharge cycle wherein each battery was charged to a depth of 4.2 V with a current of 1 mA followed by the suspension of the charging for 30 minutes, and then discharged down to 3.0 V with a current of 1 mA followed again by the suspension of the discharge for 30 minutes. This charge/discharge cycle was repeated and changes in discharge capacity with the times of the charge/discharge cycle were measured. Table 7 shown below denotes the initial discharge capacity and the discharge capacity at the 30th cycle.

TABLE 7

|  | Composition | Discharge capacity at 1st cycle (mAh/g) | Discharge capacity at 30th cycle (mAh/g) |
| --- | --- | --- | --- |
| Example 34 | i | 242 | 206 |
| Example 35 | i | 243 | 202 |
| Example 36 | i | 240 | 203 |
| Example 37 | R | 241 | 176 |
| Comparative Example 30 | s | 252 | 138 |
| Comparative Example 31 | t | 178 | 84 |

As apparent from Table 7, the batteries according to Examples 34 to 37 were superior than the batteries according to Comparative Examples 30 and 31 in terms of the cycle life. In particular, the batteries of Examples 34 to 36 exhibited a superior performance as it contained, as an active material, particles made mainly of a lithium-containing nickel oxide which meets the aforementioned equations (4) to (7), at least some of the particles having the film made mainly of $LiCoO_2$.

By contrast, the batteries of Comparative Examples 30 and 31 apparently indicated a short cycle life. This poor performance of the batteries according to these Comparative Examples can be ascribed to the fact that although the positive electrode in these Comparative Examples contained particles covered entirely by the film mainly consisting of $LiCoO_2$, but the composition of the particles was outside the region defined by the aforementioned equations (4) to (7).

EXAMPLE 38

($LiOH \cdot H_2O$), $Ni(OH)_2$ and LiF were mixed together at a molar ratio of 0.96:0.9:0.15 to prepare a mixture, which was then kept in 1 atm. of pure oxygen at a temperature of 550° C. for 5 hours and thereafter sintered in 1 atm. of pure oxygen at 650° C. for 20 hours. The resultant sintered mixture was then pulverized in an agate mortar to prepare particles consisting mainly of a lithium-containing nickel oxide represented by $Li_{1.1}Ni_{0.9}O_{1.85}F_{0.14}$. An average particle diameter of the particles thus obtained was 8.5 μm. Then, 5 cc of the mixed solution of the same composition as employed in example 34 for forming a film was added to one mole of the above-mentioned particles to allow the mixed solution to be penetrated fully into the particles, and then the particle was baked in a pure oxygen atmosphere of 1 atmosphere at a temperature of 550° C. for 20 hours thereby allowing a film consisting mainly of $LiCoO_2$ 10 nm in thickness to be epitaxially grown on the entire surface of the particles. This $LiCoO_2$ was found as being formed of a crystal structure whose c-axis was directed in the same direction as the c-axis of the $Li_{1.1}Ni_{0.9}O_{1.85}F_{0.14}$.

Then, the same procedures as those explained in Example 1 were repeated except the particles obtained above were employed, thereby obtaining a positive electrode. Then, a battery for evaluating the positive electrode as shown in FIG. 5 was assembled by employing this positive electrode, together with the negative electrode, the reference electrode and the nonaqueous electrolyte, each obtained in the same manner as explained in Example 1.

EXAMPLE 39

Particles consisting mainly of a lithium-containing nickel oxide represented by $Li_{1.1}Ni_{0.9}O_{1.85}F_{0.14}$ and having an average particle diameter of 8.5 μm were prepared in the same manner as in Example 38.

Then, the same procedures as those explained in Example 1 were repeated except the particles obtained above were employed, thereby obtaining a positive electrode. Then, a battery for evaluating the positive electrode as shown in FIG. 5 was assembled by employing this positive electrode, together with the negative electrode, the reference electrode and the nonaqueous electrolyte, each obtained in the same manner as explained in Example 1.

The secondary batteries obtained in Examples 38 and 39 were subjected to a repetition of charge/discharge cycle wherein each battery was charged to a depth of 4.2 V with a current of 1 mA followed by the suspension of the charging for 30 minutes, and then discharged down to 3.0 V with a current of 1 mA followed again by the suspension of the discharge for 30 minutes. This charge/discharge cycle was repeated and changes in discharge capacity with the times of the charge/discharge cycle were measured. Table 8 shown below denotes the initial discharge capacity and the discharge capacity at the 30th cycle. Table 8 also shows the initial discharge capacity and the discharge capacity at the 30th cycle of Comparative Examples 30 and 31.

TABLE 8

| | Composition | Discharge capacity at 1st cycle (mAh/g) | Discharge capacity at 30th cycle (mAh/g) |
|---|---|---|---|
| Example 38 | j | 228 | 197 |
| Example 39 | S | 220 | 186 |
| Comparative Example 30 | s | 252 | 138 |
| Comparative Example 31 | t | 178 | 84 |

As apparent from Table 8, the batteries according to Examples 38 and 39 were superior than the batteries according to Comparative Example 30 and 31 in terms of the cycle life.

EXAMPLE 40

(LiOH·H$_2$O), Ni(OH)$_2$ and LiF were mixed together at a molar ratio of 0.96:0.92:0.12 to prepare a mixture, which was then kept in 1 atm. of pure oxygen at a temperature of 550° C. for 5 hours and thereafter sintered in 1 atm. of pure oxygen at 650° C. for 20 hours. The resultant sintered mixture was then pulverized in an agate mortar to prepare particles consisting mainly of a lithium-containing nickel oxide represented by Li$_{1.08}$Ni$_{0.92}$O$_{1.9}$F$_{0.1}$ and having an average particle diameter of 8.5 μm.

Then, the same procedures as those explained in Example 1 were repeated except the particles obtained above were employed, thereby obtaining a positive electrode. Then, a battery for evaluating the positive electrode as shown in FIG. 5 was assembled by employing this positive electrode, together with the negative electrode, the reference electrode and the nonaqueous electrolyte, each obtained in the same manner as explained in Example 1.

EXAMPLE 41

Particles consisting mainly of a lithium-containing nickel oxide represented by Li$_{1.08}$Ni$_{0.92}$O$_{1.9}$F$_{0.1}$ and having an average particle diameter of 8.5 μm were prepared in the same manner as in Example 40. Meanwhile, a 1 mol/l aqueous mixed solution comprising lithium nitrate and cobalt nitrate was prepared. The molar ratio between lithium and cobalt in this aqueous mixed solution to be used for forming a film was set to 1:1. Then, 5 cc of the aqueous mixed solution was added to one mole of the above-mentioned particles to allow the mixed solution to be penetrated fully into the particles, and then the particle was baked in a pure oxygen atmosphere of 1 atmosphere at a temperature of 550° C. for 20 hours thereby allowing a film consisting mainly of LiCoO$_2$ 10 nm in thickness to be epitaxially grown on the entire surface of the particles. This LiCoO$_2$ was found as being formed of a crystal structure whose c-axis was directed in the same direction as the c-axis of the Li$_{1.08}$Ni$_{0.92}$O$_{1.9}$F$_{0.1}$.

Then, the same procedures as those explained in Example 1 were repeated except the particles obtained above were employed, thereby obtaining a positive electrode. Then, a battery for evaluating the positive electrode as shown in FIG. 5 was assembled by employing this positive electrode, together with the negative electrode, the reference electrode and the nonaqueous electrolyte, each obtained in the same manner as explained in Example 1.

EXAMPLE 42

(LiOH·H$_2$O), Ni(OH)$_2$ and LiF were mixed together at a molar ratio of 0.96:0.92:0.12 to prepare a mixture, which was then kept in 1 atm. of pure oxygen at a temperature of 550° C. for 5 hours and thereafter sintered in 1 atm. of pure oxygen at 650° C. for 20 hours. The resultant sintered mixture was then pulverized in an agate mortar to prepare particles consisting mainly of a lithium-containing nickel oxide represented by Li$_{1.08}$Ni$_{0.92}$O$_{1.9}$F$_{0.1}$ and having an average particle diameter of 4.5 μm.

Then, the same procedures as those explained in Example 1 were repeated except the particles obtained above were employed, thereby obtaining a positive electrode. Then, a battery for evaluating the positive electrode as shown in FIG. 5 was assembled by employing this positive electrode, together with the negative electrode, the reference electrode and the nonaqueous electrolyte, each obtained in the same manner as explained in Example 1.

EXAMPLE 43

Particles consisting mainly of a lithium-containing nickel oxide represented by Li$_{1.08}$Ni$_{0.92}$O$_{1.9}$F$_{0.1}$ and having an average particle diameter of 4.5 μm were prepared in the same manner as in Example 42. Meanwhile, a 2 mol/l aqueous mixed solution comprising lithium nitrate and cobalt nitrate was prepared. The molar ratio between lithium and cobalt in this aqueous mixed solution to be used for forming a film was set to 1:1. Then, 5 cc of the aqueous mixed solution was added to one mole of the above-mentioned particles to allow the mixed solution to be penetrated fully into the particles, and then the particle was baked in a pure oxygen atmosphere of 1 atmosphere at a temperature of 550° C. for 20 hours thereby allowing a film consisting mainly of LiCoO$_2$ 10 nm in thickness to be epitaxially grown on the entire surface of the particles. This LiCoO$_2$ was found as being formed of a crystal structure whose c-axis was directed in the same direction as the c-axis of the Li$_{1.08}$Ni$_{0.92}$O$_{1.9}$F$_{0.1}$.

Then, the same procedures as those explained in Example 1 were repeated except the particles obtained above were employed, thereby obtaining a positive electrode. Then, a battery for evaluating the positive electrode as shown in FIG. 5 was assembled by employing this positive electrode, together with the negative electrode, the reference electrode and the nonaqueous electrolyte, each obtained in the same manner as explained in Example 1.

COMPARATIVE EXAMPLE 32

(LiOH·H$_2$O) and Ni(OH)$_2$ were mixed together at a molar ratio of 1:1 to prepare a mixture, which was then kept in 1 atm. of pure oxygen at a temperature of 550° C. for 5 hours and thereafter sintered in 1 atm. of pure oxygen at 650° C. for 20 hours. The resultant sintered mixture was then pulverized in an agate mortar to prepare particles consisting mainly of a lithium-containing nickel oxide represented by LiNiO$_2$ and having an average particle diameter of 8.5 μm.

Then, the same procedures as those explained in Example 1 were repeated except the particles obtained above were employed, thereby obtaining a positive electrode. Then, a battery for evaluating the positive electrode as shown in FIG. 5 was assembled by employing this positive electrode, together with the negative electrode, the reference electrode and the nonaqueous electrolyte, each obtained in the same manner as explained in Example 1.

The secondary batteries obtained in Examples 40 to 43 and Comparative Example 32 were subjected to a repetition of charge/discharge cycle wherein each battery was charged to a depth of 4.2 V with a current of 1 mA followed by the suspension of the charging for 30 minutes, and then discharged down to 3.0 V with a current of 1 mA followed again by the suspension of the discharge for 30 minutes. This charge/discharge cycle was repeated 50 times and changes in discharge capacity with the times of the charge/discharge cycle were measured, The results being shown in FIG. 8.

As apparent from FIG. 8, the batteries according to Examples 40 to 43 were capable of retaining a high capacity throughout 50 times of the cycle.

By contrast, the batteries of Comparative Example 32 indicated a higher initial capacity as compared with Examples 40 to 43, but the discharge capacity at 50th cycle was extremely low, indicating a shorter cycle life thereof as compared with the batteries of Examples 40 to 43.

EXAMPLE 44

(LiOH·H$_2$O), Ni(OH)$_2$ and LiF were mixed together at a molar ratio of 0.9:0.9:0.2 to prepare a mixture, which was then kept in 1 atm. of pure oxygen at a temperature of 550° C. for 5 hours and thereafter sintered in 1 atm. of pure oxygen at 650° C. for 20 hours. The resultant sintered mixture was then pulverized in an agate mortar to prepare particles consisting mainly of a lithium-containing nickel oxide represented by Li$_{1.1}$Ni$_{0.9}$O$_{1.83}$F$_{0.17}$ and having an average particle diameter of 8.5 μm. Meanwhile, an 1 mol/l aqueous mixed solution comprising lithium nitrate and cobalt nitrate was prepared. The molar ratio between lithium and cobalt in this aqueous solution was set to 1:1. Then, 5 cc of the mixed solution was added to one mole of the above-mentioned particles to allow the mixed solution to be penetrated fully into the particles, and then the particle was baked in a pure oxygen atmosphere of 1 atmosphere at a temperature of 550° C. for 20 hours thereby allowing a film consisting mainly of LiCoO$_2$ 10 nm in thickness to be epitaxially grown on the entire surface of the particles. This LiCoO$_2$ was found as being formed of a crystal structure whose c-axis was directed in the same direction as the c-axis of the Li$_{1.1}$Ni$_{0.9}$O$_{1.83}$F$_{0.17}$.

Then, the same procedures as those explained in Example 1 were repeated except the particles obtained above were employed, thereby obtaining a positive electrode. Then, a battery for evaluating the positive electrode as shown in FIG. 5 was assembled by employing this positive electrode, together with the negative electrode, the reference electrode and the nonaqueous electrolyte, each obtained in the same manner as explained in Example 1.

EXAMPLE 45

Particles consisting mainly of a lithium-containing nickel oxide represented by Li$_{1.1}$Ni$_{0.9}$O$_{1.83}$F$_{0.17}$ and having an average particle diameter of 8.5 μm was prepared in the same manner as explained in Example 44. Meanwhile, an 1 mol/l aqueous mixed solution comprising lithium nitrate and cobalt nitrate was prepared. The molar ratio between lithium and cobalt in this aqueous solution was set to 1:1. Then, 15 cc of the mixed solution was added to one mole of the above-mentioned particles to allow the mixed solution to be penetrated fully into the particles, and then the particle was baked in a pure oxygen atmosphere of 1 atmosphere at a temperature of 550° C. for 20 hours thereby allowing a film consisting mainly of LiCoO$_2$ 30 nm in thickness to be epitaxially grown on the entire surface of the particles. This LiCoO$_2$ was found as being formed of a crystal structure whose c-axis was directed in the same direction as the c-axis of the Li$_{1.1}$Ni$_{0.9}$O$_{1.83}$F$_{0.17}$.

Then, the same procedures as those explained in Example 1 were repeated except the particles obtained above were employed, thereby obtaining a positive electrode. Then, a battery for evaluating the positive electrode as shown in FIG. 5 was assembled by employing this positive electrode, together with the negative electrode, the reference electrode and the nonaqueous electrolyte, each obtained in the same manner as explained in Example 1.

EXAMPLE 46

Particles consisting mainly of a lithium-containing nickel oxide represented by Li$_{1.1}$Ni$_{0.9}$O$_{1.83}$F$_{0.17}$ and having an average particle diameter of 8.5 μm was prepared in the same manner as explained in Example 44. Meanwhile, an 2 mol/l aqueous mixed solution comprising lithium nitrate and cobalt nitrate was prepared. The molar ratio between lithium and cobalt in this aqueous solution was set to 1:1. Then, 12.5 cc of the mixed solution was added to one mole of the above-mentioned particles to allow the mixed solution to be penetrated fully into the particles, and then the particle was baked in a pure oxygen atmosphere of 1 atmosphere at a temperature of 550° C. for 20 hours thereby allowing a film consisting mainly of LiCoO$_2$ 50 nm in thickness to be epitaxially grown on the entire surface of the particles. This LiCoO$_2$ was found as being formed of a crystal structure whose c-axis was directed in the same direction as the c-axis of the Li$_{1.1}$Ni$_{0.9}$O$_{1.83}$F$_{0.17}$.

Then, the same procedures as those explained in Example 1 were repeated except the particles obtained above were employed, thereby obtaining a positive electrode. Then, a battery for evaluating the positive electrode as shown in FIG. 5 was assembled by employing this positive electrode, together with the negative electrode, the reference electrode and the nonaqueous electrolyte, each obtained in the same manner as explained in Example 1.

EXAMPLE 47

Particles consisting mainly of a lithium-containing nickel oxide represented by Li$_{1.1}$Ni$_{0.9}$O$_{1.83}$F$_{0.17}$ and having an average particle diameter of 8.5 μm was prepared in the same manner as explained in Example 44. Meanwhile, an 2 mol/l aqueous mixed solution comprising lithium nitrate and cobalt nitrate was prepared. The molar ratio between lithium and cobalt in this aqueous solution was set to 1:1. Then, 25 cc of the mixed solution was added to one mole of the above-mentioned particles to allow the mixed solution to be penetrated fully into the particles, and then the particle was baked in a pure oxygen atmosphere of 1 atmosphere at a temperature of 550° C. for 20 hours thereby allowing a film consisting mainly of LiCoO$_2$ film 100 nm in thickness to be epitaxially grown on the entire surface of the particles. This LiCoO$_2$ was found as being formed of a crystal structure whose c-axis was directed in the same direction as the c-axis of the Li$_{1.1}$Ni$_{0.9}$O$_{1.83}$F$_{0.17}$.

Then, the same procedures as those explained in Example 1 we re repeated except the particles obtained above were employed, thereby obtaining a positive electrode. Then, a battery for evaluating the positive electrode as shown in FIG. 5 was assembled by employing this positive electrode, together with the negative electrode, the reference electrode and the nonaqueous electrolyte, each obtained in the same manner as explained in Example 1.

COMPARATIVE EXAMPLE 33

(LiOH·H$_2$O), Ni(OH)$_2$ and LiF were mixed together at a molar ratio of 0.9:0.9:0.2 to prepare a mixture, which was then kept in 1 atm. of pure oxygen at a temperature of 550° C. for 5 hours and thereafter sintered in 1 atm. of pure oxygen at 650° C. for 20 hours. The resultant sintered mixture was then pulverized in an agate mortar to prepare particles consisting mainly of a lithium-containing nickel oxide represented. by $Li_{1.1}Ni_{0.9}O_{1.83}F_{0.17}$ and having an average particle diameter of 8.5 μm.

Then, the same procedures as those explained in Example 1 were repeated except the particles obtained above were employed, thereby obtaining a positive electrode. Then, a battery for evaluating the positive electrode as shown in FIG. 5 was assembled by employing this positive electrode, together with the negative electrode, the reference electrode and the nonaqueous electrolyte, each obtained in the same manner as explained in Example 1.

The secondary batteries obtained in Examples 44 to 47 and Comparative Example 33 were subjected to a repetition of charge/discharge cycle wherein each battery was charged to a depth of 4.2 V with a current of 1 mA followed by the suspension of the charging for 30 nmminutes, and then discharged down to 3.0 V with a current of 1 mA followed again by the suspension of the discharge for 30 nmminutes. This charge/discharge cycle was repeated and changes in discharge capacity with the times of the charge/discharge cycle were measured. Table 9 shown below denotes the initial discharge capacity and the discharge capacity at the 100th cycle. Table 9 also shows the initial discharge capacity and the discharge capacity at the 100th cycle of Example 12.

TABLE 9

|  | Thickness of $LiCOO_2$ film (nm) | Composition | Discharge capacity at 1st cycle (mAh/g) | Discharge capacity at 100th cycle (mAh/g) |
| --- | --- | --- | --- | --- |
| Comparative Example 33 | 0 | c | 197 | 118 |
| Example 44 | 10 | c | 211 | 123 |
| Example 12 | 20 | c | 221 | 146 |
| Example 45 | 30 | c | 210 | 141 |
| Example 46 | 50 | c | 197 | 133 |
| Example 47 | 100 | c | 181 | 105 |

As apparent from Table 9, the batteries according to Examples 12, 44 to 47 were superior in the charge/discharge cycle life as compared with Comparative Example 33. In particular, the batteries according to Examples 12, 45 and 46 where the film thickness of $LiCoO_2$ was in the range of 20 to 50 nm were superior in cycle life as compared with Examples 44 and 47.

EXAMPLE 48

(Preparation of a positive electrode)

Particles comprising as a main component lithium-containing nickel oxide represented by a composition of $Li_{1.08}Ni_{0.92}O_{1.9}F_{0.1}$ were prepared by the steps of mixing ($LiOH \cdot H_2O$), $Ni(OH)_2$ and LiF at a molar ratio of 0.96:0.92:0.12, keeping the mixture thus obtained in 1 atm. of pure oxygen at a temperature of 550° C. for 5 hours, sintering the mixture at 650° C. in 1 atm. of pure oxygen for 20 hours, and pulverizing the sintered mixture in an agate mortar. The average particle diameter of the sintered particles thus obtained was 8.5 μm. Then, the sintered particles, acetylene black, polyvinylidene fluoride and N-methyl-2-pyrrolidone were mixed together at a weight ratio of 85:5:10:90 and then dispersed to obtain a slurry. This slurry was then coated on an aluminum substrate having a thickness of 20 μm and thereafter dried at a temperature of 150° C. The aluminum substrate thus coated with the slurry was compressed by means of a roll compressor to obtain a positive electrode having a thickness of 200 μm.

(Preparation of a negative electrode)

Mesophase carbon fibers, polyvinylidene fluoride and N-methyl-2-pyrrolidone were mixed together at a weight ratio of 300:24:216 and then dispersed to obtain a slurry. This slurry was then coated on a copper substrate having a thickness of 20 μm and thereafter dried at a temperature of 150° C. The copper substrate thus coated with the slurry was compressed by means of a roll compressor to obtain a negative electrode having a thickness of 200 μm.

Then, an electrode group was constructed by stacking the positive electrode, a separator formed of polyethylene porous film and the negative electrode in this order and then spirally winding this stacked body with the separator being disposed at the outermost side.

(Preparation of electrolyte)

Lithium hexafluorophosphate ($LiPF_6$) was dissolved at a concentration of 1 mol/l in a mixed solvent comprising ethylene carbonate and ethylmethyl carbonate (volume ratio: 1:1) to obtain a nonaqueous electrolyte.

Then, the electrode group and the electrolyte were placed in a bottomed cylindrical case made of stainless steel to manufacture a cylindrical nonaqueous electrolyte secondary battery 18 mm in diameter and 65mm in height as shown in FIG. 1.

EXAMPLE 49

Particles consisting mainly of lithium-containing nickel oxide represented by $Li_{1.08}Ni_{0.92}O_{1.9}F_{0.1}$ and having an average particle diameter of 8.5 μm was prepared in the same manner as explained in Example 48. Meanwhile, an 1 mol/l aqueous mixed solution comprising lithium nitrate and cobalt nitrate for forming a film was prepared. The molar ratio between lithium and cobalt in this aqueous solution was set to 1:1. Then, 5 cc of the mixed solution was added to one mole of the above-mentioned particles to allow the mixed solution to be penetrated fully into the particles, and then the particle was baked in a pure oxygen atmosphere of 1 atmosphere at a temperature of 550° C. for 20 hours thereby allowing a film consisting mainly of $LiCoO_2$ 10 nm in thickness to be epitaxially grown on the entire surface of the particles. This $LiCoO_2$ was found as being formed of a crystal structure whose c-axis was directed in the same direction as the c-axis of the $Li_{1.08}Ni_{0.92}O_{1.9}F_{0.1}$.

Then, the same procedures as those explained in Example 48 were repeated except the particles obtained above were employed, thereby obtaining a positive electrode. Then, a nonaqueous electrolyte secondary battery as shown in FIG. 1 was assembled by employing this positive electrode, together with the negative electrode, the separator and the nonaqueous electrolyte, each obtained in the same manner as explained in Example 48.

COMPARATIVE EXAMPLE 34

($LiOH \cdot H_2O$) and $Ni(OH)_2$ were mixed together at a molar ratio of 1.025:1 to prepare a mixture, which was then kept in 1 atm. of pure oxygen at a temperature of 550° C. for 5 hours and thereafter sintered in 1 atm. of pure oxygen at 650° C. for 20 hours. The resultant sintered mixture was then pulverized in an agate mortar to prepare particles consisting mainly of a lithium-containing nickel oxide represented by $Li_{1.025}NiO_2$. An average particle diameter of the particles thus obtained was 8.5 μm.

Then, the same procedures as those explained in Example 48 were repeated except the particles obtained above were employed, thereby obtaining a positive electrode. Then, a nonaqueous electrolyte secondary battery as shown in FIG. 1 was assembled by employing this positive electrode, together with the negative electrode, the separator and the nonaqueous electrolyte, each obtained in the same manner as explained in Example 48.

COMPARATIVE EXAMPLE 35

(LiOH·H$_2$O), Ni(OH)$_2$ and LiF were mixed together at a molar ratio of 0.75:0.9:0.35 to prepare a mixture, which was then kept in 1 atm. of pure oxygen at a temperature of 550° C. for 5 hours and thereafter sintered at 650° C. for 20 hours. The resultant sintered mixture was then pulverized in an agate mortar to prepare particles consisting mainly of a lithium-containing nickel oxide represented by Li$_{1.1}$Ni$_{0.9}$O$_{1.7}$F$_{0.3}$ and having an average particle diameter of 8.5 μm.

Then, the same procedures as those explained in Example 48 were repeated except the particles obtained above were employed, thereby obtaining a positive electrode. Then, a nonaqueous electrolyte secondary battery as shown in FIG. 1 was assembled by employing this positive electrode, together with the negative electrode, the separator and the nonaqueous electrolyte, each obtained in the same manner as explained in Example 48.

The secondary batteries obtained in Examples 48 and 49 and Comparative Examples 34 and 35 were subjected to a repetition of charge/discharge cycle wherein each battery was charged to a depth of 4.2 V with a current of 1000 mA, performed a constant-voltage charge for 30 minutes, and then discharged down to 2.7 V with a current of 1000 mA followed by the suspension of the discharge for 30 minutes. This charge/discharge cycle was repeated and changes in discharge capacity with the times of the charge/discharge cycle were measured. Table 10 shown below denotes the initial discharge capacity and the discharge capacity at the 300th cycle.

TABLE 10

| | Composition | Initial discharge capacity (mAh) | Discharge capacity at 300th cycle (mAh) |
|---|---|---|---|
| Example 48 | T | 1721 | 1549 |
| Example 49 | k LiCoO$_2$ film formed | 1792 | 1612 |
| Comparative Example 34 | K | 1770 | 1062 |
| Comparative Example 35 | N | 952 | 571 |

As apparent from Table 10, the secondary batteries according to Examples 48 and 49 were superior in the cycle life as compared with Comparative Examples 34 and 35. By contrast, the secondary batteries of Comparative Example 34 indicated a short cycle life, though the initial capacity thereof was high. On the other hand, the secondary batteries of Comparative Example 35 indicated poor performances in both of the initial capacity and the cycle life.

As explained above, it is possible according to this invention to provide a nonaqueous electrolyte secondary battery and a method of manufacturing the secondary battery, which make it possible to improve both of the initial discharge capacity and the cycle life.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A nonaqueous electrolyte secondary battery comprising a positive electrode, a negative electrode and a nonaqueous electrolyte; wherein said positive electrode comprises a lithium-containing nickel oxyfluoride having a composition represented by Li$_{1+x}$Ni$_{1-x}$O$_{u-y}$F$_y$ where the ranges of x, y and u meet the following equations (1) to (3):

$$(y+0.05)/2 \leq x < (y+1)/3 \qquad (1)$$

$$y > 0 \qquad (2)$$

$$1.9 \leq u \leq 2.1 \qquad (3).$$

2. A nonaqueous electrolyte secondary battery according to claim 1, wherein said ranges of x, y and u of the lithium-containing nickel oxyfluoride meet the following equations (2) to (4):

$$y > 0 \qquad (2)$$

$$1.9 \leq u \leq 2.1 \qquad (3)$$

$$(y+0.05)/2 \leq x < (y+0.2)/2 \qquad (4).$$

3. A nonaqueous electrolyte secondary battery according to claim 1, wherein said negative electrode contains a material which is capable of absorbing and desorbing lithium ion and selected from the group consisting of a carbonaceous material, a chalcogen compound and a light metal.

4. A nonaqueous electrolyte secondary battery according to claim 3, wherein said carbonaceous material is a mesophase pitch carbon.

5. A nonaqueous electrolyte secondary battery according to claim 1, wherein said electrolyte comprises a mixed solvent comprising ethylene carbonate and at least one kind of nonaqueous solvent whose melting point is lower than that of ethylene carbonate and whose donor number is 18 or less; and an electrolytic salt dissolved in the mixed solvent.

6. A nonaqueous electrolyte secondary battery according to claim 5, wherein said nonaqueous solvent contains at least one kind of solvent selected from propylene carbonate, dimethyl carbonate, methylethyl carbonate and diethyl carbonate.

7. A nonaqueous electrolyte secondary battery according to claim 1, wherein a nickel component of said nickel oxyfluoride comprises Co.

8. A nonaqueous electrolyte secondary battery according to claim 1, wherein a nickel component of said nickel oxyfluoride comprises Mn.

9. A method of manufacturing a nonaqueous electrolyte secondary battery comprising the steps of:

mixing at least one compound selected from lithium hydroxide, lithium oxide, lithium carbonate and lithium nitrate, at least one compound selected from nickel hydroxide, nickel oxide, nickel carbonate and nickel nitrate, and lithium fluoride at a molar ratio of 0.85–1.0:0.8–0.95:0.05–0.35 to obtain a mixture;

baking the mixture in a oxygen atmosphere at a temperature of 600° C. to 680° C. thereby producing a lithium-containing nickel oxyfluoride; and preparing a positive electrode containing said nickel oxyfluoride.

10. A method of manufacturing a nonaqueous electrolyte secondary battery according to claim 9, wherein said molar ratio is 0.95–1.0:0.9–0.95:0.05–0.15.

11. A method of manufacturing a nonaqueous, electrolyte secondary battery according to claim 9, wherein said negative electrode contains a material which is capable of absorbing and desorbing lithium ion and selected from the group consisting of a carbonaceous material, a chalcogen compound and a light metal.

12. A method of manufacturing a nonaqueous electrolyte secondary battery according to claim 11, wherein said carbonaceous material is a mesophase pitch carbon.

13. A method of manufacturing a nonaqueous electrolyte secondary battery according to claim 9, wherein said electrolyte comprises a mixed solvent comprising ethylene carbonate and at least one kind of nonaqueous solvent whose melting point is lower than that of ethylene carbonate and whose donor number is 18 or less; and an electrolytic salt dissolved in the mixed solvent.

14. A method of manufacturing a nonaqueous electrolyte secondary battery according to claim 13, wherein said nonaqueous solvent contains at least one kind of solvent selected from propylene carbonate, dimethyl carbonate, methylethyl carbonate and diethyl carbonate.

15. A nonaqueous electrolyte secondary battery comprising a positive electrode, a negative electrode and a nonaqueous electrolyte, said positive electrode containing particles each made mainly of lithium-containing nickel oxyfluoride, at least some of said particles having a film made mainly of lithium-containing oxide, wherein said lithium-containing nickel oxide is formed of a composition represented by $Li_{1+x}Ni_{1-x}O_{u-y}F_y$, where the ranges of x, y and u meet the following equations (5) to (8):

$$y/2 \leq x < (y+1)/3 \quad (5)$$

$$y > 0 \quad (6)$$

$$x \geq 0.05 \quad (7)$$

$$1.9 \leq u \leq 2.1 \quad (8)$$

and said lithium-containing oxide is formed of a composition represented by $LiMO_2$ (where M is at least one kind of element selected from the group consisting of Al, Co, Ni, Li, Mn, Ga and Ru).

16. A nonaqueous electrolyte secondary battery according to claim 15, wherein said ranges of x, y and u in $Li_{1+x}Ni_{1-x}O_{u-y}F_y$ constituting said lithium-containing nickel oxide meet the following equations (6) to (9):

$$y > 0 \quad (6)$$

$$x \geq 0.05 \quad (7)$$

$$1.9 \leq u \leq 2.1 \quad (8)$$

$$(y+0.05)/2 \leq x \leq (y+0.2)/2 \quad (9).$$

17. A nonaqueous electrolyte secondary battery according to claim 15, wherein said film is epitaxially grown on at least some of said particles.

18. A nonaqueous electrolyte secondary battery according to claim 15, wherein said film has a thickness ranging from 1 nm to 50 nm.

19. A nonaqueous electrolyte secondary battery according to claim 15, wherein said negative electrode contains a material which is capable of absorbing and desorbing lithium ion and selected from the group consisting of a carbonaceous material, a chalcogen compound and a light metal.

20. A nonaqueous electrolyte secondary battery according to claim 19, wherein said carbonaceous material is a mesophase pitch carbon.

21. A nonaqueous electrolyte secondary battery according to claim 15, wherein said electrolyte comprises a mixed solvent comprising ethylene carbonate and at least one kind of nonaqueous solvent whose melting point is lower than that of ethylene carbonate and whose donor number is 18 or less; and an electrolytic salt dissolved in the mixed solvent.

22. A nonaqueous electrolyte secondary battery according to claim 21, wherein said nonaqueous solvent contains at least one kind of solvent selected from propylene carbonate, dimethyl carbonate, methylethyl carbonate and diethyl carbonate.

23. A nonaqueous electrolyte secondary battery according to claim 15, wherein a nickel component of said nickel oxyfluoride comprises Co.

24. A nonaqueous electrolyte secondary battery according to claim 15, wherein a nickel component of said nickel oxyfluoride comprises Mn.

25. A method of manufacturing a nonaqueous electrolyte secondary battery;

mixing at least one compound selected from lithium hydroxide, lithium oxide, lithium carbonate and lithium nitrate, at least one compound selected from nickel hydroxide, nickel oxide, nickel carbonate and nickel nitrate, and lithium fluoride at a molar ratio of 0.85–1.0:0.8–0.95:0.05–0.35 to obtain a mixture;

baking the mixture in an oxygen atmosphere at a temperature of 600° C. to 680° C., thereby producing a lithium-containing nickel oxyfluoride:

pulverizing said nickel oxyfluoride into particles;

impregnating said particles with an aqueous solution containing one compound selected from lithium nitrate and an organic acid salt of lithium, and one compound selected from a nitrate of element M and an organic acid salt of element M (where M is at least one kind of element selected from the group consisting of Al, Co, Ni, Li, Mn, Ga and Ru);

baking said particles in an oxygen atmosphere at a temperature of 500° C. to 600° C., and preparing a positive electrode containing said particles.

26. A method of manufacturing a nonaqueous electrolyte secondary battery according to claim 25, wherein said molar ratio is 0.95–1.0:0.9–0.95: 0.05–0.15.

27. A method of manufacturing a nonaqueous electrolyte secondary battery according to claim 25, wherein said negative electrode contains a material which is capable of absorbing and desorbing lithium ion and selected from the group consisting of a carbonaceous material, a chalcogen compound and a light metal.

28. A method of manufacturing a nonaqueous electrolyte secondary battery according to claim 27, wherein said carbonaceous material is a mesophase pitch carbon.

29. A method of manufacturing a nonaqueous electrolyte secondary battery according to claim 25, wherein said electrolyte comprises a mixed solvent comprising ethylene carbonate and at least one kind of nonaqueous solvent whose melting point is lower than that of ethylene carbonate and whose donor number is 18 or less; and an electrolytic salt dissolved in the mixed solvent.

30. A method of manufacturing a nonaqueous electrolyte secondary battery according to claim 29, wherein said nonaqueous solvent contains at least one kind of solvent selected from propylene carbonate, dimethyl carbonate, methylethyl carbonate and diethyl carbonate.

* * * * *